(12) United States Patent
Fein et al.

(10) Patent No.: US 11,423,464 B2
(45) Date of Patent: Aug. 23, 2022

(54) METHOD, APPARATUS, AND COMPUTER PROGRAM PRODUCT FOR ENHANCEMENT OF FAN EXPERIENCE BASED ON LOCATION DATA

(71) Applicant: Zebra Technologies Corporation, Lincolnshire, IL (US)

(72) Inventors: Michael Fein, Ann Arbor, MI (US); Anthony R. Brown, Spring Grove, IL (US); John Huffman, Lincolnshire, IL (US); Robert Grom, Lake Zurich, IL (US); Karl Torchalski, Arlington Heights, IL (US); James J. O'Hagan, McHenry, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/398,240

(22) Filed: Apr. 29, 2019

(65) Prior Publication Data
US 2019/0325503 A1  Oct. 24, 2019

Related U.S. Application Data

(63) Continuation of application No. 14/556,762, filed on Dec. 1, 2014, now abandoned, which is a
(Continued)

(51) Int. Cl.
*G06Q 30/06* (2012.01)
*G06Q 30/02* (2012.01)
(Continued)

(52) U.S. Cl.
CPC ..... *G06Q 30/0635* (2013.01); *G06Q 20/3224* (2013.01); *G06Q 30/0201* (2013.01);
(Continued)

(58) Field of Classification Search
CPC .............. G06Q 30/0205; G06Q 30/0252
See application file for complete search history.

(56) References Cited

U.S. PATENT DOCUMENTS

| 3,732,500 A | 5/1973 | Dishal et al. |
| 4,270,145 A | 6/1981 | Farina |
| (Continued) | | |

FOREIGN PATENT DOCUMENTS

| EP | 1241616 | 9/2002 |
| EP | 1253438 | 10/2002 |
| (Continued) | | |

OTHER PUBLICATIONS

International Search Report and Written opinion from International Application No. PCT/US2014/040881 dated Nov. 4, 2014. Copy not provided; available in U.S. Appl. No. 14/556,762 to which priority is claimed.

(Continued)

*Primary Examiner* — A. Hunter Wilder

(57) ABSTRACT

An example method includes receiving an application device identifier from an application device associated with a location tag; receiving blink data from the location tag; calculating, using a processor, location data based on the blink data; in response to an event occurrence indication, generating, using the processor, a camera data request based on the location data and the event occurrence indication; transmitting the camera data request; and receiving camera data from the application device in response to the camera data request.

20 Claims, 24 Drawing Sheets

Related U.S. Application Data continuation-in-part of application No. 13/942,316, filed on Jul. 15, 2013, now Pat. No. 9,002,485.

(60) Provisional application No. 61/831,990, filed on Jun. 6, 2013.

(51) Int. Cl.

| | | |
|---|---|---|
| G09B 19/00 | (2006.01) | |
| G06Q 20/32 | (2012.01) | |
| G08C 17/02 | (2006.01) | |
| H04W 4/21 | (2018.01) | |
| H04W 4/021 | (2018.01) | |

(52) U.S. Cl.
CPC ..... *G06Q 30/0202* (2013.01); *G06Q 30/0205* (2013.01); *G06Q 30/0252* (2013.01); *G08C 17/02* (2013.01); *G09B 19/0038* (2013.01); *H04W 4/021* (2013.01); *H04W 4/21* (2018.02)

(56) References Cited

U.S. PATENT DOCUMENTS

| | | |
|---|---|---|
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark et al. |
| 5,793,630 A | 8/1998 | Theimer et al. |
| 5,901,172 A | 5/1999 | Fontana et al. |
| 5,920,287 A | 7/1999 | Belcher et al. |
| 5,930,741 A | 7/1999 | Kramer |
| 5,995,046 A | 11/1999 | Belcher et al. |
| 6,025,780 A | 2/2000 | Bowers et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,542,083 B1 | 4/2003 | Richley et al. |
| 6,593,885 B2 | 7/2003 | Wisherd et al. |
| 6,655,582 B2 | 10/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,190,271 B2 | 3/2007 | Boyd et al. |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,739,076 B1 | 6/2010 | Vock et al. |
| 7,755,541 B2 | 7/2010 | Wisherd et al. |
| 7,899,006 B2 | 3/2011 | Boyd |
| 7,969,348 B2 | 6/2011 | Baker et al. |
| 8,077,981 B2 | 12/2011 | Elangovan et al. |
| 8,269,835 B2 | 9/2012 | Grigsby |
| 8,279,051 B2 | 10/2012 | Khan |
| 8,457,392 B2 | 6/2013 | Cavallaro et al. |
| 8,568,278 B2 | 10/2013 | Riley et al. |
| 8,696,458 B2 | 4/2014 | Foxlin et al. |
| 8,705,671 B2 | 4/2014 | Ameti et al. |
| 8,731,239 B2 | 5/2014 | Gefen |
| 8,775,916 B2 | 7/2014 | Pulsipher et al. |
| 8,795,045 B2 | 8/2014 | Sorrells et al. |
| 8,842,002 B2 | 9/2014 | Rado |
| 8,780,204 B2 | 10/2014 | DeAngelis et al. |
| 8,989,880 B2 | 3/2015 | Wohl et al. |
| 9,002,485 B2 | 4/2015 | Wohl et al. |
| 9,014,830 B2 | 4/2015 | Wohl et al. |
| 9,081,076 B2 | 7/2015 | DeAngelis et al. |
| 9,381,645 B1 | 7/2016 | Yarlagadda et al. |
| 9,404,998 B2 | 8/2016 | Larose et al. |
| 9,489,552 B2 | 11/2016 | Hansen |
| 10,050,650 B2 | 8/2018 | O'Hagan et al. |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1 | 9/2004 | Sun |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0073418 A1 | 4/2005 | Kelliher et al. |
| 2005/0075079 A1 | 4/2005 | Jei et al. |
| 2005/0093976 A1 | 5/2005 | Valleriano |
| 2005/0148281 A1 | 7/2005 | Sanchez-Castro et al. |
| 2005/0207617 A1 | 9/2005 | Sarnoff |
| 2006/0067324 A1 | 3/2006 | Kim |
| 2006/0139167 A1 | 6/2006 | Davie et al. |
| 2006/0164213 A1 | 7/2006 | Burghard et al. |
| 2006/0252476 A1 | 11/2006 | Bahou |
| 2006/0264730 A1 | 11/2006 | Stivoric et al. |
| 2006/0271912 A1 | 11/2006 | Mickle et al. |
| 2006/0281061 A1 | 12/2006 | Hightower et al. |
| 2007/0018820 A1 | 2/2007 | Chand et al. |
| 2007/0091292 A1 | 4/2007 | Cho et al. |
| 2007/0176749 A1 | 8/2007 | Boyd et al. |
| 2007/0296723 A1 | 12/2007 | Williams |
| 2008/0001714 A1 | 1/2008 | Ono |
| 2008/0065684 A1 | 4/2008 | Zilberman |
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 | 6/2008 | Seacat |
| 2008/0186231 A1 | 8/2008 | Aljadeff et al. |
| 2008/0204248 A1 | 8/2008 | Winget et al. |
| 2008/0246613 A1 | 10/2008 | Linstrom |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rogers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0195401 A1 | 8/2009 | Maroney et al. |
| 2009/0210078 A1 | 8/2009 | Crowley |
| 2009/0231198 A1 | 9/2009 | Walsh et al. |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0080163 A1 | 4/2010 | Krishnamoorthi et al. |
| 2010/0117837 A1 | 5/2010 | Stirling et al. |
| 2010/0150117 A1 | 6/2010 | Aweya et al. |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0295943 A1 | 11/2010 | Cha et al. |
| 2010/0328073 A1 | 12/2010 | Nikitin et al. |
| 2011/0013087 A1 | 1/2011 | House et al. |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0084806 A1 | 4/2011 | Pekins et al. |
| 2011/0134240 A1 | 6/2011 | Anderson et al. |
| 2011/0140970 A1 | 6/2011 | Fukagawa et al. |
| 2011/0151953 A1 | 6/2011 | Kim et al. |

(56) References Cited

U.S. PATENT DOCUMENTS

| | | |
|---|---|---|
| 2011/0169959 A1 | 7/2011 | DeAngelis et al. |
| 2011/0188513 A1 | 8/2011 | Christoffersson et al. |
| 2011/0195701 A1 | 8/2011 | Cook et al. |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1 | 1/2012 | Farley et al. |
| 2012/0024516 A1 | 2/2012 | Bhadurt et al. |
| 2012/0042326 A1 | 2/2012 | Jain et al. |
| 2012/0057634 A1 | 3/2012 | Shi et al. |
| 2012/0057640 A1 | 3/2012 | Shi et al. |
| 2012/0065483 A1 | 3/2012 | Chung et al. |
| 2012/0081531 A1 | 4/2012 | DeAngelis et al. |
| 2012/0088487 A1* | 4/2012 | Khan ............... G06Q 20/322 455/418 |
| 2012/0112904 A1 | 5/2012 | Nagy et al. |
| 2012/0126973 A1 | 5/2012 | DeAngelis et al. |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0246795 A1 | 10/2012 | Scheffler et al. |
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |
| 2013/0021206 A1 | 1/2013 | Hach et al. |
| 2013/0041590 A1 | 2/2013 | Burich et al. |
| 2013/0041775 A1 | 2/2013 | Rosenberg |
| 2013/0057392 A1 | 3/2013 | Bullock |
| 2013/0066448 A1 | 3/2013 | Alonso |
| 2013/0076645 A1 | 3/2013 | Anantha et al. |
| 2013/0093625 A1 | 4/2013 | Smith |
| 2013/0096704 A1 | 4/2013 | Case |
| 2013/0138386 A1 | 5/2013 | Jain et al. |
| 2013/0138518 A1 | 5/2013 | Whit et al. |
| 2013/0142384 A1 | 6/2013 | Ofek |
| 2013/0197981 A1 | 8/2013 | Vendetti |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0038544 A1 | 2/2014 | Jones et al. |
| 2014/0055588 A1 | 2/2014 | Bangera et al. |
| 2014/0062728 A1 | 3/2014 | Soto et al. |
| 2014/0089243 A1 | 3/2014 | Oppenheimer |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0267747 A1* | 9/2014 | Kritt ............... H04N 21/21805 348/159 |
| 2014/0301427 A1 | 10/2014 | Khalaf-Allah |
| 2014/0320660 A1 | 10/2014 | DeAngelis et al. |
| 2014/0347193 A1 | 11/2014 | Ljung |
| 2014/0361875 A1 | 12/2014 | O'Hagan et al. |
| 2014/0361906 A1 | 12/2014 | Hughes et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0015371 A1 | 1/2015 | Hansen |
| 2015/0057981 A1 | 2/2015 | Gross |
| 2015/0085111 A1 | 3/2015 | Lavery |
| 2015/0097653 A1 | 4/2015 | Gibbs et al. |
| 2015/0355311 A1 | 12/2015 | O'Hagan et al. |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0379387 A1 | 12/2015 | Richley |
| 2016/0008693 A1 | 1/2016 | Cronin |
| 2016/0059075 A1 | 3/2016 | Molyneux et al. |
| 2016/0097837 A1 | 4/2016 | Richley et al. |

FOREIGN PATENT DOCUMENTS

| | | |
|---|---|---|
| EP | 1503513 | 2/2005 |
| EP | 1235077 | 8/2008 |
| EP | 2474939 | 11/2012 |
| WO | 1999/061936 | 12/1999 |
| WO | 2001/008417 | 2/2001 |
| WO | 2006/022548 | 3/2006 |
| WO | 2010/083943 | 7/2010 |
| WO | 2012/167301 | 12/2012 |
| WO | 2015/051813 | 4/2014 |
| WO | 2014/197600 | 12/2014 |

OTHER PUBLICATIONS

International Search Report and Written opinion from International Application No. PCT/US2014/040940 dated Dec. 17, 2014. Copy not provided; available in U.S. Appl. No. 14/556,762 to which priority is claimed.

Complaint before the United States District Court of Massachusetts, Civil Action No. 1:15-cv-12297, *Lynx System Developers, Inc. et al. V. Zebra Enterprise Solutions Corporation et al.*, filed Jun. 10, 2015. Copy not provided; available in U.S. Appl. No. 14/556,762 to which priority is claimed.

International Search Report and Written Opinion from International Application No. PCT/US2014/041062 dated Oct. 1, 2014. Copy not provided; available in U.S. Appl. No. 14/556,762 to which priority is claimed.

International Search Report and Written Opinion from International Application No. PCT/US2014/040947 dated Oct. 9, 2014. Copy not provided; available in U.S. Appl. No. 14/556,762 to which priority is claimed.

Fontana, R.J., Richley, E., Barney, J., "Commercialization of an Ultra Wideband Precision Assest Location System", 2003 IEEE Conference on Ultra Wideband Systems and Technologies, Nov. 16-19, 2003. Copy not provided; available in U.S. Appl. No. 14/556,762 to which priority is claimed.

Gueéziec, A., "Tracking a Baseball Pitch for Broadcast Television," Computer, Mar. 2002, pp. 38-43 <http://www.trianglesoftware.com/pitch_tracking.htm>. Copy not provided; available in U.S. Appl. No. 14/556,762 to which priority is claimed.

CattleLog Pro, eMerge Interactive, Inc., Sebastian, FL, 2004. Copy not provided; available in U.S. Appl. No. 14/556,762 to which priority is claimed.

Marchant, J., "Secure Animal Indetification and Source Verification", JM Communications, UK, 2002. Copy not provided; available in U.S. Appl. No. 14/556,762 to which priority is claimed.

"A guide to Using NLIS Approved Ear Tags and Rumen Boluses", National Livestock Identification Scheme, Meat & Livestock Australia Limited, North Sydney, Australia, May 2003. Copy not provided; available in U.S. Appl. No. 14/556,762 to which priority is claimed.

King L., "NAIS Cattle ID Pilot Projects Not Needed, Since Proven Advanced Technology Already Exisits", ScoringSystem, Inc., Sarasota, FL, Dec. 27, 2005. (www.prweb.com/releases2005/12piweb325888.htm). Copy not provided; available in U.S. Appl. No. 14/556,762 to which priority is claimed.

"RFID in the Australian Meat and Livestock Industry", Allflex Australia Pty Ltd., Capalaba, QLD (AU), Data Capture Suppliers Guide, 2003-2004. Copy not provided; available in U.S. Appl. No. 14/556,762 to which priority is claimed.

Swedberg, Claire, "USDA Reseachers Develop System to Track Livestock Feeding Behavior Unobtrusively", RFID Journal, Jul. 18, 2013. Copy not provided; available in U.S. Appl. No. 14/556,762 to which priority is claimed.

Invitation to Pay Additional Fees/Partial International Search Report for PCT/IB2015/054099 dated Oct. 6, 2015. Copy not provided; available in U.S. Appl. No. 14/556,762 to which priority is claimed.

Swedberg, C., "N.J. Company Seeks to Market Passive Sensor RFID Tags," RFID Journal, Jun. 14, 2011, pp. 1-2 <http://www.rfidjournal.com/articles/pdf?8527>.

(56) References Cited

OTHER PUBLICATIONS

International Search Report and Written Opinion for International Application No. PCT/IB2015/054099 dated Dec. 9, 2015. Copy not provided; available in U.S. Appl. No. 14/556,762 to which priority is claimed.
U.S. Appl. No. 14/296,703, filed Jun. 5, 2014; In re: Alonso et al., entitle Method and Apparatus for Associating Radio Frequency Identification Tags with Participants. Copy not provided; available in U.S. Appl. No. 14/556,762 to which priority is claimed.
U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects." Copy not provided; available in U.S. Appl. No. 14/556,762 to which priority is claimed.
International Search Report and Written Opinion for International Application No. PCT/IB2015/059264 dated Feb. 10, 2016. Copy not provided; available in U.S. Appl. No. 14/556,762 to which priority is claimed.
Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331. Copy not provided; available in U.S. Appl. No. 14/556,762 to which priority is claimed.
International Search Report and Written Opinion for International Application No. PCT/US2015/034267 dated Sep. 25, 2015. Copy not provided; available in U.S. Appl. No. 14/556,762 to which priority is claimed.
International Search Report and Written Opinion for International Application No. PCT/IB2015/054103 dated Aug. 14, 2015. Copy not provided; available in U.S. Appl. No. 14/556,762 to which priority is claimed.
Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484. Copy not provided; available in U.S. Appl. No. 14/556,762 to which priority is claimed.
International Search Report and Written Opinion for International Application No. PCT/IB2015/054213 dated Aug. 6, 2015. Copy not provided; available in U.S. Appl. No. 14/556,762 to which priority is claimed.
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073. Copy not provided; available in U.S. Appl. No. 14/556,762 to which priority is claimed.
Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124. Copy not provided; available in U.S. Appl. No. 14/556,762 to which priority is claimed.
International Search Report and Written Opinion for International Application PCT/IB2015/054102 dated Nov. 4, 2015. Copy not provided; available in U.S. Appl. No. 14/556,762 to which priority is claimed.
"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>. Copy not provided; available in U.S. Appl. No. 14/556,762 to which priority is claimed.
Bahle et al., "I See You: How to Improve Wearable Activity Recognition by Leveraging Information from Environmental Cameras," Pervasive Computing and Communications Workshops, IEEE International Conference, (Mar. 18-22, 2013). Copy not provided; available in U.S. Appl. No. 14/556,762 to which priority is claimed.
Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010). Copy not provided; available in U.S. Appl. No. 14/556,762 to which priority is claimed.
Complaint before the United States District Court of Massachusetts, Civil Action No. 1:15-cv-12297, *Lynx System Developers, Inc. et al. V. Zebra Enterprise Solutions Corporation et al.*, filed Mar. 23, 2016. Copy not provided; available in U.S. Appl. No. 14/556,762 to which priority is claimed.
Defendant's Answer to Complaint before the United States District Court of Massachusetts, Civil Action No. 1:15-cv-12297. *Lynx System Developers, Inc et al. V. Zebra Enterprise Solutions Corporation et al.*, filed Apr. 6, 2016. Copy not provided; available in U.S. Appl. No. 14/556,762 to which priority is claimed.
International Search Report for International Application No. PCT/US2014/053647 dated Dec. 19, 2014. Copy not provided; available in U.S. Appl. No. 14/556,762 to which priority is claimed.
International Search Report and Written Opinion for International Application No. PCT/US2016/035614 dated Sep. 15, 2016. Copy not provided; available in U.S. Appl. No. 14/556,762 to which priority is claimed.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302. Copy not provided; available in U.S. Appl. No. 14/556,762 to which priority is claimed.

\* cited by examiner

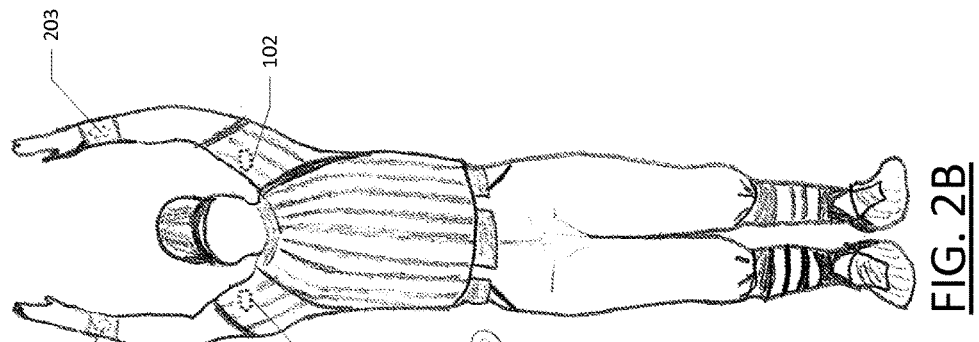
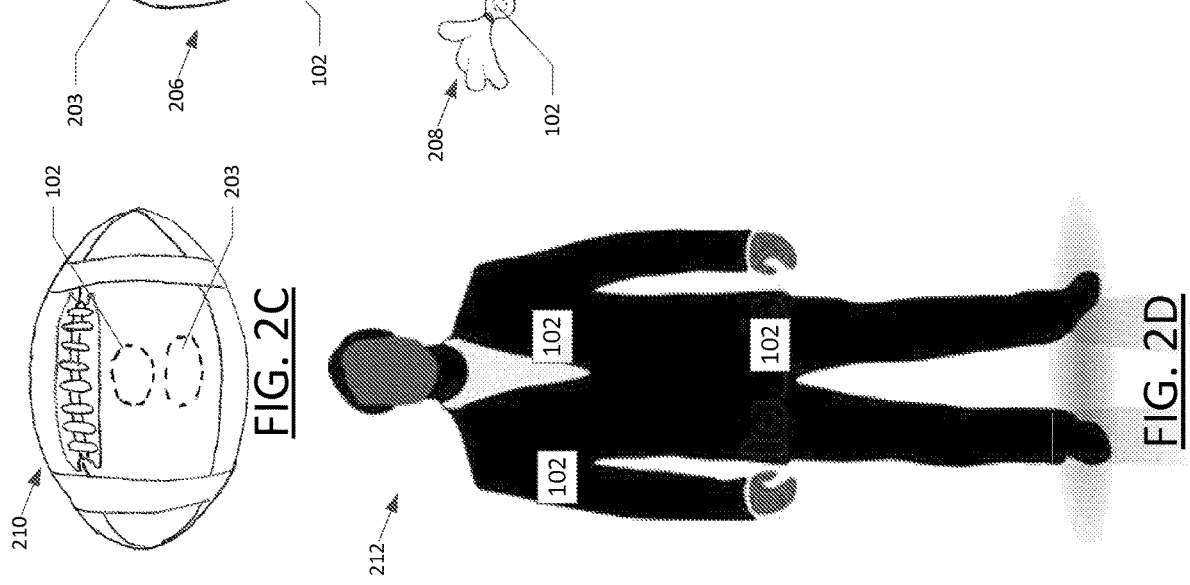
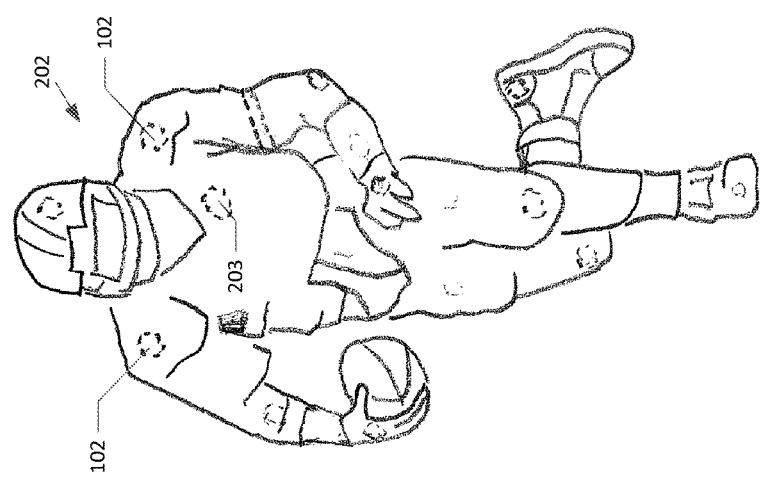
FIG. 2A  FIG. 2B  FIG. 2C  FIG. 2D

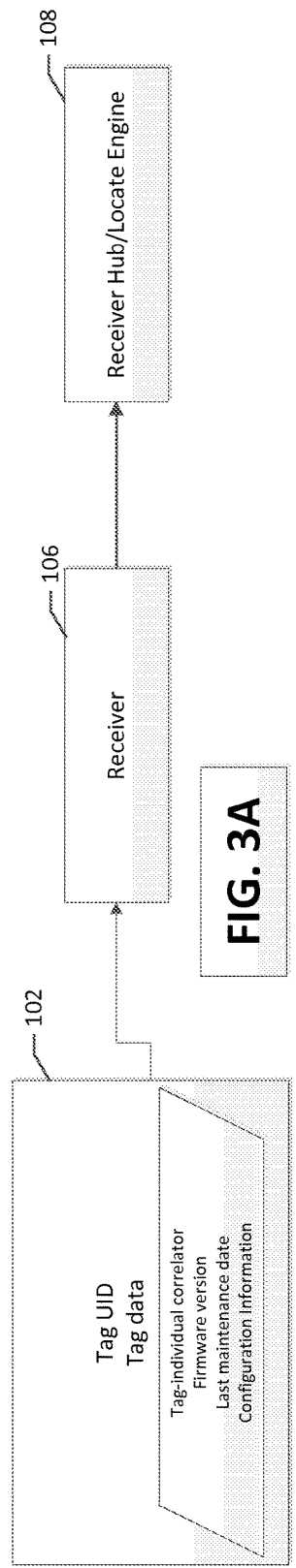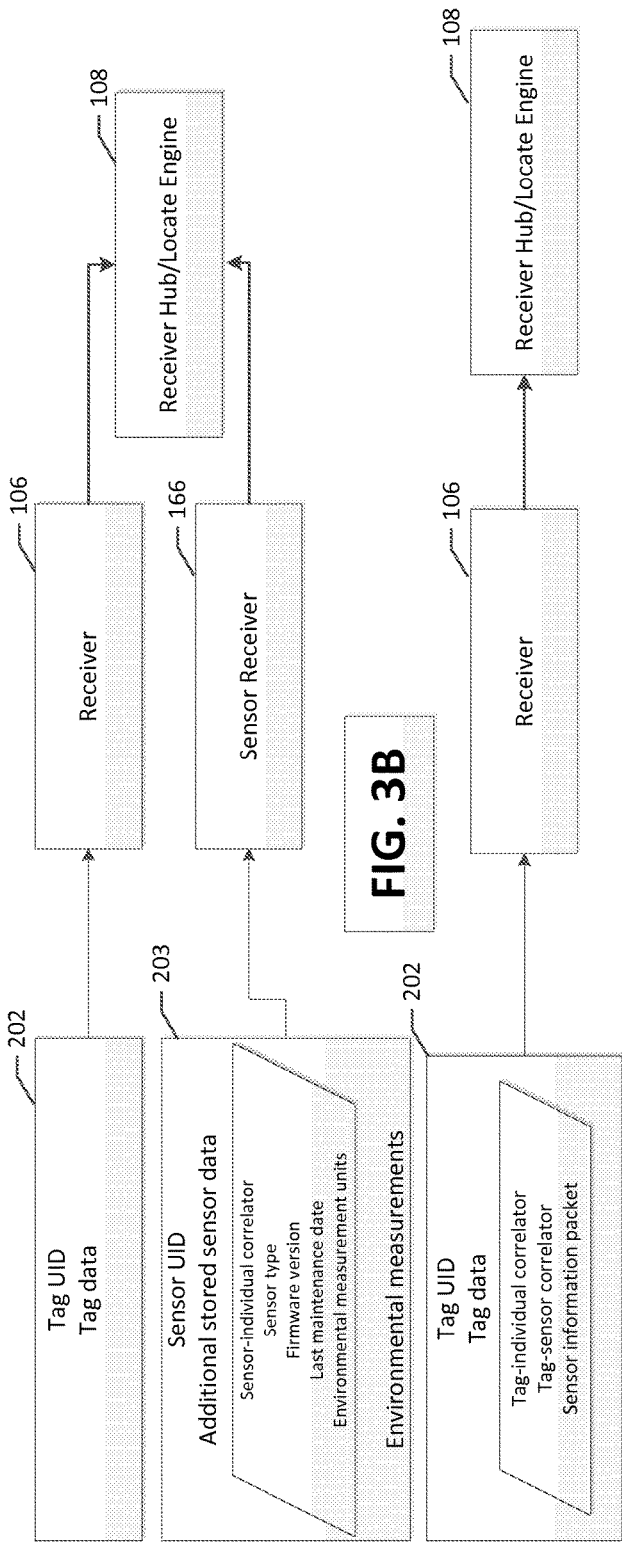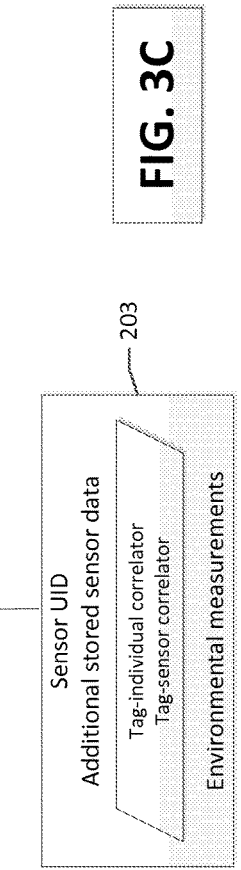
FIG. 3A
FIG. 3B
FIG. 3C

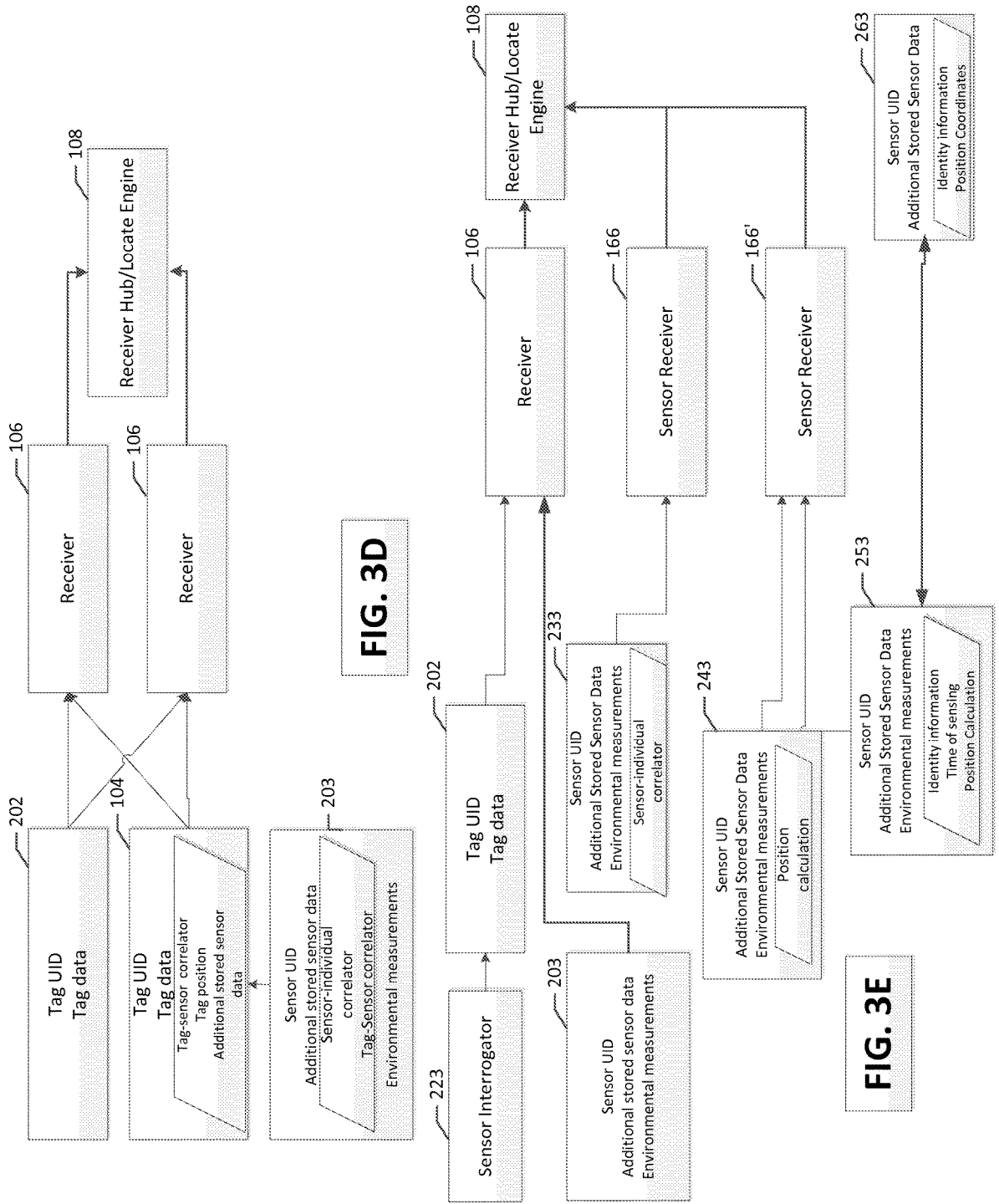

METHOD, APPARATUS, AND COMPUTER PROGRAM PRODUCT FOR ENHANCEMENT OF FAN EXPERIENCE BASED ON LOCATION DATA

CROSS-REFERENCE TO RELATED APPLICATIONS

This patent arises from a continuation of U.S. patent application Ser. No. 14/556,762, filed Dec. 1, 2014, which is a continuation-in-part of U.S. patent application Ser. No. 13/942,316, filed Jul. 15, 2013, which claims priority to U.S. Provisional Patent Application No. 61/831,990, filed Jun. 6, 2013, which are hereby incorporated herein by reference in their entireties.

FIELD OF INVENTION

Embodiments discussed herein are related to radio frequency locating and, more particularly, to systems, method, apparatuses, computer readable media and other means for providing enhanced services to a monitored individual based on location data.

BACKGROUND

Events such as concerts, sporting events, conventions, and the like may draw large numbers of fans, consumers, guests, patrons, or convention participants. Such individuals are subjected to long waits in lines to purchase merchandise, use event facilities, and utilized event services. Additionally, locating persons, facilities and services within a crowded environment such as a concert, sporting event, convention, or the like may be very difficult.

A number of deficiencies and problems associated with locating and servicing large numbers of fans, consumers, guests, patrons, or convention participants are identified herein. Through applied effort, ingenuity, and innovation, exemplary solutions to many of these identified problems are embodied by the present invention, which is described in detail below.

BRIEF SUMMARY

Systems, methods, apparatuses, and computer readable media are disclosed for providing real-time collection and analysis of monitored individual location, and providing enhanced experiences and services to such monitored individual using a locating system, such as a radio frequency locating system, as herein described.

In an embodiment of the present invention a method is provided including transmitting blink data comprising at least a tag unique identifier, receiving, at an application device, merchant information associated with tag location data determined based on the blink data, and displaying, via an interface of the application device, the merchant information.

In an example embodiment, the method also includes associating the tag unique identifier to the application device. In some example embodiments of the method, wherein the associating the tag unique identifier to the application device further comprises generating a tag-application device correlator and transmitting the tag-application device correlator. In an example embodiment, the method also includes receiving a selected merchant information indication and transmitting the selected merchant information in response to receiving the selected merchant information indication.

In some example embodiments, the method also includes receiving a merchant availability data, receiving a selected merchant availability data indication, and transmitting the selected merchant availability data in response to receiving the selected merchant availability data indication. In an example embodiment, the method also includes receiving transaction description data. In some example embodiments, the method also includes transmitting payment authorization data.

In an example embodiment, the method also includes receiving transaction confirmation data. In some example embodiments of the method, the merchant information comprises merchant service data. In an example embodiment of the method, the merchant information comprises merchant merchandise data. In some example embodiments of the method, the merchant availability data comprises merchant location.

In an example embodiment of the method, the merchant availability data comprises available services of a selected merchant based on the selected merchant information. In some example embodiments of the method, the merchant availability data comprises available merchandise of a selected merchant based on the selected merchant information. In an example embodiment of the method, transmitting payment authorization data further includes associating sensor data with the application device or tag, wherein the sensor data comprises payment authorization data.

In an example embodiment of the method, the sensor data is generated by a magnetic strip reader associated with the application device. In some example embodiments of the method, the sensor data is generated by a barcode reader associated with the application device. In an example embodiment of the method, the sensor data is generated by a radio frequency identification reader associated with the application.

In some example embodiments of the method, the payment authorization data comprises an account number. In some example embodiments of the method, payment authorization data comprises a personnel identifier.

In another example embodiment, a method is provided receiving blink data from a tag, calculating, using a processor, tag location data, wherein the tag location data is based on the blink data, correlating tag location data to merchant location data, and transmitting merchant information to an application device associated with the tag based on the tag location data and on the merchant location data.

In an example embodiment, the method also includes receiving a tag-application device correlator, and the transmitting merchant information is further based on the tag-application device correlator. In some example embodiments, the method also includes receiving blink data from a mobile merchant tag and calculating mobile merchant location data based on the blink data from the mobile merchant tag, the merchant location data comprises the mobile merchant location data.

In an example embodiment, the method also includes, receiving a selected merchant information indication, generating merchant availability data, and transmitting the merchant availability data. In some example embodiments, the method also includes receiving a selected merchant availability data indication, generating a service request based on the selected merchant information and selected merchant availability data, and transmitting the service request. In an example embodiment of the method, the generating a service request further comprises generating transaction description data, and the transaction description data is based on the service request.

In an example embodiment, the method also includes receiving payment authorization data associated with the transaction description data. In some example embodiments, the method also includes, generating a transaction confirmation data based on the service request and payment authorization data, and transmitting transaction confirmation data. In some example embodiments, the method also causing the transaction confirmation data to be stored in a memory. In an example embodiment of the method, the service request further comprises a customer location data, wherein the customer location data is based on the sensor data or the tag location data.

In an example embodiment, the method also includes receiving sensor position data, determining a position calculation data based on the sensor position data and the associating location data with merchant location data is further based on the determined position calculation data. In some example embodiments of the method, the merchant information comprises merchant service data. In an example embodiment of the method, the merchant information comprises merchant merchandise data.

In some example embodiments of the method, the merchant availability data comprises merchant location. In an example embodiment of the method, the merchant availability data comprises the available services of a merchant based on the selected merchant information. In some example embodiments of the method, the merchant availability data comprises the available merchandise of a merchant based on the selected merchant information. In an example embodiment of the method, payment authorization data comprises a sensor payment authorization data associated with the application device or tag, wherein the sensor payment authorization data comprises payment identification data.

In an example embodiment of the method, the payment identification data comprises a account number. In some example embodiments of the method, payment identification data comprises a personnel identifier.

In a further example embodiment, a method id provided including receiving blink data from a tag, calculating, using a processor, location data based on the blink data, receiving a location request from an application device, associating the location data with the location request, and transmitting the location data associated with the location request for receipt by the application device.

In an example embodiment, the method also includes transmitting available location data based on the location request, receiving an indication of a selected location data, wherein the selected location data based on the available location data and the transmitting location data is further based on the selected location data. In some example embodiments of the method, the location data is associated with personnel. In an example embodiment of the method the location data is associated with a fixed location. In some example embodiments of the method, the location data is associated with a mobile merchant.

In yet another example embodiment, a method is provided receiving, on an application device, a location request indication, transmitting the location request, receiving location data based on the location request, the location data is based on blink data received from at least one tag, and causing the location data to be displayed.

In an example embodiment, the method also includes receiving a selected location data indication and the causing the location data to be displayed comprises displaying selected location data. In some example embodiments, the method also includes receiving available location data based on the location request, the indication of selected location data is further based on the available location data, transmitting selected location data, and the location data is further based on the selected available location data.

In an example embodiment of the method, the location data is associated with personnel. In some example embodiments of the method, the location data is associated with a fixed location. In an example embodiment of the method, the location data is associated with a mobile merchant.

In still another example embodiment, a method is provided including receiving sensor data from an identification sensor, associating the sensor data with a tag, receiving blink data from the tag, calculating, using a processor, tag location data based on the blink data, and determining tag route data, wherein the tag route data based on the tag location data and on a secondary location data.

In an example embodiment, the method also includes transmitting a tag activation signal based on receiving sensor data from the identification sensor. In some example embodiments, the method also includes selecting the tag for location monitoring based on receiving sensor data from the identification sensor. In an example embodiment, the method also includes causing the tag route data to be displayed on a user interface. In some example embodiments, the method also includes causing the tag route data to be stored in a memory.

In an example embodiment, the method also includes determining experience enhancement data based on tag route data and transmitting experience enhancement data. In some example embodiments, the method also includes receiving historical route data and the experience enhancement data is further based on historical route data. In an example embodiment, the method also includes receiving historical transaction confirmation data and the experience enhancement data is further based on the historical transaction data. In some example embodiments, the method also includes receiving transaction description data, wherein the transaction description data is associated with the tag or sensor and the tag route data further comprises transaction description data.

In an example embodiment of the method, the secondary location data is associated with personnel. In some example embodiments of the method, the secondary location data is associated with a fixed location. In an example embodiment of the method, the fixed location comprises a merchant location. In some example embodiments of the method, the fixed location comprises a venue facility. In an example embodiment of the method, the secondary location data is associated with a mobile merchant.

In some example embodiments of the method, the experience enhancement data comprises location of personnel based on the tag location data and the secondary location data. In an example embodiment of the method, the experience enhancement data comprises alternate merchant location data or facility location data based on the tag location data and the tag route data. In some example embodiments, the method also includes receiving transaction description data, wherein the transaction description data is associated with the tag or sensor, the tag route data further comprises transaction description data, and the alternate merchant data or facility data is further based on transaction description data.

In an example embodiment, the method also includes receiving historical route data, the experience enhancement data is further based on historical route data, and the alternate merchant data or facility data is further based on historical route data. In some example embodiments, the method also includes receiving historical transaction description data, the experience enhancement data is further based on the historical transaction data and the alternate merchant data or facility data is further based on historical transaction data.

In another example embodiment a method is provided including associating a tag unique identifier with an application device, transmitting a tag application device correlator, and receiving experience enhancement data, wherein the experience enhancement data is determined based on tag location data, and wherein the tag location data is determined based on the blink data received from a tag associated with the tag identifier.

In some example embodiments of the method, the experience enhancement data comprises personnel location data, the personnel location data is based on secondary location data, and route proximate location data is based on the tag location data and on a secondary location data. In an example embodiment of the method, the experience enhancement data comprises alternate merchant location data, the alternate merchant location data is based on the tag location data and secondary location data. In some example embodiments of the method, the alternate merchant location data is further based on historical route data.

In an example embodiment of the method, the alternate merchant location data is further based on transaction description data associated with the tag. In some example embodiments of the method, the alternate merchant location data is further based on historical transaction data. In an example embodiment of the method, the experience enhancement data comprises alternate facility location data, the alternate facility location data is based on the tag location data and secondary location data.

In a further example embodiment, a method is provided including transmitting an application device identifier for associating an application device with a tag, receiving, on the application device, camera data generated by a camera control system, the camera data is generated by the camera control system based on location data associated with the tag.

In an example embodiment of the method, the location data is determined by a location service based on blink data transmitted by the tag. In some example embodiments of the method, the camera data is generated by the camera control module upon the camera control system receiving event occurrence data. In an example embodiment, the method also includes associating a tag unique identifier with an application device, transmitting a tag-application device correlator, wherein the tag-application device correlator is based on the association of the tag and the application device.

In some example embodiments, the method also includes receiving an event occurrence indication, and transmitting event occurrence data. In an example embodiment, the method also includes transmitting the camera data. In some example embodiments, the method also includes causing the camera data to be displayed on a user interface. In an example embodiment, the method also includes causing the camera data to be stored in a memory.

In some example embodiments of the method, the camera data comprises an image data. In an example embodiment of the method, the camera data comprises a video data.

In still further example embodiments, a method is provided including receiving an application device identifier associating an application device with a tag, receiving blink data from a tag, calculating a location data based on the blink data, receiving an event occurrence indication, determining, in a camera control module, a camera control data, the camera control data is based on the location data, and transmitting the camera control data.

In an example embodiment, the method also includes receiving event occurrence indication and the determining the camera control data is further based on the event occurrence. In some example embodiments, the method also includes receiving camera data based on the camera control data. In an example embodiment, the method also includes transmitting the camera data.

In some example embodiments, the method also includes causing the camera data to be displayed on a user interface. In an example embodiment, the method also includes causing the camera data to be stored in a memory. In some example embodiments, the method also includes receiving a tag-application device correlator, the transmitting camera data is based on the tag-application device correlator. In an example embodiment of the method, the camera data is an image data. In some example embodiments of the method, the camera data is a video data.

In yet another example embodiment, a method is provided including transmitting an application device identifier for association with a location tag, receiving camera data, receiving a camera data request, wherein the camera data request is based on a location data associated with the location tag and an event occurrence, the location data is based on the blink data, and transmitting camera data in response to the camera data request.

In some example embodiments, the method also includes associating a tag unique identifier with an application device, transmitting a tag-application device correlator, wherein the tag-application device correlator is based on the association between the tag and the application device, and the camera data request is further based on the tag-application device correlator. In an example embodiment of the method, the camera data is an image data. In some example embodiments of the method, the camera data is a video data.

In still another example embodiment a method is provided including receiving an application device identifier from an application device, associating an application device with a location tag, receiving blink data from a location tag, calculating, using a processor, a location data based on the blink data, receiving an event occurrence indication, generating, in a camera control module, a camera data request based on the location data and the event occurrence, transmitting a camera data request, and receiving camera data from an application device.

In some example embodiments, the method also includes receiving a tag-application device correlator and the associating an application device with a location tag is further based on the tag-application device correlator. In an example embodiment, the method also includes receiving an indication of camera data and the camera data request is further based on the indication of camera data. In some example embodiments, the method also includes causing the camera data to be displayed on a user interface.

In an example embodiment, the method also includes causing the camera data to be stored in a memory. In some example embodiments, the method also includes transmitting the camera data. In an example embodiment of the method, the camera data is an image data. In some example embodiments of the method, the camera data is a video data.

In an example embodiment, an apparatus is provided including at least one processor and at least one memory including computer program code, the at least one memory and computer program code configured to, with the processor, cause the apparatus to at least transmit blink data comprising at least a tag unique identifier, receive merchant information associated with tag location data determined based on the blink data, and display, via an interface, the merchant information.

In an example embodiment of the apparatus, the at least one memory and the computer program code are further configured to associate the tag unique identifier to the application device. In some example embodiments of the apparatus, the associating the tag unique identifier to the application device further comprises generating a tag-application device correlator and transmitting the tag-application device correlator. In an example embodiment of the apparatus, the at least one memory and the computer program code are further configured to receive a selected merchant information indication and transmit the selected merchant information in response to receiving the selected merchant information indication.

In some example embodiments of the apparatus, the at least one memory and the computer program code are further configured to receive a merchant availability data, receive a selected merchant availability data indication, and transmit the selected merchant availability data in response to receiving the selected merchant availability data indication. In an example embodiment of the apparatus, the at least one memory and the computer program code are further configured to receive transaction description data. In some example embodiments of the apparatus, the at least one memory and the computer program code are further configured to transmit payment authorization data.

In an example embodiment of the apparatus, the at least one memory and the computer program code are further configured to receive transaction confirmation data. In some example embodiments of the apparatus, the merchant information comprises merchant service data. In an example embodiment of the apparatus, the merchant information comprises merchant merchandise data. In some example embodiments of the apparatus, wherein the merchant availability data comprises merchant location. In an example embodiment of the apparatus, the merchant availability data comprises available services of a selected merchant based on the selected merchant information.

In some example embodiments of the apparatus, the merchant availability data comprises available merchandise of a selected merchant based on the selected merchant information. In an example embodiment of the apparatus, transmitting payment authorization data further comprises associating sensor data with the application device or tag, wherein the sensor data comprises payment authorization data. In some example embodiments of the apparatus, the sensor data is generated by a magnetic strip reader associated with the application device. In an example embodiment of the apparatus, the sensor data is generated by a barcode reader associated with the application device.

In some example embodiments of the apparatus, the sensor data is generated by a radio frequency identification reader associated with the application. In an example embodiment of the apparatus, the payment authorization data comprises an account number. In some example embodiments of the apparatus, payment authorization data comprises a personnel identifier.

In yet another example embodiment, an apparatus is provided including at least one processor and at least one memory including computer program code, the at least one memory and computer program code configured to, with the processor, cause the apparatus to at least receive blink data from a tag, calculate tag location data, wherein the tag location data is based on the blink data, correlate tag location data to merchant location data, and transmit merchant information to an application device associated with the tag based on the tag location data and on the merchant location data.

In some example embodiments of the apparatus, the at least one memory and the computer program code are further configured to receive a tag-application device correlator and the transmitting merchant information is further based on the tag-application device correlator. In an example embodiment of the apparatus, the at least one memory and the computer program code are further configured to receive blink data from a mobile merchant tag and calculate mobile merchant location data based on the blink data from the mobile merchant tag, the merchant location data comprises the mobile merchant location data.

In some example embodiments of the apparatus, the at least one memory and the computer program code are further configured to receive a selected merchant information indication, generate merchant availability data, and transmit the merchant availability data. In an example embodiment of the apparatus, the at least one memory and the computer program code are further configured to receive a selected merchant availability data indication, generate a service request based on the selected merchant information and selected merchant availability data, and transmit the service request.

In some example embodiments of the apparatus, the generating a service request further comprises generating transaction description data, wherein the transaction description data is based on the service request. In an example embodiment of the apparatus, the at least one memory and the computer program code are further configured to receive payment authorization data associated with the transaction description data. In some example embodiments of the apparatus, the at least one memory and the computer program code are further configured to generate a transaction confirmation data based on the service request and payment authorization data and transmit transaction confirmation data. In an example embodiment of the apparatus, the at least one memory and the computer program code are further configured to cause the transaction confirmation data to be stored in a memory.

In some example embodiments of the apparatus, the service request further comprises a customer location data, wherein the customer location data is based on the sensor data or the tag location data. In an example embodiment of the apparatus, the at least one memory and the computer program code are further configured to receive sensor position data, determine a position calculation data based on the sensor position data, and the associating location data with merchant location data is further based on the determined position calculation data.

In some example embodiments of the apparatus, the merchant information comprises merchant service data. In an example embodiment of the apparatus, the merchant information comprises merchant merchandise data. In some example embodiments of the apparatus, the merchant availability data comprises merchant location. In an example embodiment of the apparatus, the merchant availability data comprises the available services of a merchant based on the selected merchant information. In some example embodiments of the apparatus, the merchant availability data comprises the available merchandise of a merchant based on the selected merchant information.

In an example embodiment of the apparatus, payment authorization data comprises a sensor payment authorization data associated with the application device or tag, wherein the sensor payment authorization data comprises payment identification data. In some example embodiments of the apparatus, the payment identification data comprises an account number. In an example embodiment of the apparatus, payment identification data comprises a personnel identifier.

In still another example embodiment, an apparatus is provided including at least one processor and at least one memory including computer program code, the at least one memory and computer program code configured to, with the processor, cause the apparatus to at least receive blink data from a tag, calculate location data based on the blink data, receive a location request from an application device, associate the location data with the location request, and transmit the location data associated with the location request for receipt by the application device.

In an example embodiment of the apparatus, the at least one memory and the computer program code are further configured to transmit available location data based on the location request, receive an indication of a selected location data, wherein the selected location data based on the available location data, and the transmitting location data is further based on the selected location data. In some example embodiments of the apparatus, the location data is associated with personnel.

In an example embodiment of the apparatus, the location data is associated with a fixed location. In some example embodiments of the apparatus, the location data is associated with a mobile merchant.

In yet further example embodiments, an apparatus is provided including at least one processor and at least one memory including computer program code, the at least one memory and computer program code configured to, with the processor, cause the apparatus to at least receive a location request indication, transmit the location request, receive location data based on the location request, wherein the location data is based on blink data received from at least one tag, and cause the location data to be displayed.

In some example embodiments of the apparatus, the at least one memory and the computer program code are further configured to receive a selected location data indication and the causing the location data to be displayed comprises displaying selected location data. In an example embodiment of the apparatus, the at least one memory and the computer program code are further configured to receive available location data based on the location request, the indication of selected location data is further based on the available location data, transmit selected location data, and wherein the location data is further based on the selected available location data.

In some example embodiments of the apparatus, the location data is associated with personnel. In an example embodiment of the apparatus, the location data is associated with a fixed location. In some example embodiments of the apparatus, the location data is associated with a mobile merchant.

In another example embodiment, an apparatus is provided including at least one processor and at least one memory including computer program code, the at least one memory and computer program code configured to, with the processor, cause the apparatus to at least receive sensor data from an identification sensor, associate the sensor data with a tag, receive blink data from the tag, calculate tag location data based on the blink data, and determine tag route data, wherein the tag route data based on the tag location data and on a secondary location data. In some example embodiments of the apparatus, the at least one memory and the computer program code are further configured to transmit a tag activation signal based on receiving sensor data from the identification sensor.

In an example embodiment of the apparatus, the at least one memory and the computer program code are further configured to select the tag for location monitoring based on receiving sensor data from the identification sensor. In some example embodiments of the apparatus, the at least one memory and the computer program code are further configured to cause the tag route data to be displayed on a user interface. In an example embodiment of the apparatus, the at least one memory and the computer program code are further configured to cause the tag route data to be stored in a memory.

In some example embodiments of the apparatus, the at least one memory and the computer program code are further configured to determine experience enhancement data based on tag route data and transmit experience enhancement data. In an example embodiment of the apparatus, the at least one memory and the computer program code are further configured to receive historical route data and the experience enhancement data is further based on historical route data. In some example embodiments of the apparatus, the at least one memory and the computer program code are further configured to receive historical transaction confirmation data and the experience enhancement data is further based on the historical transaction data.

In an example embodiment of the apparatus, the at least one memory and the computer program code are further configured to receive transaction description data, wherein the transaction description data is associated with the tag or sensor and the tag route data further comprises transaction description data. In some example embodiments of the apparatus, the secondary location data is associated with personnel. In an example embodiment of the apparatus, the secondary location data is associated with a fixed location. In some example embodiments of the apparatus, the fixed location comprises a merchant location. In an example embodiment of the apparatus, the fixed location comprises a venue facility.

In some example embodiments of the apparatus, the secondary location data is associated with a mobile merchant. In an example embodiment of the apparatus, the experience enhancement data comprises location of personnel based on the tag location data and the secondary location data. In some example embodiments of the apparatus, the experience enhancement data comprises alternate merchant location data or facility location data based on the tag location data and the tag route data. In an example embodiment of the apparatus, the at least one memory and the computer program code are further configured to receive transaction description data, wherein the transaction description data is associated with the tag or sensor, the tag route data further comprises transaction description data, and the alternate merchant data or facility data is further based on transaction description data.

In some example embodiments of the apparatus, the at least one memory and the computer program code are further configured to receive historical route data, the experience enhancement data is further based on historical route data, and the alternate merchant data or facility data is further based on historical route data. In an example embodiment of the apparatus, the at least one memory and the computer program code are further configured to receive historical transaction description data, the experience enhancement data is further based on the historical transaction data and the alternate merchant data or facility data is further based on historical transaction data.

In yet another example embodiment, an apparatus is provided including at least one processor and at least one memory including computer program code, the at least one memory and computer program code configured to, with the processor, cause the apparatus to at least associate a tag unique identifier with an application device, transmit a tag application device correlator, and receive experience enhancement data, wherein the experience enhancement data is determined based on tag location data, and wherein the tag location data is determined based on the blink data received from a tag associated with the tag identifier.

In an example embodiment of the apparatus, the experience enhancement data comprises personnel location data, wherein the personnel location data is based on secondary location data, route proximate location data is based on the tag location data and on a secondary location data. In some example embodiments of the apparatus, the experience enhancement data comprises alternate merchant location data, wherein the alternate merchant location data is based on the tag location data and secondary location data.

In an example embodiment of the apparatus, the alternate merchant location data is further based on historical route data. In some example embodiments of the apparatus, the alternate merchant location data is further based on transaction description data associated with the tag. In an example embodiment of the apparatus, the alternate merchant location data is further based on historical transaction data. In some example embodiments of the apparatus, the experience enhancement data comprises alternate facility location data, wherein the alternate facility location data is based on the tag location data and secondary location data.

In another example embodiment an apparatus is provided including at least one processor and at least one memory including computer program code, the at least one memory and computer program code configured to, with the processor, cause the apparatus to at least transmit an application device identifier for associating an application device with a tag, receive camera data generated by a camera control system, the camera data is generated by the camera control system based on location data associated with the tag.

In some example embodiments of the apparatus, the location data is determined by a location service based on blink data transmitted by the tag. In an example embodiment of the apparatus, the camera data is generated by the camera control module upon the camera control system receiving event occurrence data. In some example embodiments of the apparatus, the at least one memory and the computer program code are further configured to associate a tag unique identifier with an application device and transmit a tag-application device correlator, wherein the tag-application device correlator is based on the association of the tag and the application device.

In an example embodiment of the apparatus, the at least one memory and the computer program code are further configured to receive an event occurrence indication and transmit event occurrence data. In some example embodiments of the apparatus, the at least one memory and the computer program code are further configured to transmit the camera data. In an example embodiment of the apparatus, the at least one memory and the computer program code are further configured to cause the camera data to be displayed on a user interface.

In some example embodiments of the apparatus, the at least one memory and the computer program code are further configured to cause the camera data to be stored in a memory. In an example embodiment of the apparatus, the camera data comprises an image data. In some example embodiments of the apparatus, the Camera data comprises a video data.

In still further embodiments, an apparatus is provided including at least one processor and at least one memory including computer program code, the at least one memory and computer program code configured to, with the processor, cause the apparatus to at least receive an application device identifier associating an application device with a tag, receive blink data from a tag, calculate a location data based on the blink data, receive an event occurrence indication, determine a camera control data, wherein the camera control data is based on the location data, and transmit the camera control data.

In some example embodiments of the apparatus, the at least one memory and the computer program code are further configured to receive event occurrence indication and the determining the camera control data is further based on the event occurrence. In an example embodiment of the apparatus, the at least one memory and the computer program code are further configured to receive camera data based on the camera control data.

In some example embodiments of the apparatus, the at least one memory and the computer program code are further configured to transmit the camera data. In an example embodiment of the apparatus, the at least one memory and the computer program code are further configured to cause the camera data to be displayed on a user interface. In some example embodiments of the apparatus, the at least one memory and the computer program code are further configured to cause the camera data to be stored in a memory.

In an example embodiment of the apparatus, the at least one memory and the computer program code are further configured to receive a tag-application device correlator, the transmitting camera data is based on the tag-application device correlator. In some example embodiments of the apparatus, the camera data is an image data. In an example embodiment of the apparatus, the camera data is a video data.

In a further example embodiment, an apparatus is provided including at least one processor and at least one memory including computer program code, the at least one memory and computer program code configured to, with the processor, cause the apparatus to at least transmit an application device identifier for association with a location tag, receive camera data, receive a camera data request, the camera data request is based on a location data associated with the location tag and an event occurrence, wherein the location data is based on the blink data, and transmit camera data in response to the camera data request.

In an example embodiment of the apparatus, the at least one memory and the computer program code are further configured to associate a tag unique identifier with an application device, transmit a tag-application device correlator, wherein the tag-application device correlator is based on the association between the tag and the application device the camera data request is further based on the tag-application device correlator. In some example embodiments of the apparatus, the camera data is an image data. In an example embodiment of the apparatus, the camera data is a video data.

In yet another example embodiment, an apparatus is provided including at least one processor and at least one memory including computer program code, the at least one memory and computer program code configured to, with the processor, cause the apparatus to at least receive an application device identifier from an application device, associate an application device with a location tag, receive blink data from a location tag, calculate a location data based on the blink data, receive an event occurrence indication, generate a camera data request based on the location data and the event occurrence, transmit a camera data request, and receive camera data from an application device.

In an example embodiment of the apparatus, the at least one memory and the computer program code are further configured to receive a tag-application device correlator and the associating an application device with a location tag is further based on the tag-application device correlator. In some example embodiments of the apparatus, the at least one memory and the computer program code are further configured to receive an indication of camera data and the camera data request is further based on the indication of camera data.

In an example embodiment of the apparatus, the at least one memory and the computer program code are further configured to cause the camera data to be displayed on a user interface. In some example embodiments of the apparatus, the at least one memory and the computer program code are further configured to cause the camera data to be stored in a memory. In an example embodiment of the apparatus, the at least one memory and the computer program code are further configured to transmit the camera data. In some example embodiments of the apparatus, the camera data is an image data. In an example embodiment of the apparatus, the camera data is a video data.

In a further example embodiment, a computer program product is provided including at least one non-transitory computer-readable storage medium having computer-executable program code portions stored therein, the computer-executable program code portions comprising program code instructions configured to transmit blink data comprising at least a tag unique identifier, receive merchant information associated with tag location data determined based on the blink data, and display, via an interface, the merchant information.

In an example embodiment of the computer program product, the computer-executable program code portions further comprise program code instructions configured to associate the tag unique identifier to the application device. In some example embodiments of the computer program product, the associating the tag unique identifier to the application device further comprises generating a tag-application device correlator and transmitting the tag-application device correlator. In an example embodiment of the computer program product, the computer-executable program code portions further comprise program code instructions configured to receive a selected merchant information indication and transmit the selected merchant information in response to receiving the selected merchant information indication.

In some example embodiments of computer program product, the computer-executable program code portions further comprise program code instructions configured to receive a merchant availability data, receive a selected merchant availability data indication and transmit the selected merchant availability data in response to receiving the selected merchant availability data indication. In an example embodiment of the computer program product, the computer-executable program code portions further comprise program code instructions configured to receive transaction description data. In some example embodiments of computer program product, the computer-executable program code portions further comprise program code instructions configured to transmit payment authorization data.

In an example embodiment of the computer program product, the computer-executable program code portions further comprise program code instructions configured to receive transaction confirmation data. In some example embodiments of the computer program product, the merchant information comprises merchant service data. In an example embodiment of the computer program product, the merchant information comprises merchant merchandise data. In some example embodiments of the computer program product, the merchant availability data comprises merchant location.

In an example embodiment of the computer program product, the merchant availability data comprises available services of a selected merchant based on the selected merchant information. In some example embodiments of the computer program product, the merchant availability data comprises available merchandise of a selected merchant based on the selected merchant information. In an example embodiment of the computer program product, transmitting payment authorization data further comprises associating sensor data with the application device or tag, the sensor data comprises payment authorization data. In some example embodiments of the computer program product, the sensor data is generated by a magnetic strip reader associated with the application device.

In an example embodiment of the computer program product, the sensor data is generated by a barcode reader associated with the application device. In some example embodiments of the computer program product, the sensor data is generated by a radio frequency identification reader associated with the application. In an example embodiment of the computer program product, the payment authorization data comprises an account number. In some example embodiments of the computer program product, payment authorization data comprises a personnel identifier.

In another example embodiment, a computer program product is provided including at least one non-transitory computer-readable storage medium having computer-executable program code portions stored therein, the computer-executable program code portions comprising program code instructions configured to receive blink data from a tag, calculate tag location data, wherein the tag location data is based on the blink data, correlate tag location data to merchant location data, and transmit merchant information to an application device associated with the tag based on the tag location data and on the merchant location data.

In some example embodiments of computer program product, the computer-executable program code portions further comprise program code instructions configured to receive a tag-application device correlator and the transmitting merchant information is further based on the tag-application device correlator. In an example embodiment of the computer program product, the computer-executable program code portions further comprise program code instructions configured to receive blink data from a mobile merchant tag and calculate mobile merchant location data based on the blink data from the mobile merchant tag, the merchant location data comprises the mobile merchant location data.

In some example embodiments of computer program product, the computer-executable program code portions further comprise program code instructions configured to receive a selected merchant information indication, generate merchant availability data, and transmit the merchant availability data. In an example embodiment of the computer program product, the computer-executable program code portions further comprise program code instructions configured to receive a selected merchant availability data indication, generate a service request based on the selected merchant information and selected merchant availability data, and transmit the service request. In some example embodiments of the computer program product, the generating a service request further comprises generating transaction description data, wherein the transaction description data is based on the service request.

In an example embodiment of the computer program product, the computer-executable program code portions further comprise program code instructions configured to receive payment authorization data associated with the transaction description data. In some example embodiments of computer program product, the computer-executable program code portions further comprise program code instructions configured to generate a transaction confirmation data based on the service request and payment authorization data and transmit transaction confirmation data. In an example embodiment of the computer program product, the computer-executable program code portions further comprise program code instructions configured to cause the transaction confirmation data to be stored in a memory.

In some example embodiments of the computer program product, the service request further comprises a customer location data, wherein the customer location data is based on the sensor data or the tag location data. In an example embodiment of the computer program product, the computer-executable program code portions further comprise program code instructions configured to receive sensor position data, determine a position calculation data based on the sensor position data, and the associating location data with merchant location data is further based on the determined position calculation data. In some example embodiments of the computer program product, the merchant information comprises merchant service data.

In an example embodiment of the computer program product, the merchant information comprises merchant merchandise data. In some example embodiments of the computer program product, the merchant availability data comprises merchant location. In an example embodiment of the computer program product, the merchant availability data comprises the available services of a merchant based on the selected merchant information. In some example embodiments of the computer program product, the merchant availability data comprises the available merchandise of a merchant based on the selected merchant information.

In an example embodiment of the computer program product, payment authorization data comprises a sensor payment authorization data associated with the application device or tag, wherein the sensor payment authorization data comprises payment identification data. In some example embodiments of the computer program product, the payment identification data comprises an account number. In an example embodiment of the computer program product, payment identification data comprises a personnel identifier.

In still further example embodiments, a computer program product is provided including at least one non-transitory computer-readable storage medium having computer-executable program code portions stored therein, the computer-executable program code portions comprising program code instructions configured to receive blink data from a tag, calculate location data based on the blink data, receive a location request from an application device, associate the location data with the location request, and transmit the location data associated with the location request for receipt by the application device.

In an example embodiment of the computer program product, the computer-executable program code portions further comprise program code instructions configured to transmit available location data based on the location request, receive an indication of a selected location data, wherein the selected location data based on the available location data, and the transmitting location data is further based on the selected location data. In some example embodiments of the computer program product, the location data is associated with personnel.

In an example embodiment of the computer program product, the location data is associated with a fixed location. In some example embodiments of the computer program product, the location data is associated with a mobile merchant.

In another example embodiment, a computer program product is provided including at least one non-transitory computer-readable storage medium having computer-executable program code portions stored therein, the computer-executable program code portions comprising program code instructions configured to receive a location request indication transmit the location request receive location data based on the location request, wherein the location data is based on blink data received from at least one tag, and cause the location data to be displayed.

In some example embodiments of computer program product, the computer-executable program code portions further comprise program code instructions configured to receive a selected location data indication and the causing the location data to be displayed comprises displaying selected location data. In an example embodiment of the computer program product, the computer-executable program code portions further comprise program code instructions configured to receive available location data based on the location request, the indication of selected location data is further based on the available location data, transmit selected location data, and the location data is further based on the selected available location data.

In some example embodiments of the computer program product, the location data is associated with personnel. In an example embodiment of the computer program product, the location data is associated with a fixed location. In some example embodiments of the computer program product, the location data is associated with a mobile merchant.

In yet a further example embodiment, a computer program product is provided including at least one non-transitory computer-readable storage medium having computer-executable program code portions stored therein, the computer-executable program code portions comprising program code instructions configured to receive sensor data from an identification sensor, associate the sensor data with a tag, receive blink data from the tag, calculate tag location data based on the blink data, and determine tag route data, the tag route data is based on the tag location data and on a secondary location data.

In some example embodiments of computer program product, the computer-executable program code portions further comprise program code instructions configured to transmit a tag activation signal based on receiving sensor data from the identification sensor. In an example embodiment of the computer program product, the computer-executable program code portions further comprise program code instructions configured to select the tag for location monitoring based on receiving sensor data from the identification sensor. In some example embodiments of computer program product, the computer-executable program code portions further comprise program code instructions configured to cause the tag route data to be displayed on a user interface.

In an example embodiment of the computer program product, the computer-executable program code portions further comprise program code instructions configured to cause the tag route data to be stored in a memory. In some example embodiments of computer program product, the computer-executable program code portions further comprise program code instructions configured to determine experience enhancement data based on tag route data and transmit experience enhancement data. In an example embodiment of the computer program product, the computer-executable program code portions further comprise program code instructions configured to receive historical route data and the experience enhancement data is further based on historical route data.

In some example embodiments of computer program product, the computer-executable program code portions further comprise program code instructions configured to receive historical transaction confirmation data and the experience enhancement data is further based on the historical transaction data. In an example embodiment of the computer program product, the computer-executable program code portions further comprise program code instructions configured to receive transaction description data, the transaction description data is associated with the tag or sensor and the tag route data further comprises transaction description data.

In some example embodiments of the computer program product, the secondary location data is associated with personnel. In an example embodiment of the computer program product, the secondary location data is associated with a fixed location. In some example embodiments of the computer program product, the fixed location comprises a merchant location. In an example embodiment of the computer program product, the fixed location comprises a venue facility.

In some example embodiments of the computer program product, the secondary location data is associated with a mobile merchant. In an example embodiment of the computer program product, the experience enhancement data comprises location of personnel based on the tag location data and the secondary location data. In some example embodiments of the computer program product, the experience enhancement data comprises alternate merchant location data or facility location data based on the tag location data and the tag route data.

In an example embodiment of the computer program product, the computer-executable program code portions further comprise program code instructions configured to receive transaction description data, wherein the transaction description data is associated with the tag or sensor, the tag route data further comprises transaction description data and the alternate merchant data or facility data is further based on transaction description data. In some example embodiments of computer program product, the computer-executable program code portions further comprise program code instructions configured to receive historical route data, the experience enhancement data is further based on historical route data, and the alternate merchant data or facility data is further based on historical route data.

In an example embodiment of the computer program product, the computer-executable program code portions further comprise program code instructions configured to receive historical transaction description data, the experience enhancement data is further based on the historical transaction data, and the alternate merchant data or facility data is further based on historical transaction data.

In still another example embodiment, a computer program product is provided including at least one non-transitory computer-readable storage medium having computer-executable program code portions stored therein, the computer-executable program code portions comprising program code instructions configured to associate a tag unique identifier with an application device, transmit a tag application device correlator, and receive experience enhancement data, the experience enhancement data is determined based on tag location data, and wherein the tag location data is determined based on the blink data received from a tag associated with the tag identifier.

In an example embodiment of the computer program product, the experience enhancement data comprises personnel location data, wherein the personnel location data is based on secondary location data, wherein route proximate location data based on the tag location data and on a secondary location data. In some example embodiments of the computer program product, the experience enhancement data comprises alternate merchant location data, wherein the alternate merchant location data is based on the tag location data and secondary location data. In an example embodiment of the computer program product, the alternate merchant location data is further based on historical route data.

In some example embodiments of the computer program product, the alternate merchant location data is further based on transaction description data associated with the tag. In an example embodiment of the computer program product, the alternate merchant location data is further based on historical transaction data. In some example embodiments of the computer program product, the experience enhancement data comprises alternate facility location data, wherein the alternate facility location data is based on the tag location data and secondary location data.

In another example embodiment, a computer program product is provided including at least one non-transitory computer-readable storage medium having computer-executable program code portions stored therein, the computer-executable program code portions comprising program code instructions configured to transmit an application device identifier for associating an application device with a tag receive camera data generated by a camera control system, wherein the camera data is generated by the camera control system based on location data associated with the tag.

In some example embodiments of the computer program product, the location data is determined by a location service based on blink data transmitted by the tag. In an example embodiment of the computer program product, the camera data is generated by the camera control module upon the camera control system receiving event occurrence data. In some example embodiments of computer program product, the computer-executable program code portions further comprise program code instructions configured to associate a tag unique identifier with an application device and transmit a tag-application device correlator, the tag-application device correlator is based on the association of the tag and the application device.

In an example embodiment of the computer program product, the computer-executable program code portions further comprise program code instructions configured to receive an event occurrence indication and transmit event occurrence data. In some example embodiments of computer program product, the computer-executable program code portions further comprise program code instructions configured to transmit the camera data. In an example embodiment of the computer program product, the computer-executable program code portions further comprise program code instructions configured to cause the camera data to be displayed on a user interface.

In some example embodiments of computer program product, the computer-executable program code portions further comprise program code instructions configured to cause the camera data to be stored in a memory. In an example embodiment of the computer program product, the camera data comprises an image data. In some example embodiments of the computer program product, the Camera data comprises a video data.

In an example embodiment, a computer program product is provided including at least one non-transitory computer-readable storage medium having computer-executable program code portions stored therein, the computer-executable program code portions comprising program code instructions configured to receive an application device identifier associating an application device with a tag, receive blink data from a tag, calculate a location data based on the blink data, receive an event occurrence indication, determine a camera control data, wherein the camera control data is based on the location data, and transmit the camera control data.

In some example embodiments of computer program product, the computer-executable program code portions further comprise program code instructions configured to receive event occurrence indication the determining the camera control data is further based on the event occurrence. In an example embodiment of the computer program product, the computer-executable program code portions further comprise program code instructions configured to receive camera data based on the camera control data.

In some example embodiments of computer program product, the computer-executable program code portions further comprise program code instructions configured to transmit the camera data. In an example embodiment of the computer program product, the computer-executable program code portions further comprise program code instructions configured to cause the camera data to be displayed on a user interface. In some example embodiments of computer program product, the computer-executable program code portions further comprise program code instructions configured to cause the camera data to be stored in a memory.

In an example embodiment of the computer program product, the computer-executable program code portions further comprise program code instructions configured to receive a tag-application device correlator and the transmitting camera data is based on the tag-application device correlator. In some example embodiments of the computer program product, the camera data is an image data. In an example embodiment of the computer program product, the camera data is a video data.

In yet another example embodiment, a computer program product is provided including at least one non-transitory computer-readable storage medium having computer-executable program code portions stored therein, the computer-executable program code portions comprising program code instructions configured to transmit an application device identifier for association with a location tag, receive camera data, receive a camera data request, the camera data request is based on a location data associated with the location tag and an event occurrence, wherein the location data is based on the blink data, and transmit camera data in response to the camera data request.

In an example embodiment of the computer program product, the computer-executable program code portions further comprise program code instructions configured to associate a tag unique identifier with an application device, transmit a tag-application device correlator, wherein the tag-application device correlator is based on the association between the tag and the application device, and the camera data request is further based on the tag-application device correlator. In some example embodiments of the computer program product, the camera data is an image data. In an example embodiment of the computer program product, the camera data is a video data.

In another example embodiment, a computer program product is provided including at least one non-transitory computer-readable storage medium having computer-executable program code portions stored therein, the computer-executable program code portions comprising program code instructions configured to receive an application device identifier from an application device, associate an application device with a location tag, receive blink data from a location tag, calculate a location data based on the blink data, receive an event occurrence indication, generate a camera data request based on the location data and the event occurrence, transmit a camera data request, and receive camera data from an application device.

In an example embodiment of the computer program product, the computer-executable program code portions further comprise program code instructions configured to receive a tag-application device correlator and the associating an application device with a location tag is further based on the tag-application device correlator. In some example embodiments of computer program product, the computer-executable program code portions further comprise program code instructions configured to receive an indication of camera data and the camera data request is further based on the indication of camera data. In an example embodiment of the computer program product, the computer-executable program code portions further comprise program code instructions configured to cause the camera data to be displayed on a user interface.

In some example embodiments of computer program product, the computer-executable program code portions further comprise program code instructions configured to cause the camera data to be stored in a memory. In an example embodiment of the computer program product, the computer-executable program code portions further comprise program code instructions configured to transmit the camera data. In some example embodiments of the computer program product, the camera data is an image data. In an example embodiment of the computer program product, the camera data is a video data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates an exemplary environment using a radio frequency locating system for providing performance analytics in accordance with some embodiments of the present invention;

FIGS. 2A-D illustrate some exemplary participants carrying tags and sensors that may provide information to a performance analytics system in accordance with some embodiments of the present invention;

FIGS. 3A-3E are block diagrams showing the input and output of receivers and sensor receivers in accordance with an example embodiment;

DETAILED DESCRIPTION

Figure 1:
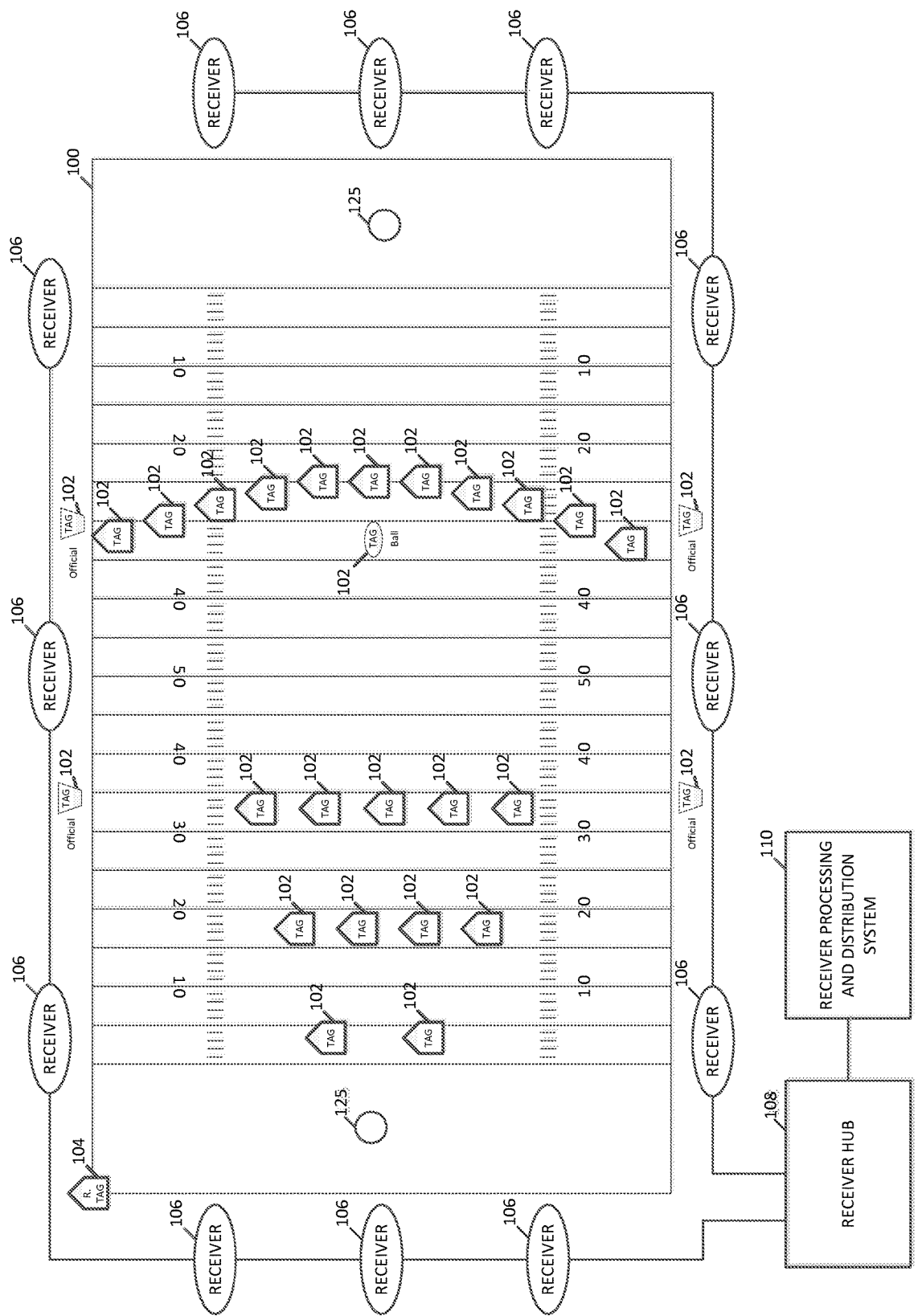

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Overview

Existing location systems are directed to monitoring and analyzing locations, movement patterns, and other parameters associated with monitored individuals at an event such as a sporting event, concert, convention, trade show, or other gathering of large numbers of individuals. The term "monitored individuals" refers collectively to patrons, participants, provider employees, venue employees, or other individuals who are equipped to carry location tags and/or sensors as described in detail below. The term "patrons" refers to consumers, sporting event fans, guests, trade show and/or convention participants. The term "participant" as used herein refers to players, officials, game related objects such as the ball, penalty markers, line of scrimmage and yard to gain markers, and any other movable object proximate a field of play in the context of a sporting event.

The term "venue" refers to the building, stadium, convention center, concert hall, or locale that is adapted to host a sporting event, concert, convention, trade show, or other gathering of large numbers of individuals. The term "venue employee" refers to non-merchant employees, contractors, or agents of the venue including, without limitation, ticketing service employees, security service employees, maintenance (e.g., custodial, repair, HVAC, etc.) employees, hospitality (e.g., luxury box services, VIP services, tailgate parties, etc.) employees, press or media service (e.g., reporters, photographers, social media, etc.) employees, team support service (e.g., scouting, HR, player safety, etc.) employees, logistics and delivery employees, entertainment service employees, weather information service employees, and parking service employees. The term "merchant" refers to any vendor, provider, or retailer that is positioned at the venue to service patrons. The term "mobile merchant" refers to merchants, or merchant employees, that are adapted to move around the venue among the patrons to offer goods or services.

Patrons watching or attending the event are not monitored for location data. Patrons may experience long waits in lines for various services, merchants, or facilities throughout the venue detracting from the value and enjoyment of the event.

In embodiments of the present invention a patron may avoid merchant line waits by selecting and/or paying for the services or merchandise in advance. The patron may associate an application device with a location tag or sensor position data (e.g. seat identifier). The application device may receive merchant information, such as the merchandise or services available based on the location of the patron from the location system. The patron may be able to select the merchandise and/or services desired from the merchant information and receive merchant availability such as a list of merchants, respective merchant locations and the services that each may provide from the selected merchandise or services.

The patron may select the merchant and services from the merchant availability list. The location system may generate a service request based on the selected merchant availability, including the service or merchandise requested, the location the service is to be rendered (e.g. merchant location or patron location), and transaction description data. The user may utilize the application device to transmit a payment authorization data or pay by conventional methods at the location of the service rendering. In an instance in which the application device is used to generate payment authorization data, the application device may generate the payment authorization data by receiving sensor data, such as a credit card magnetic strip, a bar code, an radio frequency identifier (RFID), or the like to identify a person or account associated with the payment and/or transaction. The location system may generate and transmit a transaction confirmation data based on the service request and payment/payment authorization data. The transaction confirmation data may be transmitted to the application device as a receipt, to reward program accounts, or account services at a credit card, or the like.

In some embodiments, the location system may include a sensor at venue entryways to identify patrons associated with location tags as they enter. The location system may have an exciter to cause the tag to commence transmission or the location system may use the sensor data to commence monitoring of the tag. The location system may determine the route the tag travels throughout the venue. The route may include the rate of travel, proximate locations of facilities, merchants, or other tagged patrons that the patron may have interacted and/or transaction data associated with the patron. The route data may be used to determine the flow of patrons throughout the venue for placement of advertisements, and merchants, high congestion areas or wait times for services or facilities. Additionally, the route data may be used to identify and change patron behavior. For example, the time the patron enters the venue and leaves may be associated with points, coming early and staying for the full event may earn more points, and lower congestion in specific venue areas. In another example, transactions occurring within a period that has lower sales may earn more points that transactions during peak times, cause the patron to experience shorter lines and equalize sales volumes over the event.

In some embodiments, the location system may send experience enhancement data to an application device associated with a patron based on the patron location, route data, historical route data, and transaction confirmation history. The location device may determine that the patron near or in route to a facility or merchant, such as a restroom or concession stand with long wait times and send a message containing the location of an alternate restroom or merchant. In another example, the location system may determine that the patron interacts with a facility or merchant on a consistent basis at high volume times. The location system may send a message containing the time period which are lower volume, such as between the top and bottom of the $6^{th}$ inning, rather than before the $7^{th}$ inning, in baseball. In another example, the location system may send merchant information based on the patron route data. For example. If the patron is proximate to a merchandise merchant or service merchant, allowing the patron to identify the services and merchandise in the area. Additionally, the patron could select and pay for the merchandise and service as described above, and simply retrieve the item from the merchant.

Locating persons, facilities, or services in a crowed venue may be very difficult. Triangulation positioning systems, such as GPS, on an application device, such as a smart phone, may not be functional indoors, and/or have limited accuracy. Describing location to other patrons using land marks may also prove problematic due to limited cellular coverage, or poor directions or descriptions.

In some embodiments, an application device may select and transmit a location request to the location system. The location system may associate location data with the location request and transmit the location data to the application device. The location data may be fixed locations that are programmed into the locations system, such as the location of restrooms, security, emergency services, information, service counters, or the like. Additionally, the location data may be mobile locations, such as another patron, a VIP, a group, a mascot, a mobile merchant, or venue employee (e.g. security guard/police, emergency management personnel, or the like.)

Capturing images or video of fans and patrons and/or the reactions to occurrences at an event is limited to the cameras controlled by personnel or by fixed location camera. These cameras only capture a small portion of the fans or patrons and capturing even fewer reactions.

In some embodiments, the location system may include a camera control module and the patron may be associated with a location tag or position data. The camera control module may control event cameras in order to capture video or images of patrons based on patron location and/or event occurrences. The camera control module may control the position and focus of cameras mounted throughout the venue. For example, the camera control module may cause one or more cameras to capture video or images of patrons in response to a touchdown, homerun, singer coming on stage, or upon request. Additionally or alternatively, the camera control module may capture images and video of patrons throughout the event.

Patrons of events such as concerts or sporting events frequently use application devices, such as smart phones, and tablet computers, to capture images and videos, which are uploaded to various social media cites and kept for a memorialization of the event. Event cameras may be limited in what they can capture due to limited number of cameras, placement, and where the cameras are pointed at a particular time.

In some embodiments, the location system may be configured with a camera control module which may request the camera data from the application devices in an area of interest. An area of interest may be a patron seating area near a tackle, touchdown, or stage. Additionally areas of interest may be determined for security and medical issues such as a fight or injury. The request for camera data from the application devices may be based on location data associated with the application device or patron and/or an event occurrence (e.g. area of interest). The application device may transmit the camera data to the location system in response to the request for camera data. The camera data may be used to display on venue display (e.g. JumboTron, closed circuit television, or the like), security, or transmitted to other patron application devices.

Embodiments of the present invention are illustrated in the appended figures and description below in relation to the sport of American football. However, as will be apparent to one of ordinary skill in the art in view of this disclosure, the inventive concepts herein described are not limited to football and may be applied to various other applications including, without limitation, other sports or group events such as baseball, basketball, golf, hockey, soccer, racing or motorsports, competitive events, concerts, conventions, and the like.

Example RF Locating System Architecture

FIGS. 1, 2A-2C, and 4 depict, for illustration purposes, various sporting event (i.e., football) participants (tagged players, a ball, and a referee). However, as will be apparent to one of ordinary skill in the art, the inventive concepts herein described are not limited to application to participants in sporting events and may be applied to other monitored individuals who may be present at a venue of interest.

FIG. 1 illustrates an exemplary locating system 100 useful for calculating a location by an accumulation of position data or time of arrivals (TOAs) at a central processor/Hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous –3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context.

Such a configuration advantageously satisfies constraints applied by regulatory bodies related to peak and average power densities (e.g., effective isotropic radiated power density ("EIRP")), while still optimizing system performance related to range and interference. In further examples, tag transmissions with a –3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a Central Processor/Hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a Central Processor/Hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the Central Processor/Hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the Central Processor/Hub 108 (e.g., the data cables may enable a transfer speed of 2 Mbps). In some examples, measurement data is transferred to the Central Processor/Hub at regular polling intervals.

As such, the Central Processor/Hub 108 determines or otherwise computes tag location (i.e., object position) by processing TOA measurements relative to multiple data packets detected by the receivers 106. In some example embodiments, the Central Processor/Hub 108 may be configured to resolve the coordinates of a tag using nonlinear optimization techniques.

In some examples, TOA measurements from multiple receivers 106 are processed by the Central Processor/Hub 108 to determine a position of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated position coordinates $(x_0, y_0, z_0)$ of the transmit tag 102 represents the measurement error for each respective TOA, and the minimization of the sum of the squares of the TOA measurement errors from each receiver participating in the DTOA position estimate provides for both the position coordinates $(x_0, y_0, z_0)$ of the transmit tag and of that tag's transmit time $t_0$.

In some examples, the system described herein may be referred to as an "over-specified" or "over-determined" system. As such, the Central Processor/Hub 108 may calculate one or more valid (i.e., most correct) positions based on a set of measurements and/or one or more incorrect (i.e., less correct) positions. For example, a position may be calculated that is impossible due the laws of physics or may be an outlier when compared to other calculated positions. As such one or more algorithms or heuristics may be applied to minimize such error.

The starting point for the minimization may be obtained by first doing an area search on a coarse grid of x, y and z over an area defined by the user and followed by a localized steepest descent search. The starting position for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\varepsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, $(x_j, y_j, z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_1$, as well as $t_0$, are related to a common time base, which in some examples, is derived from the arrival times. As a result, differences between the various arrival times have significance for determining position as well as $t_0$.

The optimization algorithm to minimize the error s in Equation 1 may be the Davidon-Fletcher-Powell (DFP) quasi-Newton algorithm, for example. In some examples, the optimization algorithm to minimize the error s in Equation 1 may be a steepest descent algorithm. In each case, the algorithms may be seeded with an initial position estimate (x, y, z) that represents the two-dimensional (2D) or three-dimensional (3D) mean of the positions of the receivers 106 that participate in the tag position determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively located at distances $d_{R_j}$ from a reference tag 104, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $T_R$. Upon receiving the signal burst from the reference tag, a count $N_{R_j}$ as measured at receiver $R_1$ is given in Equation 3 by:

$$N_{R_j} = \beta \tau_R + O_j + \beta d_{R_j}/c \quad (3)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta \tau_i + O_j + \beta d_{ij}/c \quad (4)$$

sat receiver $R_j$ where $d_{ij}$ the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{Rj}-d_{Rk}$ remains constant, (which means the receivers and reference tag are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{ij} - N_{ik} = (O_j - O_k) + \beta\left(\frac{d_{ij}}{c} - \frac{d_{ik}}{c}\right) = \Delta_{jk} + \beta\left(\frac{d_{ij}}{c} - \frac{d_{ik}}{c}\right) \quad (6a)$$

Or, $$d_{i_j} - d_{i_k} = (c/\beta)[N_{i_j} - N_{i_k} - \Delta_{j_k}] \quad (6b)$$

Each arrival time, $t_j$, can be referenced to a particular receiver (receiver "1") as given in Equation 7:

$$t_j = \frac{1}{\beta}(N_j - \Delta_{j1})$$

The minimization, described in Equation 1, may then be performed over variables (x, y, z, $t_0$) to reach a solution (x', y', z', $t_0$').

In some example embodiments, the location of a tag 102 may then be output to a receiver processing and distribution system 110 for further processing of the location data to advantageously provide visualizations, predictive analytics, statistics and/or the like.

The exemplary radio frequency locating system of FIG. 1 may be used in providing performance analytics in accordance with some embodiments of the present invention. In the environment of FIG. 1, data may be captured and analyzed, such as during a sporting event to identify event occurrences, statistics, and other data useful to a sports team, league, viewer, licensee, or the like. In some embodiments, data associated with a number of participants (e.g., players, officials, balls, game equipment, etc.) on a playing field, such as monitored area 100, may be generated and provided to a performance analytics system. As such, as further discussed in connection with FIGS. 2A-C below, each participant may have one or more attached tags 102 (such as to equipment worn by a player) to be used to track data such as location, change of location, speed, or the like of each object. In some embodiments, additional sensors, such as, without limitation, accelerometers, magnetometers, time-of-flight sensors, health sensors, temperature sensors, moisture sensors, light sensors, or the like, may be attached to each object to provide further data to the performance analytics system. Such additional sensors may provide data to the tag 102, either through a wired or wireless connection, to be transmitted to the receivers 106 or the sensors may be configured to transmit data to receivers (i.e., sensor receivers) separately from tags 102.

One or more of the receivers 106 may receive transmissions from tags 102 and transmit the blink data to a receiver hub 108. The receiver hub 108 may process the received data to determine tag location for the tags 102. The receiver hub 108 may transmit the tag location data to one or more processors, such as receiver processing and distribution system 110. Receiver processing and distribution system 110 may use one or more modules (e.g., processing engines) and one or more databases to identify the object each of the tags 102 is associated with, such as a player, official, ball, or the like.

In some embodiments, multiple tags 102 (as well as other sensors) may be attached to the equipment worn by participants. The receiver processing and distribution system 110 may use one or more databases to associate the tag identifier (e.g., a tag UID) of each tag 102 with each player, official, object, or other participant and correlate the tag location data and/or other tag and sensor derived data for multiple tags 102 that are associated with a particular player, official, object, or other participant.

As will be apparent to one of ordinary skill in the art, the inventive concepts herein described are not limited to use with the UWB based RF locating system shown in FIG. 1. Rather, in various embodiments, the inventive concepts herein described may be applied to various other locating systems especially those that are configured to provide robust location resolution (i.e., subfoot location resolution).

Example Tag/Sensor Positioning and Participant Correlation

FIG. 1 shows a monitored area 100. The monitored area 100 comprises a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location is a description of a position, or a plurality of positions, within the monitored area. For example, a field marker at the intersection of the south goal line and west out of bounds line at Bank of America Stadium in Charlotte, N.C. could be described as {0,0,0} in a local NED system, or 35.225336 N 80.85273 W longitude 751 ft. altitude on a latitude-longitude system, or simply "Panthers Goal Line" in a yard line system. Because different types of locating systems or different zones within a single locating system may use different coordinate systems, a Geographical Information System or similar monitored area database may be used to associate location data. One type of Geographical Information System describing at least a field of play may be called Field Data.

FIGS. 2A-C illustrate some exemplary participants that may provide information to a location system in accordance with some embodiments of the present invention. FIG. 2A illustrates a player 202 (e.g., a football player) wearing equipment having attached tags 102 in accordance with some embodiments. In particular, the depicted player 202 is wearing shoulder pads having tags 102 affixed to opposite sides thereof. This positioning advantageously provides an elevated broadcast position for each tag 102 thereby increasing its communication effectiveness.

Additional sensors 203 may be attached to equipment worn by player 202, such as accelerometers, magnetometers, time-of-flight sensors, health monitoring sensors (e.g., blood pressure sensors, heart monitors, respiration sensors, moisture sensors, temperature sensors), light sensors, or the like. The additional sensors 203 may be affixed to shoulder pads, the helmet, the shoes, rib pads, elbow pads, the jersey, the pants, a bodysuit undergarment, gloves, arm bands, wristbands, and the like.

Sensors 203 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps positioned in the helmet, which may transmit sensor data to one or more receivers.

FIG. 2B illustrates a game official 206 wearing equipment having attached tags 102 and sensors 203 in accordance with some embodiments. In the depicted embodiment, tags 102 are attached to the official's jersey proximate opposite shoulders. Sensors 203 are positioned in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2A.

As discussed in greater detail below, the positioning of sensors 203 (here, accelerometers) proximate the wrists of the official may allow the receiver processing and distribution system 110 to determine particular motions, movements, or activities of the official 206 for use in determining event occurrences (e.g., winding of the game clock, first down, touchdown, or the like). The official 206 may also carry other equipment, such as penalty flag 208, which may also have a tag 102 (and optionally one or more sensors) attached to provide additional data to the receiver processing and distribution system 110. For example, the receiver processing and distribution system 110 may use tag location data from the penalty flag 208 to determine when the official is merely carrying the penalty flag 208 versus when the official is using the penalty flag 208 to indicate an event occurrence, such as a penalty (e.g., by throwing the penalty flag 208).

FIG. 2C illustrates an example of a ball 210 having tags 102 attached or embedded in accordance with some embodiments. Additionally, sensors 203 may be attached to or embedded in the ball 210, such as accelerometers, time-of-flight sensors, or the like. In some embodiments, the sensor 203 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2A.

FIG. 2D illustrates an example patron 212 carrying one or more tags 102 and/or sensors (not shown) in accordance with some embodiments. The tag 102 and/or sensors may be preferably attached or carried at an elevated position, such as a shirt pocket, a ticket lanyard worn around the neck, or armband. In one embodiment, the tag 102 and/or sensor may be carried near waist level on a belt or in a pants pocket.

As will be apparent to one of ordinary skill in the art in view of this disclosure, once the tags 102 and sensors 203 of FIGS. 2A-D are positioned on monitored individuals (i.e., participants and patrons respectively), they may be correlated to such monitored individuals. For example, in some participant focused embodiments, unique tag or sensor identifiers ("unique IDs") may be correlated to a participant profile (e.g., John Smith—running back, Fred Johnson—line judge official, or ID 027—one of several game balls, etc.) and stored to a remote database accessible to the receiver processing and distribution system as discussed in greater detail below. In other embodiments, unique tag or sensor identifiers may be correlated to a patron profile (e.g., Frank Williams—season ticket holder) and stored to a remote database accessible to the receiver processing and distribution system.

Each monitored individual profile, perhaps depending on the type of monitored individual (i.e., participant, patron, venue employee, mobile merchant, etc.), may further include or be correlated with a variety of data including, but not limited to, biometric data (e.g., height, weight, health data, etc.), role data, team ID, performance statistics, employee number, license number, credit card information, employment data, inventory data, and other data that may be apparent to one of skill in the art in view of the foregoing description.

In some embodiments, such monitored individual profile data may be pre-defined and stored in association with the unique tag or sensor identifiers. In other embodiments, the monitored profile data may also be "learned" by the system as a result of received tag or sensor data, formation data, play data, event occurrence data, route data, transaction data, and/or the like. For example, in some embodiments the system may determine that a tag or sensor is not correlated to a monitored individual profile and may analyze data received from the tag and/or sensor to determine possible monitored individual roles, etc., which may be ranked and then selected/confirmed by the system or by a user after being displayed by the system. In some embodiments, the system may determine possible monitored individual roles (i.e., monitored individual role data) based on determined monitored individual location data (e.g., movement patterns, alignment position, etc.).

In some embodiments, as described in greater detail below, the monitored individual profile may also be updated by the system (i.e., to produce a data set for the monitored individual that is far more robust than that established at initial registration) as a result of received tag or sensor data, formation data, play data, event occurrence data, transaction data, and/or the like. In some embodiments, the monitored individual profile data may be used in by the receiver processing and distribution system to weight the actions of the monitored individuals during analysis to assist in qualifying what is occurring, such as in determining formations, plays, event occurrences, transactions, etc.

Tag ID and Sensor Data Transmission Architecture

FIGS. 3A, 3B, 3C, 3D, and 3E show block diagrams of various different architectures that may be utilized in transmitting signals from one or more tags and sensors to one or more receivers of a receiver processing and analytics system in accordance with embodiments of the invention. In some embodiments, the depicted architectures may be used in connection with the receiver processing and distribution system 110 of FIG. 1. As will be apparent to one of ordinary skill in the art in view of this disclosure, more than one of these architectures may be used together in a single system.

FIG. 3A shows a location tag 102, such as that shown in FIG. 1, which may be configured to transmit a tag signal to one or more receivers 106. The one or more receivers 106 may transmit a receiver signal to the receiver hub/locate engine 108.

The depicted location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator may comprise data that indicates that a monitored individual (e.g., participant, a patron, etc.) is associated with the location tag 102 (e.g., name, uniform number and team, biometric data, tag position on individual, i.e., right wrist, patron seat number, season ticket holder number, etc.). As will be apparent to one of skill in the art in view of this disclosure, the tag-individual correlator may be stored to the location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from location tag 102 to receiver 106 may include "blink data" as it is transmitted at selected intervals. This "blink rate" may be set by the tag designer or the system designer to meet application requirements. In some embodiments, the blink rate may be consistent for one or all tags. In other embodiments, the blink rate may be data dependent or dynamically changed for load balancing or power management purposes. Blink data includes characteristics of the tag signal that allow the tag signal to be recognized by the receiver 106 so the location of the RF location tag 102 may be determined by the locating system. Blink data may also comprise one or more tag data packets. Such tag data packets may include any data from the tag 102 that is intended for transmission such as, for example, in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a RF location tag 102 (e.g., a UWB tag).

The depicted receiver 106 receives the tag signal, which includes blink data and tag data packets as discussed above. In one embodiment, the receiver 106 may pass the received tag signal directly to the receive hub/locate engine 108 as part of its receiver signal. In another embodiment, the receiver 106 could perform some basic processing on the received tag signal. For instance, the receiver could extract blink data from the tag signal and transmit the blink data to the receive hub/locate engine 108. The receiver could transmit a time measurement to the receive hub/locate engine 108 such as a TOA measurement and/or a TDOA measurement. The time measurement could be based on a clock time generated or calculated in the receiver, it could be based on a receiver offset value, it could be based on a system time, and/or it could be based on the time difference of arrival between the tag signal of the location tag 102 and the tag signal of a reference tag (e.g., tag 104 of FIG. 1). The receiver 106 could additionally or alternatively determine a signal measurement from the tag signal (such as a received signal strength indication (RSSI), a direction of signal, signal polarity, or signal phase) and transmit the signal measurement to the receive hub/locate engine 108.

FIG. 3B shows a location tag 202 and sensor 203, such as those worn on an individual's person as shown in FIG. 2, which may be configured to transmit tag signals and sensor signals, respectively, to one or more receivers 106, 166. The one or more receivers 106, 166 may then transmit receiver signals to the receiver hub/locate engine 108. One or more receivers 106, 166 may share physical components, such as a housing or antenna.

The depicted location tag 202 may comprise a tag UID and tag data (such as a tag-individual correlator) and transmit a tag signal comprising blink data as discussed in connection with FIG. 3A above. The depicted sensor 203 may generate and/or store a sensor UID, additional stored sensor data (e.g., a sensor-individual correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a location tag 202, a reference tag (e.g., 104 of FIG. 1), a sensor receiver, a receiver 106, and/or the receiver/hub locate engine 108.

The sensor-individual correlator may comprise data that indicates that a monitored individual is associated with the sensor 203 (e.g., name, uniform number and team, biometric data, sensor position on individual, i.e., right wrist, patron seat number, season ticket holder number, etc.). As will be apparent to one of skill in the art in view of this disclosure, the sensor-individual correlator may be stored to the sensor 203 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 203 that are structured according to embodiments of the invention may sense or determine one or more environmental conditions (e.g., temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the depicted embodiment, location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to receiver hub/locate engine 108 as shown.

FIG. 3C depicts a sensor 203 communicating through a location tag 202 in accordance with various embodiments. In one embodiment, the sensor 203 may be part of (i.e., reside in the same housing or assembly structure) of the RF location tag 202. In another embodiment, the sensor 203 may be distinct from (i.e., not resident in the same housing or assembly structure) the location tag 202 but configured to communicate wirelessly or via wired communication with the location tag 202.

In one embodiment, the location tag 202, the sensor 203, or both, may generate and/or store a tag-sensor correlator that indicates an association between a RF location tag 202 and a sensor 203 (e.g., tag UID/sensor UID, distance from tag to sensor in a particular stance, set of sensors associated with a set of tags, sensor types associated with a tag, etc.). In the depicted embodiment, both the location tag 202 and the sensor 203 store the tag-sensor correlator.

In the depicted embodiment, sensor 203 transmits a sensor signal to location tag 202. The sensor signal may comprise one or more sensor information packets as discussed above. The sensor information packets may comprise the sensor UID, a sensor-individual correlator, additional stored sensor data, the tag-sensor correlator, and/or the environmental measurements. The location tag 202 may store some portion of, or all of, the sensor information packets locally and may package the sensor information packets into one or more tag data packets for transmission to receiver 106 as part of a tag signal or simply pass them along as part of its tag signal.

FIG. 3D illustrates an example communication structure for a reference tag 104 (e.g., reference tag 104 of FIG. 1), a location tag 202, a sensor 203, and two receivers 106 in accordance with one embodiment. The depicted reference tag 104 is a location tag and thus may include tag data, a tag UID, and is capable of transmitting tag data packets. In some embodiments, the reference tag 104 may form part of a sensor and may thus be capable of transmitting sensor information packets.

The depicted sensor 203 transmits a sensor signal to reference tag 104. The reference tag 104 may store some portion or some or all of the sensor information packets locally and may package the sensor information packets into one or more tag data packets for transmission to receiver 106 as part of a tag signal, or simply pass them along as part of its tag signal.

As was described above in connection with FIG. 1, the receivers 106 of FIG. 3D are configured to receive tag signals from the location tag 202 and the reference tag 104. Each of these tag signals may include blink data, which may comprise tag UIDs, tag data packets, and/or sensor information packets. The receivers 106 each transmit receiver signals via wired or wireless communication to the receiver hub/locate engine 108 as shown.

FIG. 3E illustrates an example communication structure between an RF location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of a location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from location tag 202 and a sensor signal directly from sensor 203. In such embodiments, sensor 203 may be configured to communicate in a communication protocol that is common to location tag 202 as will be apparent to one of ordinary skill in the art in view of this disclosure.

FIG. 3E depicts one type of sensor referred to herein as a "proximity interrogator". The proximity interrogator 223 can include circuitry operative to generate a magnetic, electromagnetic, or other field that is detectable by a location tag 202. While not shown in FIG. 3E, a proximity interrogator 223 may include a sensor UID and other tag and sensor derived data or information as discussed above.

In some embodiments, the proximity interrogator 223 is operative as a proximity communication device that can trigger a location tag 202 (e.g., when the location tag 202 detects the field produced by the proximity interrogator 223) to transmit blink data under an alternate blink pattern or blink rate. The location tag can initiate a preprogrammed (and typically faster) blink rate to allow more location points for tracking an individual. In some embodiments, the location tag may not transmit a tag signal until triggered by the proximity interrogator 223. In some embodiments the RF location tag 202 may be triggered when the location tag 202 moves near (e.g., within communication proximity to) a proximity interrogator 223. In some embodiments, the location tag may be triggered when the proximity interrogator 223 moves near to the location tag 202.

In other embodiments, the location tag 202 may be triggered when a button is pressed or a switch is activated on the proximity interrogator 223 or on the location tag itself. For example, a proximity interrogator 223 could be placed at the start line of a racetrack. Every time a car passes the start line, a car-mounted location tag 202 senses the signal from the proximity interrogator and is triggered to transmit a tag signal indicating that a lap has been completed. As another example, a proximity interrogator 223 could be placed at a Gatorade cooler. Each time a player or other participant fills a cup from the cooler a participant-mounted location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up a participant (e.g., a player) and move him/her to the locker room, a participant-mounted location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, it may generate and store a sensor-individual correlator for association with environmental measurements taken in connection with a specific individual. For example, in one embodiment, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-individual correlator as discussed above. The sensor receiver 166 may associate some or all of the data from the sensor information packets with other stored data in the sensor receiver 166 or with data stored or received from other sensors, diagnostic devices, location tags 102, or reference tags. The sensor receiver 166 transmits a sensor receiver signal to a receiver hub/locate engine 108.

Another type of sensor shown in FIG. 3E is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner (also known as a global positioning system (GPS) receiver) receives clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements.

In another embodiment, a triangulation positioner comprises one or more cameras or image-analyzers that receive emitted or reflected light or heat, and then analyzes the received images to determine the location of an individual or sensor. Although a triangulation positioner may transmit data wirelessly, it is not a location tag because it does not transmit blink data or a tag signal that can be used by a receiver hub/locate engine 108 to calculate location. In contrast, a triangulation positioner senses position and computes a position calculation that may then be used as environmental measurements by the receiver hub/locate engine 108.

In one embodiment, a triangulation positioner could be combined with a location tag or reference tag (not shown). In such embodiments, the triangulation positioner could compute and transmit its position calculation via the location tag to one or more receivers. However, the receiver hub/locate engine would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E is a proximity detector 253. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading a RFID tag such as a UHF tag, HF tag, or low frequency tag, an optical character recognition device, a biometric scanner, or a facial recognition system.

In some embodiments, a proximity detector senses an attribute of an individual (or an individual's wristband, tag, label, card, badge, clothing, uniform, costume, phone, ticket, etc.). The identity sensed by a proximity detector may be stored locally at the proximity detector 253 as shown and transmitted as environmental measurements via one or more sensor information packets to a sensor receiver 166.

In some embodiments, a proximity detector 253 may have a defined position, which is often stationary, and may be associated with a location in the monitored area 100 of FIG. 1. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 106, 166, the receiver hub/locate engine 108, and/or other components of the receiver processing and analytics system 110. In embodiments where the proximity detector is movable, a position calculation could be determined with a triangulation positioner, or the proximity detector could be combined with a location tag and located by the receiver hub/locate engine 108. While shown as separate fields for illustration purposes in FIG. 3E, identify information and position calculation could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to where it is needed. For example, a proximity detector 253 could be located on a medical cart, first down marker, a diagnostic device, goal post, or carried by a paramedic or security guard. In an embodiment where the proximity detector 253 is movable it would typically be associated with a location tag or triangulation positioner so that location (for a location tag) or position (for a triangulation positioner) can be determined at the time identity is sensed.

In the embodiment where the proximity detector includes a location tag, the receiver hub/locate engine 108 would locate the associated location tag, and the tag data/sensor data filter 112 would associate the tag location data for the associated location tag as the position of the proximity detector, while determining the identity of an associated individual from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub/locate engine 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub/locate engine 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, $I^2C$, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203), diagnostic devices 233, location tags 102, or reference tags 104. Such associated data is referred to herein as "associated sensor data". In the depicted embodiment, the sensor receiver 166' is configured to transmit some or all of the received sensor information packets and any associated sensor data to the receiver hub/locate engine 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub/locate engine 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub/locate engine 108. In another embodiment, the sensor receiver could determine a first time measurement associated with the first sensor information packet and a second time measurement associated with the second sensor information packet that, in conjunction with the sensor UID, could be used, by the receiver hub/locate engine 108, to associate the first sensor information packet with the second sensor information packet.

In one embodiment, the receiver hub/locate engine 108 receives receiver signals from the receiver 106 and sensor receiver signals from the sensor receivers 166, 166'. In the depicted embodiment, receiver 106 may receive blink data from the location tag 102 and transmits to the receiver hub/locate engine 108 some or all of the blink data, perhaps with additional time measurements or signal measurements. In some embodiments, time measurements or signal measurements may be based on a tag signal received from a reference tag (e.g., reference tag 104 of FIG. 1). The receiver hub/locate engine 108 collects the blink data, time measurements (e.g. time of arrival, time difference of arrival, phase), and/or signal measurements (e. g. signal strength, signal direction, signal polarization, signal phase) from the receivers 106 and computes tag location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub/locate engine 108 may also access stored data or clock data from local storage and from a network location. The receiver hub/locate engine 108 uses this information to determine tag location data for each RF location tag. It may also associate data derived or extracted from tag signals transmitted from one or more RF location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub/locate engine 108. Any RTLS system using location tags, including those described herein, could require considerable processing by the receiver hub/locate engine 108 to determine the tag location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted location tag 202 is used to convey (sometimes called backhaul) sensor information packets to a receiver 106. In some embodiments, while not shown, multiple sensors 203 may transmit sensor signals carrying sensor information packets to location tag 202. Such received sensor information packets may be associated with blink data that is transmitted to receiver 106.

In one embodiment, the receiver hub/locate engine 108 may parse sensor information packets from received tag data packets and associate such sensor information packets with the location tag 202 that transmitted the sensor information packet. Thus, the receiver hub/locate engine 108 may be able to determine tag location data, which may comprise a location and other data (e.g., tag data, tag UID, tag-individual correlator, sensor-individual correlator, additional stored sensor data, environmental measurements, tag-sensor correlator, identity information, position calculation, etc.) from one or more tags or sensors. Such data and information may be transmitted to the receiver processing and analytics system 110.

In some embodiments, once the receiver hub/locate engine 108 determines a location estimate of a location tag 102 at the time epoch of the tag signal, the receiver hub/locate engine 108 can also associate a location estimate with the tag data packet included in the blink data of such tag signal. In some embodiments, the location estimate of the tag signal may be used as tag location data for the tag data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub/locate engine 108 could parse the position calculation and use it to refine a location estimate for the tag data packet.

Preferably, the receiver hub/locate engine 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub/locate engine 108 may associate an individual with a sensor information packet received from a sensor, and/or may associate an individual with such sensor. Because the receiver hub/locate engine 108 may associate a sensor position estimate with a sensor information packet, the receiver hub/locate engine 108 may also estimate an individual position for the associated individual.

In another embodiment, by comparing data accessed using a tag-sensor correlator, the receiver hub/locate engine 108 may associate a sensor with a tag data packet received from a location tag 102. Because the receiver hub/locate engine 108 may associate a location estimate with a tag data packet, the receiver hub/locate engine 108 may also create a sensor location estimate for the associated sensor. By comparing a location estimate for a location tag with a sensor location estimate or a sensor position estimate, the receiver hub/locate engine 108 may associate a location tag with a sensor, or may associate a tag data packet with a sensor information packet. The receiver hub/locate engine 108 could also determine a new or refined tag-sensor correlator based on this association.

In still another embodiment, by comparing a location estimate for a location tag with an individual location estimate or an individual position estimate, the receiver hub/locate engine 108 may associate a location tag with an individual, or may associate a tag data packet with an individual. The receiver hub/locate engine 108 could also determine a new or refined tag-individual correlator based on this association.

In one embodiment, by comparing a location estimate for a sensor with an individual location estimate or an individual position estimate, the receiver hub/locate engine 108 may associate a sensor with an individual, or may associate a sensor information packet with an individual. The receiver hub/locate engine 108 could also determine a new or refined sensor-individual correlator based on this association.

Data derived or extracted from tag signals transmitted from one or more RF location tags is referred to herein as "tag derived data" and shall include, without limitation, tag data, tag UID, tag-individual correlator, tag-sensor correlator, tag data packets, blink data, time measurements (e.g. time of arrival, time difference of arrival, phase), signal measurements (e. g., signal strength, signal direction, signal polarization, signal phase) and tag location data (e.g., including tag location estimates). Tag derived data is not derived by the RF location tag, but rather, is derived from information transmitted by the RF location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data.

Data derived or extracted from stored individual data is referred to herein as "individual profile information", "participant profile information", "patron profile information" or simply "profile information" and shall include, without limitation tag-individual correlator, sensor-individual correlator, identity information, name, uniform number and team, biometric data, tag position on individual, patron seat number, payment information, season ticket holder number, and other similar information. In various embodiments, the receiver hub/locate engine 108 may transmit tag derived data, sensor derived data, individual profile information, various combinations thereof, and/or any information from the GIS, the field database, the monitored area database, and the individual database to the receiver processing and analytics system 110.

Example Receiver Hub and Receiver Processing and Distribution System

Figure 4:
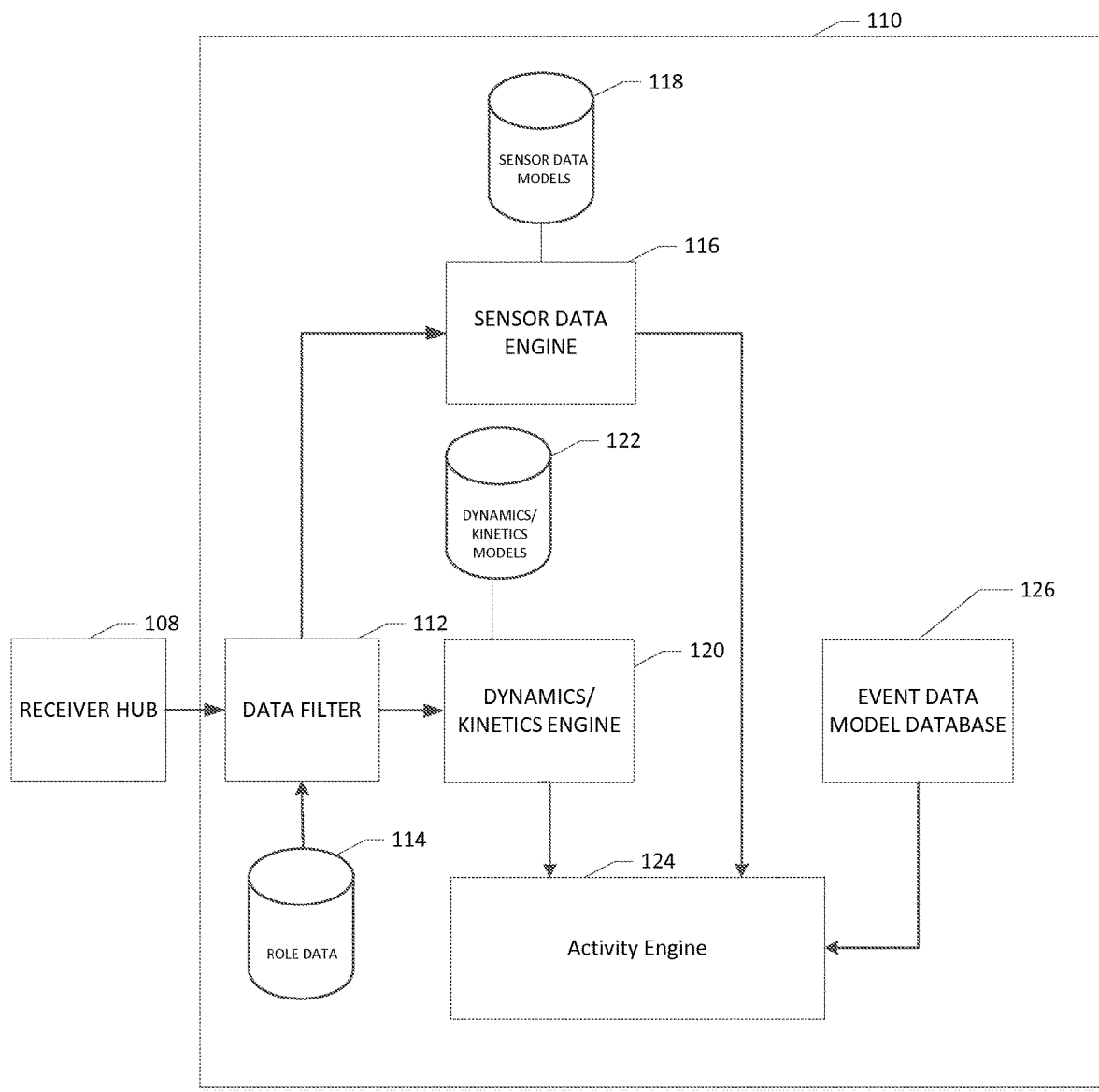
FIG. 4 illustrates an exemplary system for providing performance analytics in accordance with some embodiments of the present invention.

FIG. 4 shows a block diagram of an example receiver processing and analytics system 110, in accordance with some embodiments. Receiver hub 108 may be configured to receive data (e.g., tag derived data, sensor derived data, individual profile information, reference tag data, etc.) from one or more receivers 106. In some embodiments, receiver hub 108 may access or provide a data transmission link to each of one or more receivers 106 in succession and download data buffered in receivers 106 (e.g., as received by receivers 106 since receiver hub 108 last accessed the data at receivers 106).

Receiver hub 108 may further be configured to determine tag location data for each of RF location tags 102 by processing the TOA measurement data (and reference tag data, when applicable) received from receivers 106 and provide the tag location data to receiver processing and analytics system 110. In some embodiments, receiver processing and analytics system 110 may include data filter 112 configured to receive tag location data and/or sensor data from the receiver hub 108.

Data filter 112 may be configured to associate the location data and/or sensor data to a particular monitored individual using role database 114. Respective patrons, participants, merchant employees, venue employees, or other individuals who are equipped to carry location tags and/or sensors may be associated with identifying data (e.g., individual profile information) such as a unique identifier, name, role (e.g., a participant, a patron, a mobile merchant, or the like), identification number, seat number, or the like and the tag location data and/or sensor derived data may be associated with the identifying data. As such, role database 114 may be populated with information for RF location tags and/or sensors that are correlated to particular monitored individuals and/or with particular positions on monitored individuals where the tags/sensors are placed.

In some embodiments, the tags may be configured to transmit a tag identifier (e.g., tag UID) that may be associated with individual profile information, which includes, without limitation, tag placement data (i.e., tag position on individual), etc., in role database 114. In some embodiments, the RF location tags may transmit individual profile information or other identifying data and/or tag placement data rather than a tag identifier. In some embodiments, individual role database 114 may further include individual profile information that may be retrieved based on data from the tags, such as a tag identifier, individual identifying data and/or tag placement data. Alternatively and/or additionally, in some embodiments, reference body distance data may be stored in role database 114. Here, the tags may be configured to transmit tag identifiers that may be dynamically associated with a particular individual based on comparing determined body distance data calculated based on the locations of the RF location tags to reference body distance data of each individual being monitored. The reference body distance data, for example, may also be stored in role database 114.

In some embodiments, data filter 112 may be further configured to send tag location data, other tag derived data, and sensor derived data to respective engines configured to process each type of data. For example, tag location data may be sent to dynamics/kinetics engine 120 and sensor derived data may be sent to sensor data engine 116.

Sensor data engine 116 may be configured to receive the sensor derived data from data filter 112. Sensor data engine 116 may be configured to process the sensor derived data, such as proximity data, accelerometer data, proximity data, health sensor data, payment or transaction data, etc. For example, sensor data engine 116 may be configured to process proximity data to determine which NFC sensors are within near field communicable range, within close proximity, and/or in contact. Sensor data engine 116 may also process accelerometer data to determine accelerations of an associated individual. By locating accelerometers at various locations of interest on the individual (e.g., as shown in FIG. 3), sensor data engine 116 may estimate accelerations of individual body parts of an associated individual (e.g., seated, cheering, walking, etc.).

In some embodiments, sensor data engine 116 may be configured to access sensor data models database 118 to receive reference (e.g., historical and/or contextual) sensor data. For example, the reference sensor data may include reference proximity data indicating contextually significant proximity data. In other examples, reference proximity data may indicate a contextual significance of an individual coming into contact or proximity to a second individual or a location (e.g., a patron coming into transaction proximity with a fixed or mobile merchant). In that sense, sensor derived data and reference sensor data may be used to provide finer determination of activities than may be possible using only tag location data.

In some embodiments, sensor data engine 116 may be configured to aggregate the sensor derived data received from sensors over a period of time, such as over a play, a series of plays, a quarter, a football game, a convention, a concert, or other event occurring at a venue of interest. For example, aggregated proximity data may indicate individual transactions and movement patterns (e.g., individuals coming in proximity to merchants, mobile merchants, seat locations, etc.).

Receiver processing and analytics system 110 may be configured to monitor, track, and/or store the sensor data. For example, sensor data engine 116 may be configured to track aggregated proximity data, acceleration data and/or transaction data over time. In another example, sensor data engine 116 may be configured to provide sensor data of interest or contextual significance, such as to activity engine 124 or some other suitable computing device, such as a computing device and/or display device of a merchant, coach, venue manager, security official, or the like.

Dynamics/kinetics engine 120 may be configured to receive the tag location data from data filter 112. In general, dynamic/kinetics engine 120 may be configured to determine activity data for the individual based on the tag location data. For example, the activity data may indicate an action of the individual (e.g., walking, running, catching, jumping, tackling, carrying a ball, cheering, etc.), characteristics of the activity (e.g., speed, acceleration, movement path over time, tackling power, force of a hit, timing of a tackle, etc.), and/or the location of the individual with respect to the predetermined area (e.g., in-bounds, out-of bounds, in the end zone, outside of the end zone, past a first down marker, near a mobile merchant, near a fixed merchant, near a venue display, near another venue position, etc.).

In some embodiments, dynamics/kinetics engine 120 may further be configured to determine the activity data by comparing received tag location data with reference (e.g., historical and/or contextual) location data related to the individual and/or similarly situated individuals (e.g., other participants, other patrons, etc.). The reference location data may be stored in dynamics/kinetics models database 122 and may be generated from capturing data from one or more individuals equipped with tags or sensors. As such reference location data may be stored with an indication of an associated action. Additionally and/or alternatively, the reference location data may be input to dynamics/kinetics models database 122 via a user input device.

In some embodiments, dynamics/kinetics engine 120 and sensor data engine 116 may be configured to communicate with each other (and/or with activity engine 124) to determine the activity data of the individual. For example, dynamics/kinetics engine 120 may indicate that an individual is moving while sensor data engine 116 may indicate that the individual is passing a particular venue display. As such, the combination of tag location data and sensor derived data may indicate that the individual may be positioned to receive updated messaging via the venue display.

In some embodiments, receiver processing and analytics system 110 may further include activity engine 124. Activity engine 124 may be configured to determine collective activity data for a plurality of individuals (e.g., two or more individuals wearing tags 102 at a venue). For example, as to patrons at a sporting event (e.g., a football game), the collective activity data may comprise patron movement patterns relative to fixed merchant locations, mobile merchant locations, restrooms, security checkpoints, seating locations, and other venue locations of particular interest.

In another embodiment, the monitored individuals wearing tags 102 may be athletes participating in a sporting event such as football (i.e., on the football field shown at FIG. 1). For example, the collective activity data may indicate the activity of a first individual with respect to a second individual (e.g., a player being hit, chased, blocked, etc.) or characteristics of that data (e.g., force of a collision). In another example, the collective activity data may indicate a formation of the offense or defense, a particular play being executed, whether a receiver was shoved out of bounds, or any other event involving multiple individuals and having contextual significance. As such, dynamics/kinetics engine 120 may be configured to determine activity data for each the plurality of individuals and send the activity data to activity engine 124. Additionally and/or alternatively, sensor data engine 116 may be configured to send relevant sensor derived data of each individual to activity engine 124. For example, activity engine 124 may be configured to determine the force of a tackle on a ball carrier.

In some embodiments, activity engine 124 may be configured to determine the occurrence of a particular event. Some example event occurrences, in the context of football, may include a pass attempt, an incomplete pass, a completed pass, passing yardage, a tackle, a sack, an injury, an offside or false start, a late hit, stepping out of bounds, a rush attempt, yards per rush, presence or absence from the field for a particular play, a potential injury, etc. In some embodiments, activity engine 124 may be configured to receive one or more reference event occurrence data from the sensor data engine 116, the dynamics/kinetics engine 120, or other historical reference data database (not shown) that may be used for comparison to determine the occurrence of the event. In some embodiments, the activity engine 124 may be further configured to receive reference event occurrence data to determine the occurrence of the event, such as from event occurrence data model database 126. For example, the reference event occurrence data may include associations of activity data and sensor derived data that indicate event occurrences of contextual significance. Additional examples of determining an event may be found in U.S. Provisional Application 61/831,990, which is incorporated herein in its entirety.

In some embodiments, activity engine 124 may be configured to send event occurrence data indicating the determined event. The event occurrence data may be sent, for example, to a computing device or display device of an announcer, broadcast producer or technician (e.g., for a television broadcast), the coaching staff, medical staff, trainers, a camera control module or the like. For example, event occurrence data may be sent to a computing device configured to record and/or analyze statistics of individuals (e.g., number of catches, number of carries, yards per carry, number of tackles, number of sacks, etc.). In some embodiments, an alert may be sent in response to a determination of a pre-defined event occurrence, unexpected event occurrence, and/or abnormal event occurrence. For example, an alert may be sent upon determining the individual has been injured or is otherwise unfit to remain in the game. In another embodiment, an event occurrence determination may be sent to a camera control module to cause the camera to capture the event occurrence, patrons, patron reactions, or the like as discussed in FIGS. 11 and 19-22.

Example Embodiment of a Location System Deployed in a Venue Vending Area

Figure 5:
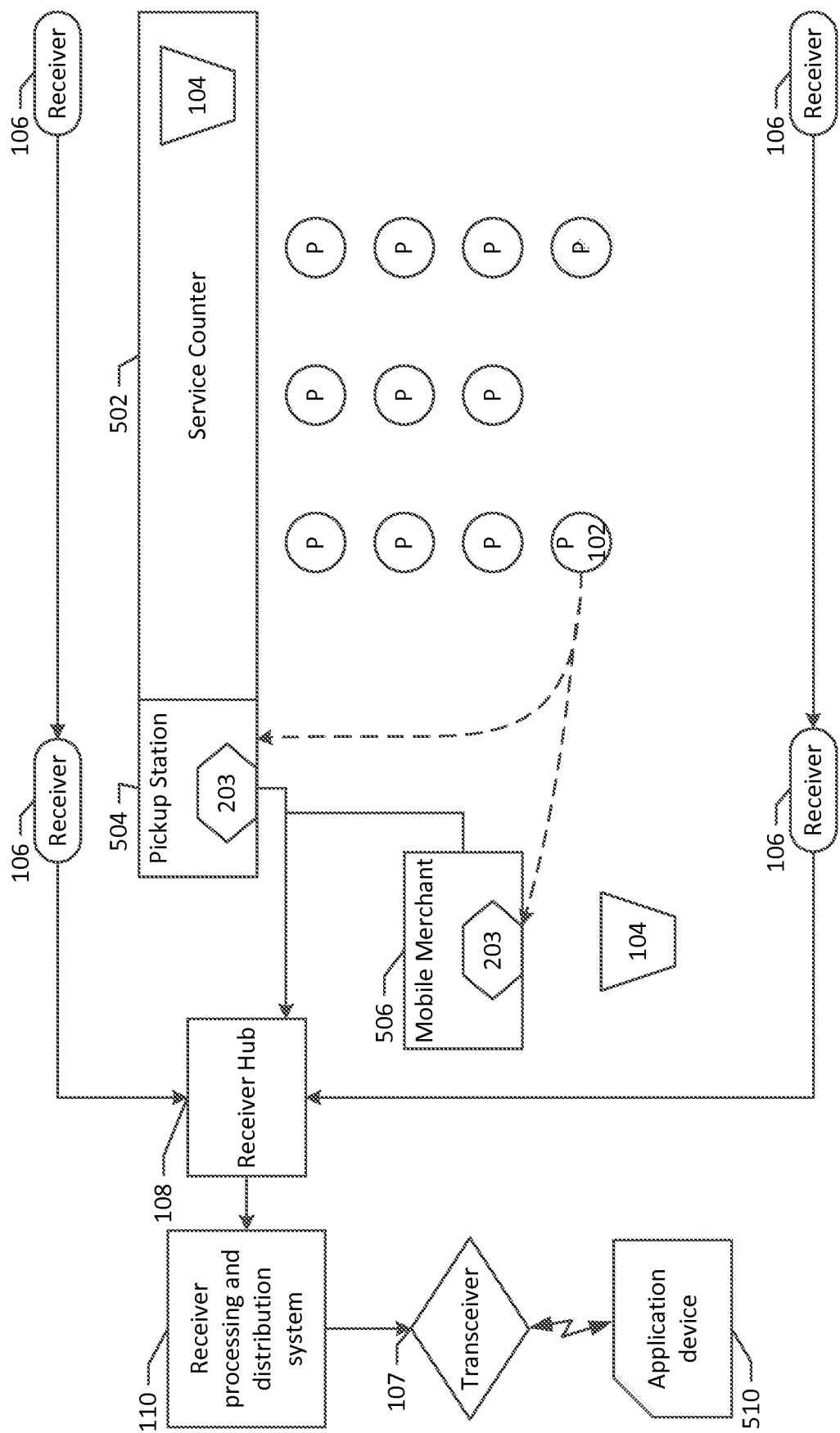
FIG. 5 illustrates an example embodiment of a locating system deployed in a venue vending area for patron experience enhancement in accordance with some embodiments of the present invention.

FIG. 5 illustrates an example embodiment of a locating system deployed in a venue vending area for patron experience enhancement. Although the examples illustrated in FIGS. 5-9 and 13-18 are drawn to merchant services, it would be apparent to one of ordinary skill in the art that these methods and apparatuses could be used for venue employees, such as ticketing service employees, security service employees, maintenance (e.g., custodial, repair, HVAC, etc.) employees, hospitality (e.g., luxury box services, VIP services, tailgate parties, etc.) employees, press or media service (e.g., reporters, photographers, social media, etc.) employees, team support service (e.g., scouting, HR, player safety, etc.) employees, logistics and delivery employees, entertainment service employees, weather information service employees, and parking service employees, and other monitored individuals. Additionally or alternatively, the methods and apparatus described herein could be used for security, emergency management, or the like.

In an example embodiment, patrons may avoid merchant line waits by selecting and/or paying for services or merchandise in advance. In this embodiment, the patron may be directed by the location system to an alternate location to pick up or otherwise receive the goods or services, without waiting in line. Additionally or alternatively, the location system may prompt the patron to use the system in an instance in which the location system determine that the patron is standing in a merchant line.

The location system may include one or more tags 102, reference tags 104, receivers 106, a receiver hub 108, a receiver processing and distribution system 110, a transceiver 107, one or more sensors 203, and an application device 510. The reference tags 104 may be permanently, semi-permanently, or temporarily mounted throughout the venue to provide reference locations for the location system as discussed in FIG. 1. Likewise, the receivers 106 may be permanently, semi permanently or temporarily mounted throughout the venue (e.g., patron seating areas, patron travel corridors, etc.) to provide sufficient coverage to calculate location data based on the tag blink data as discussed in FIG. 1.

A tag 102 may be assigned to a patron. The receiver hub 108 or receiver processing and distribution system 110 may associate the tag 102 (e.g., a tag UID) to the patron and calculate patron location data. Further, the patron may have an application device 510. In some embodiments, the application device 510 is associated with a tag UID. An application device may include a smart phone, personal data assistant (PDA), a tablet computer, laptop computer, or the like. In one embodiment, an application device may read a barcode, QR code or wireless communicate with a tag 102 to determine a tag-application device correlator. The tag-application device correlator may be transmitted by the application device 510 though Wi-Fi or cellular signals or associated in a database at registration. The tag-application device correlator may include a tag identifier, such as a tag UID and an application device identifier, such as an application device UID, a phone number, an IP address, or the like.

In an example embodiment, the application device 510 may include or be in communication with a sensor, such as the sensors 203 discussed in FIG. 3. The sensor 203 may include a barcode reader, QR code reader, a RFID reader, or a triangulation positioner, such as a GPS receiver. The sensor data generated may be associated with a venue position, such as a patron's seat, which may be derived from a barcode or QR code printed to a ticket or label positioned proximate the seat, or an RFID chip laminated into a label applied to the ticker or seat. The receiver hub 108 or receiver processing and distribution system 110 may, additionally or alternatively, determine position calculation data associated with the application device and/or tag.

The receiver hub 108 or receiver processing and distribution system 110 may be configured with location data for fixed merchants, such as concession stands, security offices, medical offices, information desks, meeting points, gates, or the like. Additionally, the receiver hub 108 or receiver processing and distribution system 110 may receive tag blink data from a tag 102 associated with a mobile merchant and may thus calculate location data of the mobile merchant. Mobile merchants may include roving vendors, cart vendors, or the like that are capable of moving throughout the venue.

Figure 7:
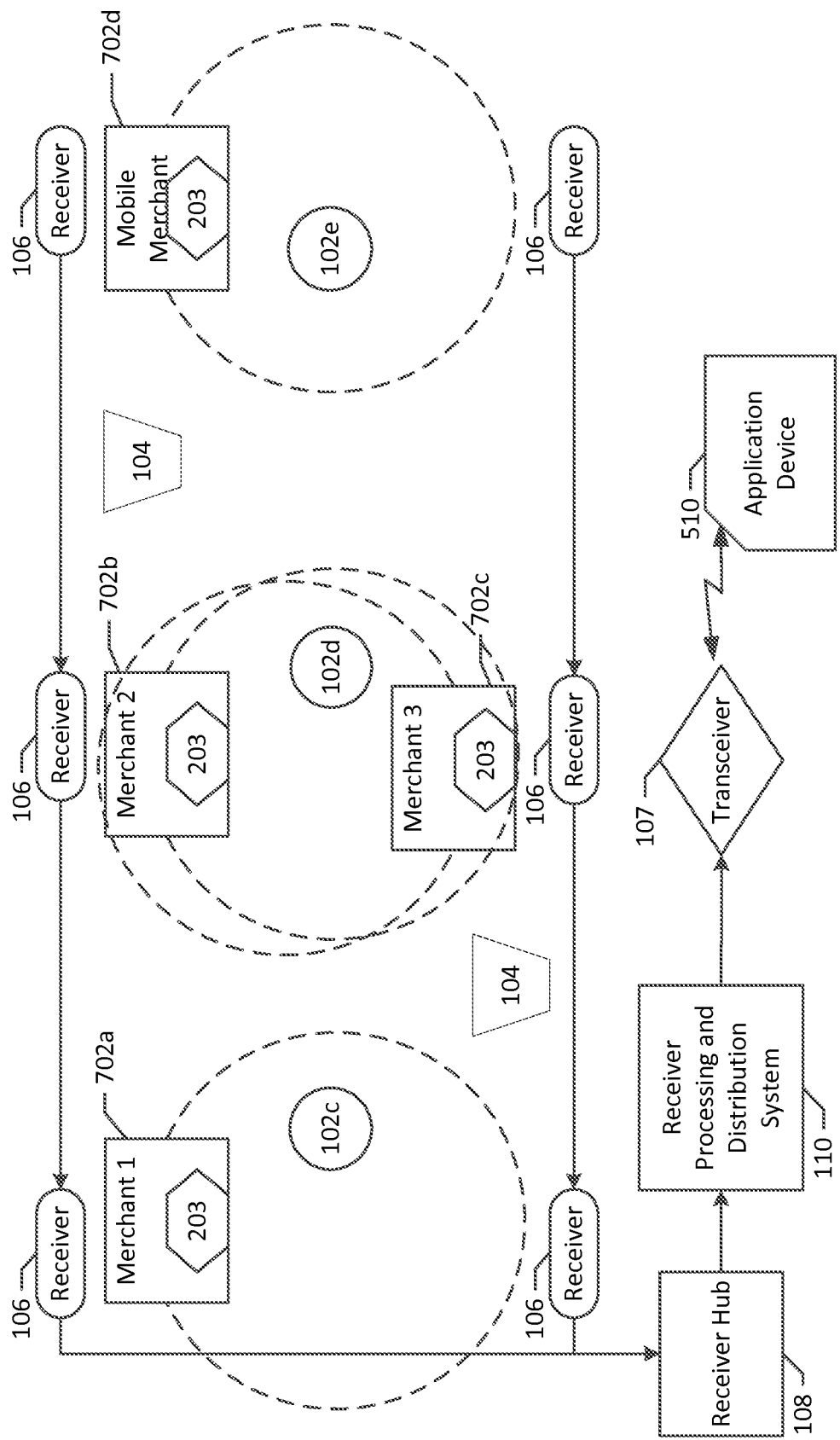
FIG. 7 illustrates an exemplary embodiment of the location system merchant proximity radii in accordance with some embodiments of the present invention.

The receiver hub 108 or receiver processing and distribution system 110 may associate the patron location data with a merchant location data. The association between the patron location data and the merchant location data may be based on proximity to the service merchant 502 location such proximate side of the venue, proximate section, proximate concourse, or a proximate radial distance, as shown in FIG. 7.

Figure 6B:
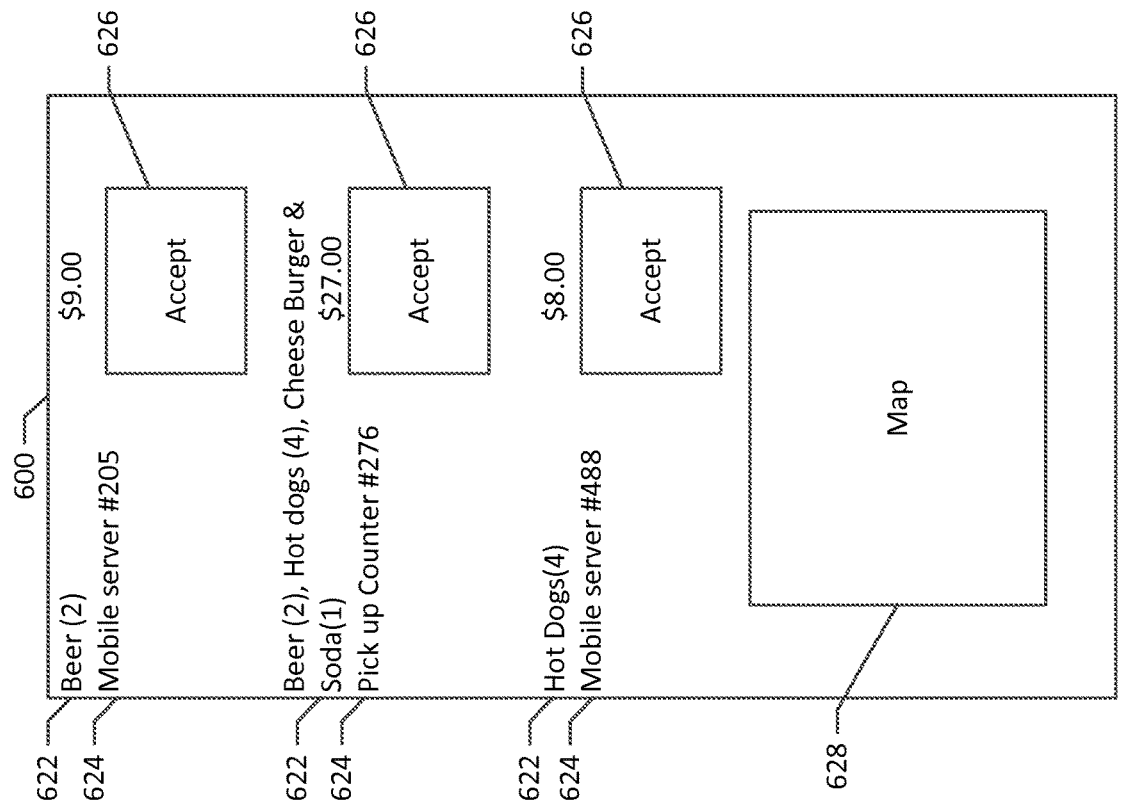
FIGS. 6a and 6b illustrate exemplary embodiments of merchant information and merchant availability displays in accordance with some embodiments of the present invention.
Figure 6A:
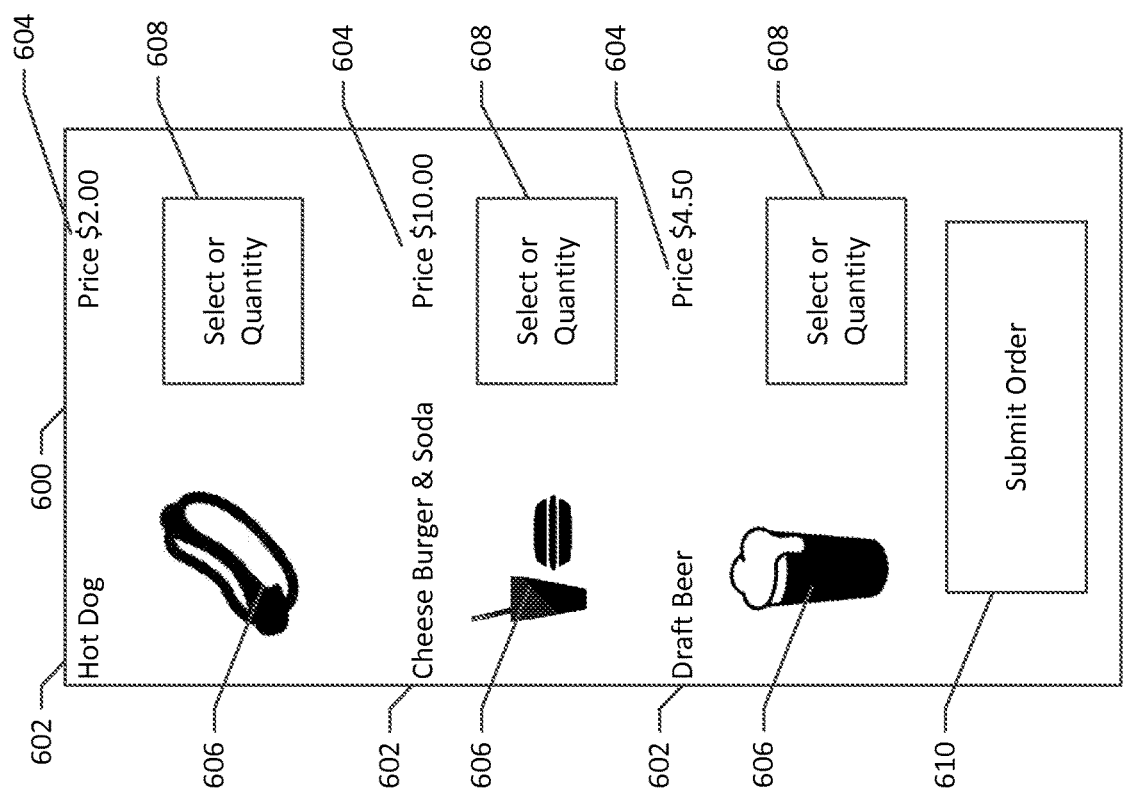

In response to the association of the patron location data and the merchant location data, the receiver hub 108 or the receiver processing and distribution system 110 may designate merchant information and transmit the merchant information to an application device 510 associated with the patron. Merchant information may include merchandise available for purchase, such as food, memorabilia, tickets to other events, or the like. Merchant information may also include services such as security, information, emergency services, restroom information (e.g., location information, maintenance information), or the like. The application device 510 may receive and display the merchant information on a user interface. For example, the merchant information may be food services. The merchant information may display various foods available for purchase, such as hotdogs, cheese burger and soda combo, and beer as shown in FIG. 6a. Other example merchant information may include pretzels; jerseys, mini helmets, towels, pictures, security services, medical services, information desk locations, or the like.

The patron may select services, merchandise, and/or quantity using the user interface of the application device 510. The application device 510 may receive the selected merchant information indication from the user interface and transmit such indication to the receiver hub 108 or receiver processing and distribution system 110. The receiver hub 108 or receiver processing and distribution system 110 may generate merchant availability data based on the received selected merchant information indication. The generated merchant availability data may identify merchants and services that satisfy the selected merchant information. For example, in an instance in which the selected merchant information is 2 beers, 4 hotdogs, and 1 cheeseburger and soda combo, the merchant availability data may identify one merchant that has one hand 2 beers, a second merchant that has on hand 2 beers, 4 hotdogs, and the 1 cheeseburger and soda combo, and a third merchant that has on hand 4 hotdogs, as shown in FIG. 6b. Other example selected merchant information indications may represent patron inquiries associated with merchandise, such as a jersey and a mini helmet, security requests, or the like.

In one embodiment, the merchant availability data may further include location data for each merchant. The receiver hub 108 or receiver processing and distribution system 110 may transmit the merchant availability data to the application device through Wi-Fi, cellular signals, or the like.

The application device 510 may receive the merchant availability data from the receiver hub 108 or receiver processing and distribution system 110 and display the merchant location data on a user display. In an example embodiment, the merchant location data may be displayed in a merchant availability location rendering or map. The patron may determine which of the merchant availability data is most desirable and select the associated merchant availability data. For example, the patron may determine that the merchant providing the 2 beers, 4 hotdogs, and the cheeseburger and soda combo is too far away, such as a service counter 502, and select one or both of the merchant availability data associated with the 4 hotdogs and/or 2 beers, which may be closer and/or a mobile merchant 506. In other examples the selected merchant availability data may be the closest security guard, or EMT, or the souvenir shop for the jersey and mini helmet, or a roving merchandise vender for the jersey only. The application device may transmit a selected merchant availability data to the receiver hub 108 or receiver processing and distribution system 110.

The receiver hub 108 or receiver processing and distribution system 110 may receive the selected merchant availability indication, indicating the merchant selected to provide the selected merchant information data, and generate a service request. A service request may include a transaction description data based on the selected merchant availability data, and the merchant location data, such as a pick up station 504 or mobile merchant 506 or a patron location data. Transaction description data may include selected merchant information, e.g. service or merchandise, the selected merchant, the price associated with the transaction, or the like. For example, merchant #279, 4 hotdogs, 2 beers, and a cheeseburger and soda combo; $27.00; the merchant location data for the concession stand pickup station; and Jon Caston or Seat #175. The receiver hub 108 or receiver processing and distribution system 110 may transmit the service request to the application device 510 using Wi-Fi, Cellular signals, or the like. Additionally the receiver hub 108 or receiver processing and distribution system 110 may transmit the service request to a mobile merchant 506 or pick up station 504 computing device or application device 510 by wired or wireless communication.

The pickup station 504 and/or the mobile merchant 506 may receive the service request on an application device 510 or computing system. The service merchant at the pickup station 504 or mobile merchant 506 may prepare the requested service in accordance with the service request transaction description data. In an instance in which the service request is received by a mobile merchant 506, the mobile merchant may deliver the requested service to the patron location based on the patron location data.

The application device 510 may receive the service request. The application device may display the transaction description data. The pricing information may be displayed with an option to make a payment. The application device 510 may be used to generate payment authorization data. The payment authorization data may include account data, personal data, or the like for identification of the proper person and funds to take payment. In an example embodiment, the application device 510 may have pre-stored payment authorization data or allow the payment authorization data to be entered using a user interface, for example entering a credit card information.

In an example embodiment, the application device 510 may be configured in communication with a sensor, such as a barcode reader, QR code reader, magnetic strip reader, RFID reader, or the like. The application device 510 may receive sensor data comprising a payment authorization data. For example, the application device may read the magnetic strip on a credit card or rewards card, or an RFID chip in an item or card, scan a barcode or QR code on a ticket, seat, ID card, or the like. The application device 510 may transmit the payment authorization data to the receiver hub 108 or receiver processing and distribution system 110.

In an example embodiment, pickup stations 504 and/or mobile merchants may be equipped with a sensor 203 as described above. The sensor 203 may be used to generate sensor data including payment authorization data when the service is provided. The sensor 203 may generate sensor data by reading a credit card or reward card magnetic strip, an RFID chip, a barcode, a QR code, or the like. In an example embodiment, payment may be made by currency or coupon and entered into an application device 510 or computing device. The application device 510 or computing device at the pickup station 504 or mobile merchant 506 may transmit the payment authorization data to the receiver hub 108 or receiver processing and distribution system 110 through wired or wireless communication.

The receiver hub 108 or receiver processing and distribution system 110 may generate transaction confirmation data. The transaction confirmation data may include merchant information, services or merchandise purchased, payment authorization data, or the like. The receiver hub 108 or receiver processing and distribution system 110 may transmit the transaction confirmation data to the application device 510 through Wi-Fi, cellular signals, or the like. Additionally or alternatively, the receiver hub 108 or receiver processing and distribution system 110 may transmit the transaction confirmation data to various account services, such as credit card services, reward card services, bank services, or the like through wired or wireless communication.

The receiver hub 108 or receiver processing and distribution system 110 may cause the transaction confirmation data to be stored in a memory for local or redundant record keeping and/or transaction analysis as historical transaction data.

The application device 510 may receive the transaction confirmation data and cause the transaction data to be displayed on a user interface. The user may utilize the displayed transaction confirmation data to verify the transaction description data and/or payment authorization data, or to keep as a record of the transaction (e.g. receipt).

Example Merchant Information and Merchant Availability Displays

FIGS. 6a and 6b illustrate exemplary embodiments of merchant information and merchant availability displays.

FIG. 6a is an exemplary embodiment of a merchant information display. A merchant information display may include a user interface 600, a service or merchandise item 602, a service or merchandise price 604, a service or merchandise description 606, a service or merchandise selector 608, and a merchant information submitter 610.

The merchant information data may be received form the receiver hub 108 or receiver processing and distribution system 110, as discussed in FIG. 5, and displayed on an application device 510 user interface 600. The merchant information data may be displayed in a variety of formats, such as list, icon, dropdown menus, or the like. The merchant information data may include the services or merchandise items 602 available. The service or merchandise items may include food, beverages, memorabilia, clothing, or the like. For example, the merchandise items 602 may include hotdogs, cheeseburger and soda combo, and beer.

The service or merchandise price 604 may be displayed for each item or as a total for the selected service or merchandise items 602. The service and merchandise description 606 may be a narrative description, an icon, or a picture of the service or merchandise item 602. The service or merchandise selector 608 may be a single selection or quantity selector. In an instance in which the service or merchandise selector 608 is a quantity selector, the service item may be selected and the quantity entered by drop down menu, slide menu, or entering a quantity value.

The merchant information submitter 610 may be selected to indicate the completion of the merchant information selection. In some example embodiments, the user interface 600 may display a prompt to the user for a confirmation prior to transmitting the selected merchant information data.

FIG. 6b illustrates an exemplary embodiment of a merchant availability data display on an application device 510. The merchant availability data display may include a user interface 600, a selected service or merchandise items 622, available merchants 624, a merchant selector 626, and an available merchant location rendering 628.

The selected services or merchandise items 622 may be received from the receiver hub 108 or the receiver processing and distribution system 110 and displayed for each available merchant 624. The selected services or merchandise items may be the services and/or merchandise that each of the available merchants may be able to provide. In an instance in which the selected merchant information includes 4 hotdogs, 1 cheeseburger and soda combo, and 2 beers, each available merchant 624 may be able to provide all or only a portion of the selected services or merchandise items 602. For example, merchant #276 may be a concession stand pick up station 504 with the ability to provide all of the selected service or merchandise items 602. Merchant #205 may be a mobile service merchant 506, such as a concourse beer cart, which may only be able to provide a portion of the selected service or merchandise items 602, such as only the 2 beers. Merchant #488 may be a mobile service merchant 506, such as a roving hotdog vender, which may only be able to provide a portion of the selected service or merchant items 602.

The location data associated with each available merchant 624 may be displayed on the available merchant location rendering (e.g., map). The user may take into account the location of each merchant and the merchant's ability to deliver the selected service or merchandise items in their selection of available merchant data. The available merchant data may be selected using the available merchant selectors 626. The user may select one or more available merchants, for example the user may determine that they want the all of the selected service or merchandise items and select merchant #276 and walk to the pickup station 504 displayed on the available merchant location rendering 628. The user may decide that they do not wish to walk to the concession stand pickup station 504 and select only the mobile merchants #205 and #488. The user may walk to the concourse to retrieve the 2 beers, and merchant #488 may deliver the hotdogs based on the patron location data, or position calculation data. Alternatively, the patron may determine that they do not desire to leave their location and select only merchant #488, which may deliver the selected service or merchandise item 602 to the patron.

In response to selection of the available merchant data the patron may be provided with a merchant location rendering or map from the location system. Additionally or alternatively the merchant, such as a mobile merchant, may be provided with the location of the patron to deliver the goods or services.

Example Merchant Proximity Radii

In an example embodiment, the location system may provide merchant information and/or merchant availability data based on the location of the patron in relation to the merchants. For example, as the patron walks through the venue the merchant information, e.g. goods and services, and available merchants may change or be updated based on which merchants the patron is near. Thus allowing the patron to gain information about the goods and services in the area and/or make a purchase without standing in line or investigating each merchant.

FIG. 7 illustrates an exemplary embodiment of the location system merchant proximity radii. The location system may be deployed in a venue in which a patron may pass several merchants. The location system may have proximity radii set to send merchant information data based on the proximity of the patron location data based on a tag 102 to the merchants 702 location data. The merchant location data may be a fixed location, or in the case of a mobile merchant 702*d* the merchant location data may be based on a merchant tag 102 (not shown). In an example embodiment, the proximity radii are used by the location system to determine likely interactions between the patron associated with the tag 102 and the merchant or facility. The application device 510 may receive the merchant information data for one or more merchants as the patron passes through the proximity radii as experience enhancement data, as discussed below in FIG. 10. For example, the application device 510 associated with tag 102*c* may receive only the merchant information data for merchant 702*a*. The application device 510 associated with tag 102*d* may receive merchant information data for merchants 2, 702*b* and merchant 3, 702*c*. The application device 510 associated with tag 102*e* may receive merchant information data from mobile merchant 702*d*.

In an example embodiment, merchants may be equipped with short range transmitters that may be received by a sensor in communication with the application device 510. The sensor 203 may generate sensor data including merchant identification or merchant position data. The application device 510 may transmit the sensor data to the receiver hub 108 or receiver processing and distribution system 110. The receiver hub 108 or receiver processing and distribution system 110 may use the sensor data in the determination of the merchant location and/or the transmission of merchant information.

In an example embodiment, the location data of tags 102*c*-*e* and the merchant of facility location data and proximity radii may be used to determine a tag route. The tag route may the location data of the tag 102 as it travels through the venue, the interactions with secondary location data, such as merchant or facility locations, and, or the transaction confirmation data associated with the patron and/or tag. The route may include the time a tag 102 location data is proximate to a secondary location data in determining wait times for merchants and/or facilities.

Example Location System Deployed in a Venue Seating Section

In an example embodiment in which the patron makes a purchase of goods or services from a vendor from their seat or other area not directly associated with the merchant, the location system may provide the location of the patron in the venue. The merchant can use the seat location or real time patron location to deliver the goods or services to the patron without the patron having to flag down a mobile merchant or wait in line to make the purchase.

Figure 8A:
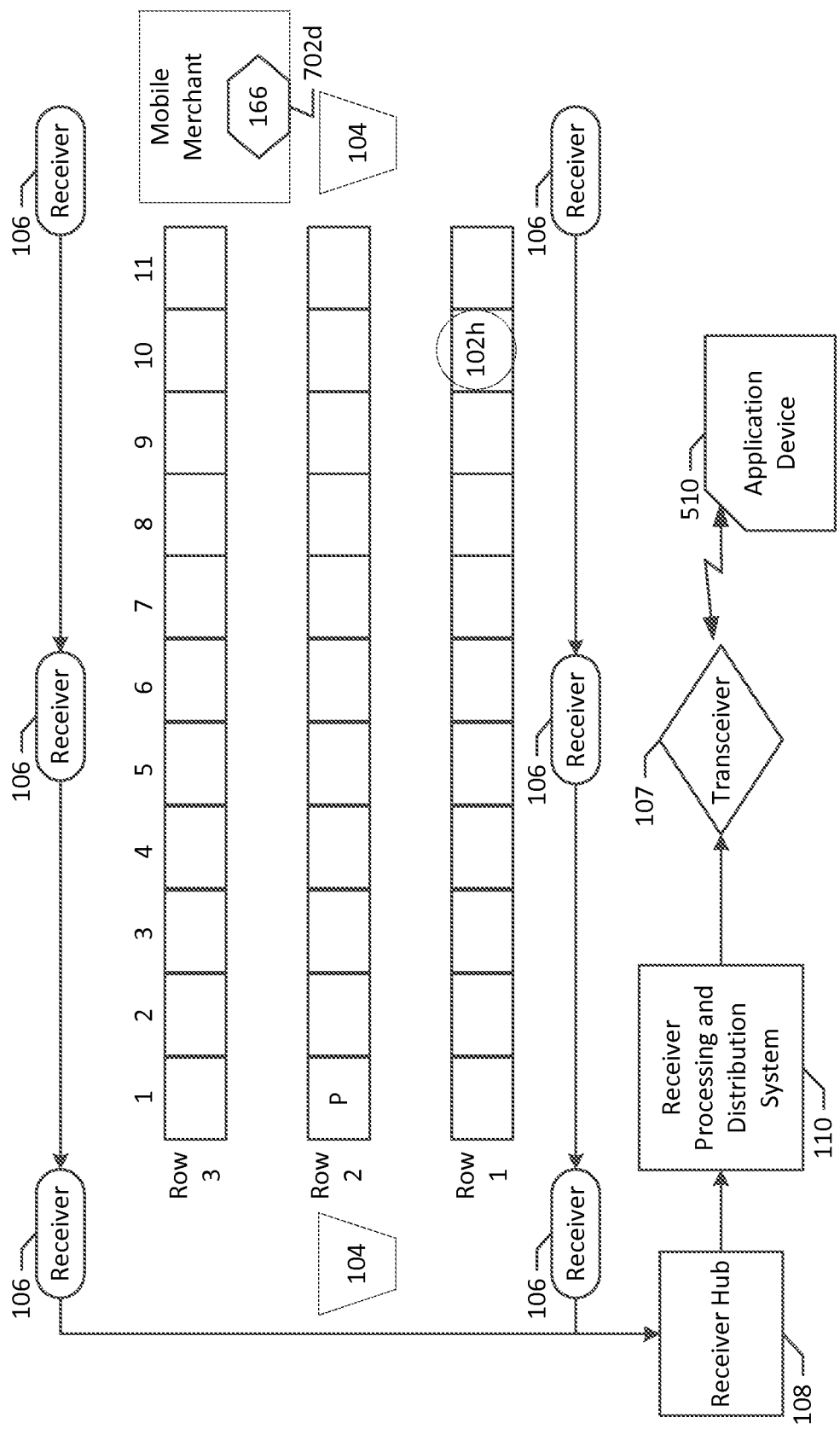
FIG. 8A illustrates a location system deployed in an event seating area in accordance with some embodiments of the present invention.
Figure 8B:
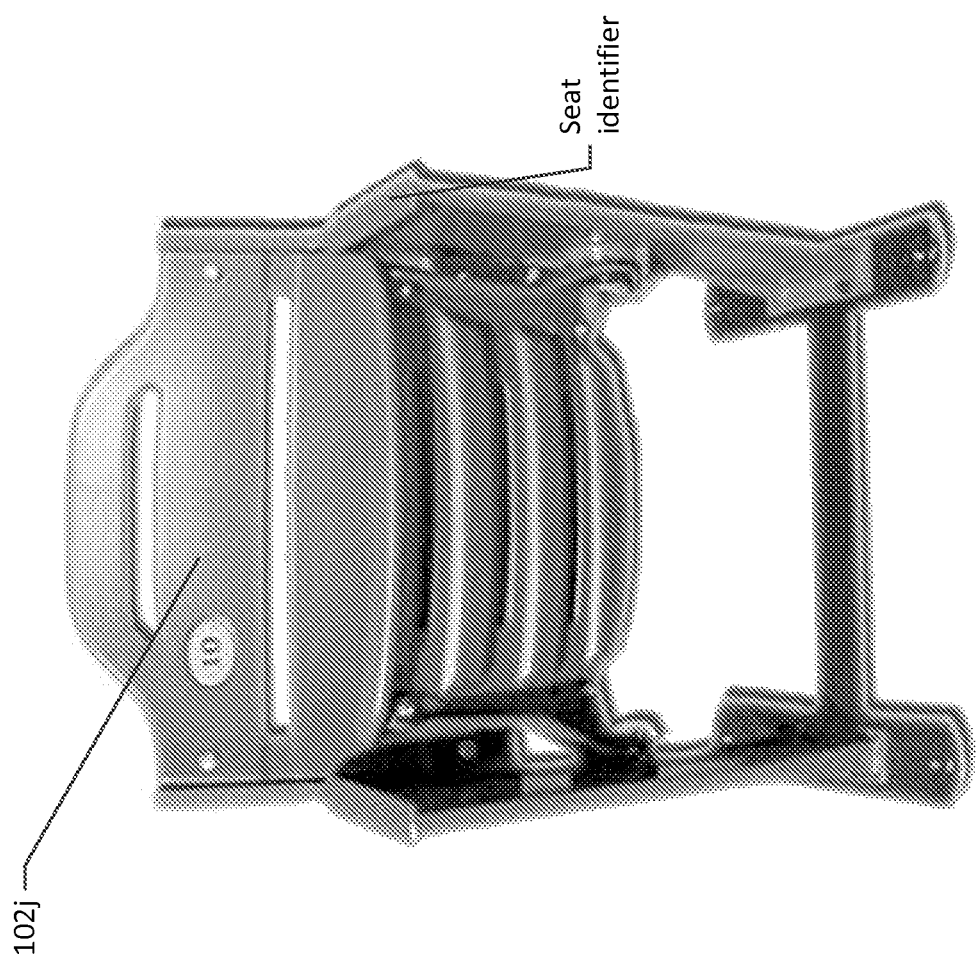
FIG. 8B illustrates an exemplary embodiment of an event seat in accordance with some embodiments.

FIG. 8 illustrates a location system deployed in a venue seating area. The patron may have an assigned seat such as row 2 seat 1, or open seating. In some embodiments, the patron may be in a seat in which they were not assigned.

In an example embodiment, a patron may be associated with a tag 102*h*. The tag 102*h* may be associated with an application device 510. The location system may calculate the location data of the patron associated with tag 102*h* as the patron moves throughout the venue, including which seat the patron is occupying.

In an example embodiment, the patron may associate an application device 510 with a tag 102*j*. The tag 102*j* may be embedded in a seat as shown in FIG. 8*a*. The application device 510 may be in communication with a sensor 203 such as a barcode reader, RFID reader, QR code reader, or the like. The sensor 203 may be used to scan a barcode, QR code, RFID chip, or the like generating sensor data association the tag 102*j* with the application device such as a tag-application device correlator. The receiver hub 108 or receiver processing and distribution system 110 may then calculate the location data associated with the patron and or the application device.

In an example embodiment, the application device 510 may be equipped with a sensor 203 as discussed above that may read a seat identifier such as a barcode, a QR code, an RFID chip, or the like to identify the seat or location of a patron. The sensor data may be used to associate the application device 501 with the fixed location of the seat and used for patron location data where a tag 102 has not been assigned.

Example Location System for Locating Personnel or Facilities in a Venue

Locating persons, facilities, or services in a crowed venue may be very difficult. Triangulation positioning systems, such as GPS, on an application device, such as a smart phone, may not be functional indoors, and/or have limited accuracy. Describing location to other patrons using land marks may also prove problematic due to limited cellular coverage, or poor directions or descriptions.

In some embodiments, an application device may select and transmit a location request to the location system. The location system may associate location data with the location request and transmit the location data to the application device. The location data may be fixed locations that are programmed into the locations system, such as the location of restrooms, security, emergency services, information, service counters, or the like. Additionally, the location data may be mobile locations, such as another patron, a VIP, a group, a mascot, a mobile merchant, or venue employee (e.g. security guard/police, emergency management personnel, or the like.)

Figure 9:
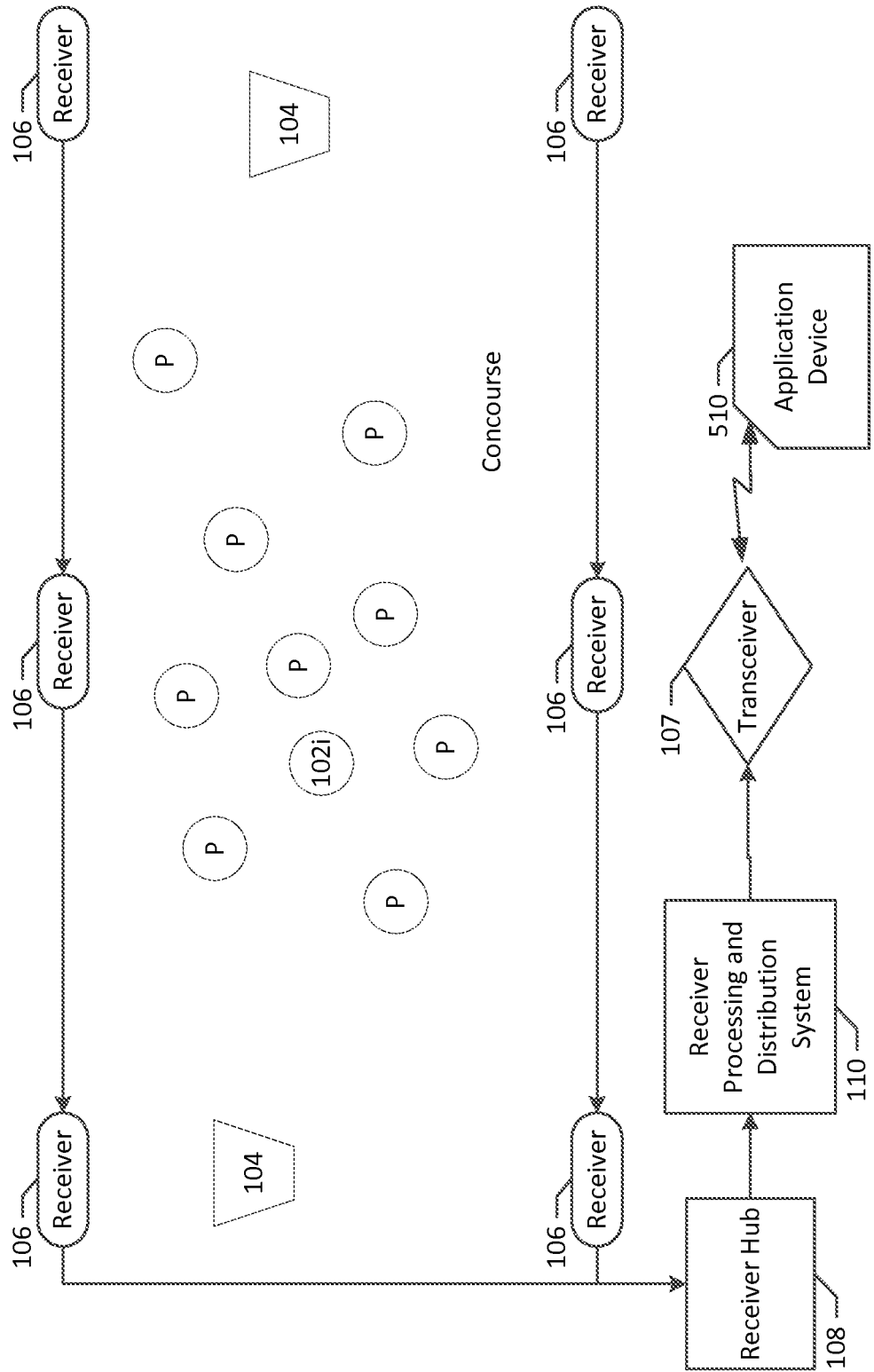
FIG. 9 illustrates an example embodiment of a locations system for locating personnel or facilities in a venue in accordance with some embodiments of the present invention.

FIG. 9 illustrates an example embodiment of a locations system for locating personnel of facilities in a venue. A patron, VIP, mascot, group leader, or the like may be assigned a tag 102*i*. As the tagged participant, such as a patron moves through the venue, the receiver hub 108 or receiver processing and distribution system 110 may calculate the tag 120*i* location data based on blink data received from the tag at receivers 106, as discussed in FIG. 1.

In an example embodiment, the location data of fixed locations or facilities such as restrooms, information desks, meeting points, security offices, emergency services office, or the like may be stored in a memory or database. The location data associated with fixed locations may be accessed by the receiver hub 108 or receiver processing and distribution system 110 and used for location data in an instance in which no tag is currently associated with the fixed location.

An application device 510 may be used to select a location request for personnel or facilities. The location request may include the tag UID, person, personality, or group identifier, such as a name, or other information for determining the requested parties and associated location data. The location request may also include identifiers for fixed locations or facilities, such as restrooms, information desks, meeting points, security offices, emergency services office, or the like. The application device 510 may transmit the location request to the receiver hub 108 or receiver processing and distribution system 110. The receiver hub 108 or receiver processing and distribution system 110 may associate the location request data to a tag 102*i* that is associated with the patron, VIP, mascot, group leader, or the like. Additionally or alternatively, the receiver hub 108 or receiver processing and distribution system 110 may associate the location request data to location data associated with fixed locations or facilities, such as restrooms, information desks, meeting points, security offices, emergency services office, or the like.

In an instance in which the location request generates multiple party or facility location data, such as a request for a group of persons, each associated with a tag 102*i*, or restrooms, the receiver hub 108 or receiver processing and distribution system 110 may generate available location data. For example, a group of patrons associated with tags, restrooms, merchants of services or merchandise, meeting points, or the like. In an instance when a group of people has been included in the location request, the receiver hub 108 or receiver processing and distribution system 110 may associate the location request for each person with location data and determine which persons have an associated location data.

The receiver hub 108 or receiver processing and distribution system 110 may transmit an available location data, based on the association. The available location data may contain a list including identifiers, distance, or the like for each location data associated with the location request. For example, if only 3 of the 4 persons of the location request have associated location data the receiver hub 108 or receiver processing and distribution system 110 may generate available location data including identifiers, such as names for the 3 persons with location data. In another example, the location request may be for restrooms, the receiver hub 108 or receiver processing and distribution system 110 may associate the location request with the location data for all restrooms, or restrooms in the same section, quadrant, or the like and generate available location data based on the associated location data. The receiver hub 108 or receiver processing and distribution system 110 may transmit the available location data to the application device 510 using Wi-Fi, cellular signals, or the like.

The application device 510 may be used to select the location data from the available location data. The selected available location data may include the identifier of one or more locations data identifiers from the available location data. The application device 510 may transmit the indication of selected location data to the receiver hub 108 or receiver processing and distribution system 110.

The receiver hub 108 or receiver processing and distribution system 110 may receive the indication of selected location data from the application device 510. The receiver hub 108 or receiver processing and distribution system 110 may transmit the location data for one or more of the personnel or facilities selected from the available location data or location request to the application device 510. For example, the location data associate with one or more patrons associated with a tag 102, a restroom, the mascot, a VIP, the main gate, or the like The application device 520 may receive the location data from the receiver hub 108 or receiver processing and distribution system 110. The application device 510 may display the location data on a user interface as a map or other location rendering. In some embodiments, multiple location data may be displayed. For example, the location of the nearest restrooms, emergency services office, or the like providing the patron the option of facilities.

Example Tag-Sensor Correlated Venue Entry

In some embodiments, the location system may include a sensor at venue entryways to identify patrons associated with location tags as they enter. The location system may have an exciter to cause the tag to commence transmission or the location system may use the sensor data to commence monitoring of the tag. The location system may determine the route the tag travels throughout the venue. The route may include the rate of travel, proximate locations of facilities, merchants, or other tagged patrons that the patron may have interacted and/or transaction data associated with the patron. The route data may be used to determine the flow of patrons throughout the venue for placement of advertisements, and merchants, high congestion areas or wait times for services or facilities. Additionally, the route data may be used to identify and change patron behavior. For example, the time the patron enters the venue and leaves may be associated with points, coming early and staying for the full event may earn more points, and lower congestion in specific venue areas. In another example, transactions occurring within a period that has lower sales may earn more points that transactions during peak times, cause the patron to experience shorter lines and equalize sales volumes over the event.

In some embodiments, the location system may send experience enhancement data to an application device associated with a patron based on the patron location, route data, historical route data, and transaction confirmation history. The location device may determine that the patron near or in route to a facility or merchant, such as a restroom or concession stand with long wait times and send a message containing the location of an alternate restroom or merchant. In another example, the location system may determine that the patron interacts with a facility or merchant on a consistent basis at high volume times. The location system may send a message containing the time period which are lower volume, such as between the top and bottom of the $6^{th}$ inning, rather than before the $7^{th}$ inning, in baseball. In another example, the location system may send merchant information based on the patron route data. For example. If the patron is proximate to a merchandise merchant or service merchant, allowing the patron to identify the services and merchandise in the area. Additionally, the patron could select and pay for the merchandise and service as described above, and simply retrieve the item from the merchant.

Figure 10:
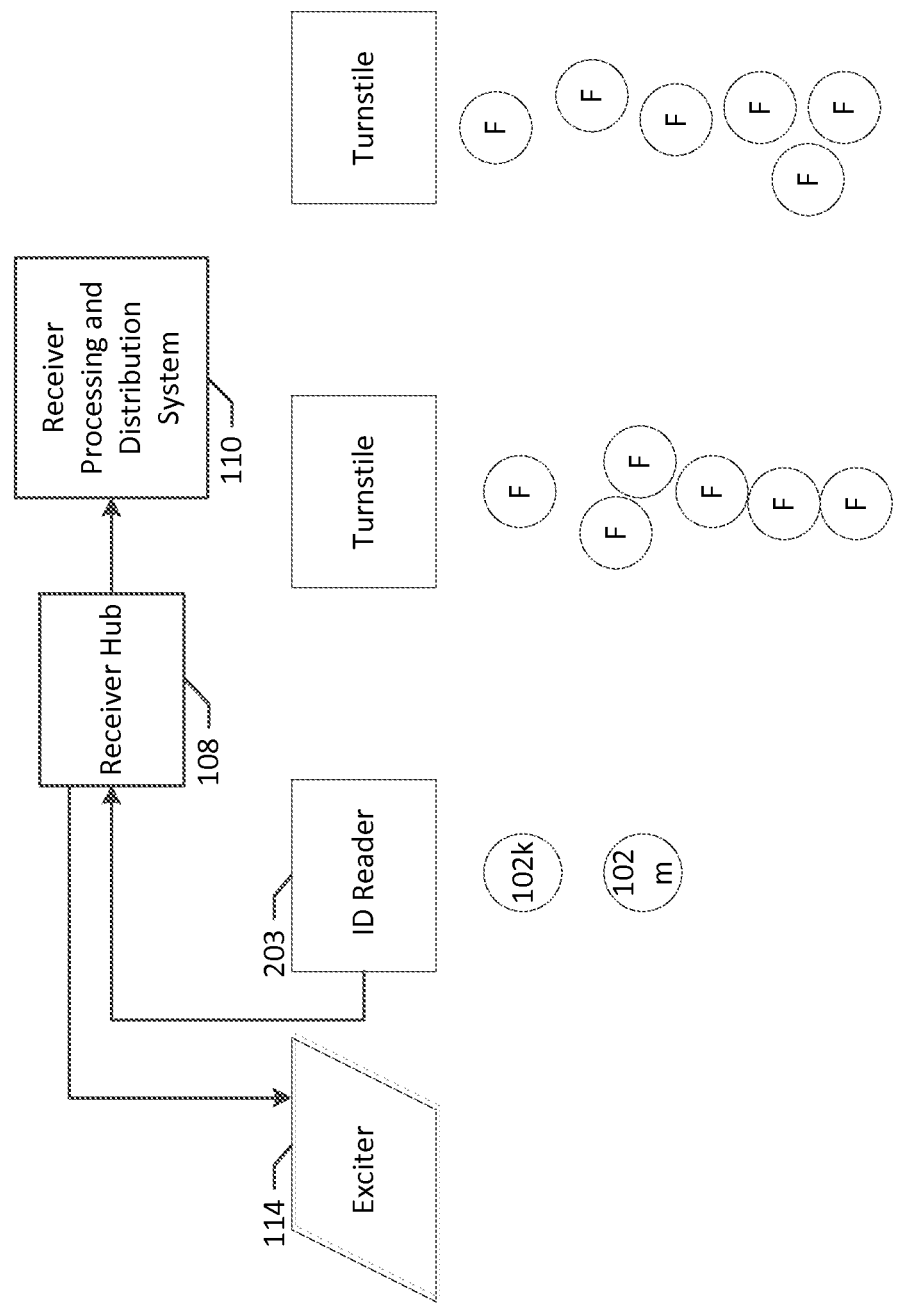
FIG. 10 illustrates an example tag-sensor correlated venue entry point in accordance with some embodiments of the present invention.

FIG. 10 illustrates an example tag-sensor correlated venue entry point. The tag-sensor correlated entry point may include a sensor 203, tags 102k and 102m, a receiver hub 108, receiver processing and distribution system 110, and exciter 114. The sensor 203 is similar to the sensors described in FIG. 3. The sensor may include a barcode reader, a QR code reader, and RFID reader, or the like. The tags 102k and 102m may be associated with a patron, staff, object, or the like. An identifier such as a barcode, such as on a ticket, QR code, or RFID chip in an object or card may be associated with the tag 102. The tag-sensor association may be a tag-sensor correlator, including the tag UID, sensor UID or other information associating the tag—with the sensor. In an example embodiment the sensor data may be identified by the receiver hub 108 or receiver processing and distribution system 110 which may retrieve a tag UID, patron identifier or the like from a database generated at tag 102 registration.

The participant patron may carry the tag 102 as shown in FIG. 2D. The sensor 203 may read the identifier as the patron passes through the ID reader/sensor 203. Patrons that do not have the sensor must wait in line to enter through turnstiles or have their ticket verified. The sensor 203 may generate sensor data from the identifier, including a tag-sensor correlator. The sensor data may be transmitting to the receiver hub 108 or receiver processing and distribution system 110. The receiver hub 108 or receiver processing and distribution system may receive the sensor data and commence monitoring of the tag 102k and 102m. In an example embodiment the receiver hub 108 or receiver processing and distribution system may transmit a tag activation signal to the exciter 114. The exciters 114 may transmit a short range low frequency signal to the associated tag 102 to commence blink data transmissions.

The receiver hub 108 or receiver processing and distribution system 110 may receive blink data from the patron tag 102k or 102m and other tags, such as other patrons, merchants, mobile merchants, or the like. The receiver hub 108 or receiver processing and distribution system 110 may calculate location data for the patron tag 102k or 102m and location data for other tags. In an embodiment, location data for fixed locations may be stored in a memory assessable to the receiver hub 102 or receiver processing and distribution system 110. For example, location data associated with restrooms, security offices, emergency service offices, meeting points, concession stand merchants, or the like.

The receiver hub 108 or receiver processing and distribution system 110 may determine a tag route based on the tag 102k location data and second location data. The route may include the location data for the tag as the tag travels throughout the venue, and secondary location data or patrons, merchants, facilities and the like that the patron associated with the tag may have interacted with. Further, the route data may include time information such as entry time, departure time, and stationary or slow travel indication a line for a service that the tag is near.

In an example embodiment, the receiver hub 108 or receiver processing and distribution system may associate transaction confirmation data associated with the patron or tag 102k with the route data. For example, the route data may include the purchases of services or merchandise items and the location data associated with the transaction confirmation data, providing an indication of what the patron has purchased, where it was purchased and time information based on the event and or universal clock.

The receiver hub 108 or receiver processing and distribution system 110 may cause the route data to be displayed to analyze trends in patron, merchant, or other the like associated with a tag. The receiver processing and distribution system 110 may cause the route data to be stored as historical route data for later analysis or for generation experience enhancement data.

The receiver hub 108 or receiver processing and distribution system 110 may generate experience enhancement data based on the route data and/or historical route data. The experience enhancement data may include the locations of merchants, personnel, or facilities; time periods recommended for using merchants or facilities; and/or merchant information. The receiver hub 108 or receiver processing and distribution system 110 may transmit experience enhancement data to the application device 510 using W-Fi, cellular signals, or the like. For example, in an instance in which the tag location is calculated proximate to a restroom, or in route to a restroom, the receiver hub 108 or receiver processing and distribution system may determine that there is currently or historically been a long wait at that particular restroom. The receiver hub 108 or receiver processing and distribution system 110 may generate experience enhancement data including the location of an alternate restroom, the reason for the experience enhancement data (e.g. long wait at restroom #345), or the like.

In another example, the receiver hub 108 or receiver processing and distribution system 110 may determine that the patron associated with the tag 102k uses the restroom between the $6^{th}$ and $7^{th}$ inning of a baseball game, based on patron historical route data. The receiver hub 108 or receiver processing and distribution system may generate experience enhancement data based on the route data and historical route data including a time period or periods with shorter wait times, such as between the top and bottom of the $6^{th}$ inning.

In an example embodiment, the receiver hub 108 or receiver processing and distribution system 110 may generate experience enhancement data that is further based on transaction confirmation data, and or historical confirmation data. The receiver hub or receiver processing and distribution system 110 may determine that the tag location is proximate to a merchant, or may be in route to a merchant, such as a concession stand, or mobile merchant based on the route data, merchant location data, or the like. The receiver hub 108 or receiver processing and distribution system 110 may determine that there is or historically been a high volume of transactions at the merchant during this period. The generated experience enhancement data may include an alternate merchant that is currently or has in the past had lower transaction volume based on the transaction confirmation data. Additionally or alternatively, the experience enhancement data may include an alternative time or period to purchase the service or merchandise.

In an example embodiment, the receiver hub 108 or receiver processing and distribution system may generate predictive experience enhancement data based on transaction confirmation data. For example, in an instance in which the receiver hub 108 or receiver processing and distribution system 110 determines that the patron has purchased several beverages, the experience enhancement data may provide the location of restrooms, approximate wait times, and recommended periods to use the facility with historically low wait times.

In an example embodiment, the receiver hub 108 or receiver processing and distribution system 110 may transmit merchant information based, as described in FIGS. 5 and 7, based on the patron associated with the tag location data and secondary location data/proximity radii. For example, if the receiver hub 108 or receiver processing and distribution system determined that the patron associated with the tag 102k is standing in a line proximate to a merchant such as, a concession stand, or in route to a merchant based on route data and route proximate location data.

Example Location System with a Camera Control Module

Capturing images or video of fans and patrons and/or the reactions to occurrences at an event is traditionally limited to the cameras controlled by personnel or by fixed location camera. These cameras only capture a small portion of the fans or patrons and capturing even fewer reactions. Patrons of events such as concerts or sporting events frequently use application devices, such as smart phones, and tablet computers, to capture images and videos, which are uploaded to various social media cites and kept for a memorialization of the event. Event cameras may be limited in what they can capture due to limited number of cameras, placement, and where the cameras are pointed at a particular time.

In some embodiments, the location system may include a camera control module and the patron may be associated with a location tag or position data. The camera control module may control event cameras in order to capture video or images of patrons based on patron location and/or event occurrences. The camera control module may control the position and focus of cameras mounted throughout the venue. For example, the camera control module may cause one or more cameras to capture video or images of patrons in response to a touchdown, homerun, singer coming on stage, or upon request. Additionally or alternatively, the camera control module may capture images and video of patrons throughout the event.

In some embodiments, the location system may be configured with a camera control module which may request the camera data from the application devices in an area of interest. An area of interest may be a patron seating area near a tackle, touchdown, or stage. Additionally areas of interest may be determined for security and medical issues such as a fight or injury. The request for camera data from the application devices may be based on location data associated with the application device or patron and/or an event occurrence (e.g. area of interest). The application device may transmit the camera data to the location system in response to the request for camera data. The camera data may be used to display on venue display (e.g. JumboTron, closed circuit television, or the like), security, or transmitted to other patron application devices.

Figure 11:
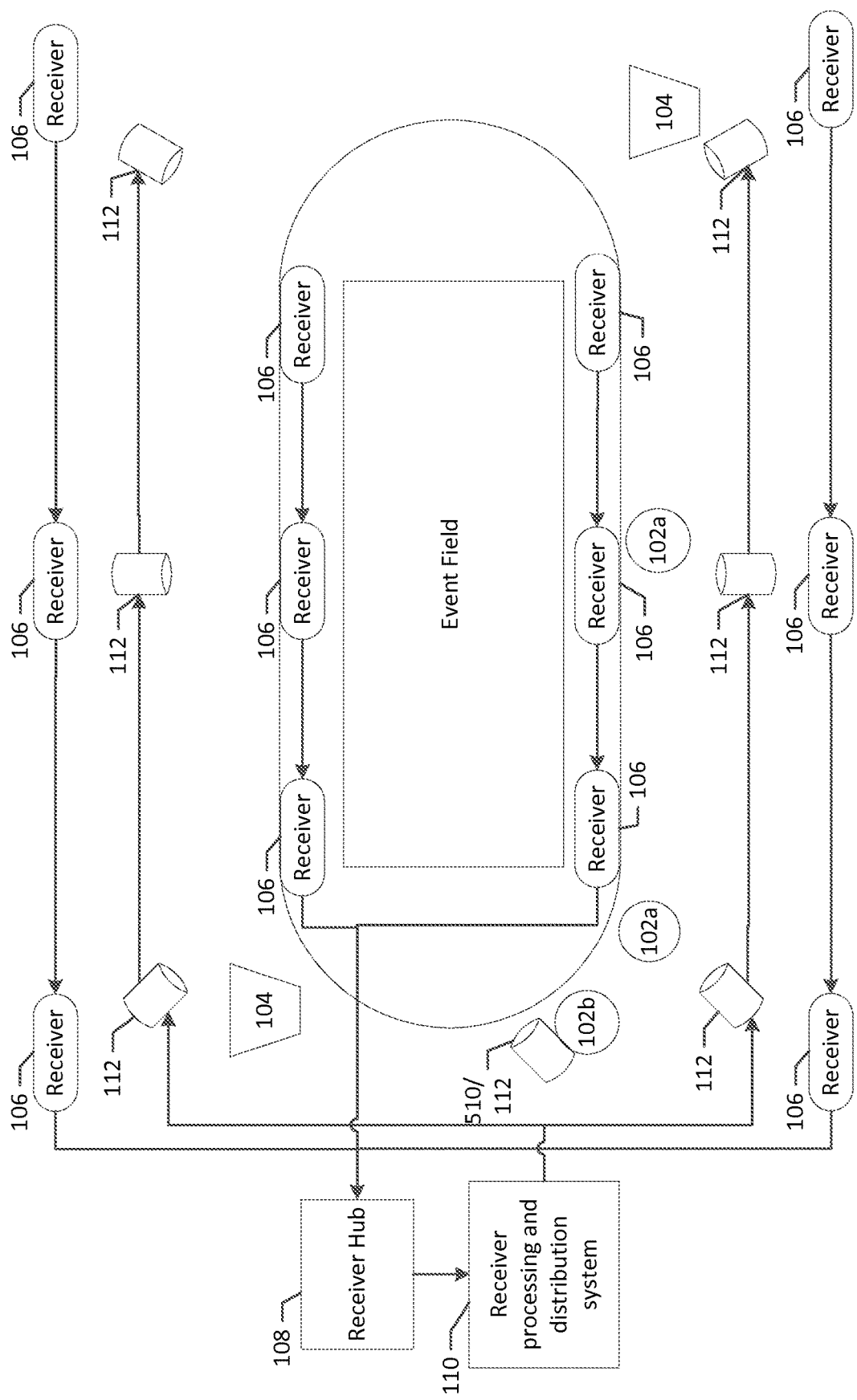
FIG. 11 illustrates an example location system with a camera control module in accordance with some embodiments of the present invention.

FIG. 11 illustrates an example location system with a camera control module. The locating system camera control module may include tags 102a and 102b, reference tags 104, receivers 106, receiver hub 108, receiver processing and distribution system 110, cameras 112, and an application device 510. The locating system may be deployed in the area around the event field or stage. The reference tags 104 may be permanently, semi-permanently, or temporarily mounted and transmit reference tag blink data for reference determination as described in FIG. 1. The tags 102 may transmit blink data for calculation of location data as described in FIG. 1.

The tags 102a and 102b may be associated with patrons within the venue, such as the stands of a sporting event or seats of a concert. The receiver hub 108 or receiver processing and distribution system 110 may include a camera control module configured to generate camera control data. Camera control data may include a camera identifier, camera angle, camera focus, or the like. The receiver hub 108 or receiver processing and distribution system 110 may calculate location data for each tag 102a and 102b and determine event occurrences such as a touch down, interception, tackle, home run, performer coming onto the stage, or the like based on location data of event participants. The determination of event occurrences may be performed by an activity engine, such as the activity engine 124 or any other engine of the receiver hub 108 or receiver processing and distribution system 110, as discussed in FIG. 4.

In an embodiment, an event occurrence may be generated by the application device 510. For example, the application device 510 may generate an event occurrence in response to a user input. An event occurrence may also be determined when a tag associated with a patron is in proximity to a specified participant tag such as an event participant, such as a player or concert artist, or tag associated with the mascot, or VIP, such as a celebrity, or the like.

The camera control module may generate camera control data to control the angle and focus of a specified camera, based on the location data associated with the tag 102a and/or event occurrences. The camera control module may transmit camera control data to the cameras 112 to capture camera data. The camera data may include video data, image data, or the like. The camera control module of the receiver hub 108 or receiver processing and distribution system 110 may transmit the camera data based on the location data associated with a tag. For example, the camera control module of the receiver hub 108 or receiver processing and distribution system 110 may transmit camera control data to capture camera data associated with the location data of each tag 102 throughout the event for a memorialization of the event or for sale to the associated patron. Further, the captured data may be used to incorporate the patron associated with the tag into the event by displaying the captured camera data on venue display, such as a JunboTron.

The camera control module may transmit the camera control data to the camera 112 based on location data and event occurrences. For example, in an instance in which the receiver hub 108 or receiver processing and distribution system 110 determines that an event occurrence, such as a touch down or concert performer walking on stage, the camera control module may transmit camera control data to the cameras 112 to capture camera data of the patrons associated with tag 102a. The captured camera data may be the patron reaction to the event occurrence.

In an example embodiment, the cameras 112 are placed throughout the monitored area in a manner that allows for the captured camera data to include the patron associated with the tag 102 and the event field or stage, which may include the event occurrence. For example, in an instance in which the patron associated with the tag 102a is near the event field the camera across the field may be used to capture camera data including both the patron and the event field, which may include the event occurrence such as a tackle. In another example, the patron associated with the tag may be higher in the stands, or away from the event field or stage, the camera control data may be transmitted to the camera behind the patron, capturing the patron and the event field. In another example, the patron may be near the stage of a concert, the camera 112 may be positioned near the back of the stage so that the camera data captured may include the patron and the performance on the stage.

In an example embodiment, the patron associated with a tag 102b may have an application device 510. The application device 510 may include a smart phone, tablet computer, PDA, digital camera, digital camcorder, or the like. The application device 510 may be associated with the tag 102b. The application device 510 may be associated with a tag 102. The application device 510 may be associated at the time of tag assignment by entering an application device identifier, such as a phone number, IP address, or the like.

Alternatively, the application device 510 may be in communication with a sensor 203, similar to the sensors discussed in FIG. 3. The sensor 203 may include a barcode reader, RFID reader, QR code reader, or the like. The sensor 203 may read a tag identifier, such as a barcode number, RFID chip, or QR code and generate sensor data. The sensor data may comprise a tag UID, or information to identify the tag 102. The application device 510 may generate and transmit a tag-application device correlator to the receiver hub 108 or receiver processing and distribution system 110. The tag-application device correlator may include tag UID, application device identifier, or the like.

In an instance in which an application device 510 is associated with the tag 102a, the receiver hub 108 or receiver processing and distribution system 110 may transmit the camera data to the application device 510. The receiver hub 108 or receiver processing and distribution system 110 may transmit the camera data through the transceiver 107 using Wi-Fi, cellular signals, or the like.

In an example embodiment, an application device 510 may be in communication with a camera configured to capture camera data, such as video or image data. The camera data captured by the application device 510 may capture images in an area of interest such as near the event occurrence, such as a touchdown, or the artist on the stage, or the like. In another example the area of interest may be a security issue such as a fight or an injury. The camera data may also include other patrons, which may, in turn, have associated application devices 510.

The receiver hub 108 may determine an event occurrence as discussed in FIG. 4 or receive an event occurrence indication from the application device. The camera control module of the receiver hub 108 or receiver processing and distribution system 110 may transmit a camera data request, based on the location data associated with tag 102b and an event occurrence. The camera data request may be transmitted through the transceiver 107 using Wi-Fi, cellular signals, or the like.

The camera data request may be sent to a specific application device 510 or all application devices in the area of interest based on the location data of the associated tag 102b. A camera data request may include an application device identifier, a time period such as universal clock start and end times, and/or other information to identify the application device 510 or devices and the period of time for which camera data is requested.

The application device 510 may receive the camera data request and determine the camera data that matches the camera data request information. For example if there camera data of the application device contains 3289 image and 46 videos, the application device may determine which image and video data is within the requested time period. The camera data matching the time period may be only 6 images and 1 video. Additionally or alternatively, the application device may generate a camera data indication. The camera data indication may be a list of the camera data captured within the time period, an application device identifier, or the like. The camera data indication may be sent in an instance in which the application device 510 fails to send the camera data, or as an identifier of the camera data transmitted as discussed below. The application device 510 may transmit the camera data and/or the camera data indication to the receiver hub 108 or the receiver processing and distribution system 110 using Wi-Fi, cellular signals, or the like.

The receiver hub 108 or receiver processing and distribution system 110 camera control module may receive the camera data from the application device 510. The camera control module may cause the camera data to be displayed on a user interface, or on a venue screen, such as a JumboTron, closed circuit television, or the like. For example, in an instance in which the camera data request was transmitted in response to a security event occurrence or injury, the camera data may be displayed on a user interface, such as a security office monitor. In an instance in which the camera data request was transmitted in response to an event occurrence on the event field or stage, or a proximity of tag location data to a participant tag location, such as a player, performance artist, VIP, Mascot, or the like, the camera data may be displayed on the venue screen.

The receiver hub 108 or processing and distribution system 110 camera control module may receive cause the camera data to be stored in a memory, such as an event database. The camera data may be retrieved at a later time for transition, or display.

The receiver hub 108 or receiver processing and distribution system 110 camera control module may transmit the camera data to application devices 510, media services, or the like. In an instance in which there were other tags 102 with location data in the area of interest, the camera control module may transmit the camera data to application devices 510 associated with the proximate tags. For example, if the camera control module receives, camera data from an application device 510 that has location data proximate to two location data associated with an application device 510, the camera control module may transmit the camera data to the two other application devices. The camera data may include image or video data similar to the view that the patrons associated with the tags 102 experienced, or may include image or video data that includes the patron associated with the tags.

Additionally or alternatively the camera control module may transmit the camera data to various media, such as internet sites associated with the event or forum, email, or social media internet sites.

Example Processing Apparatus

Figure 12:
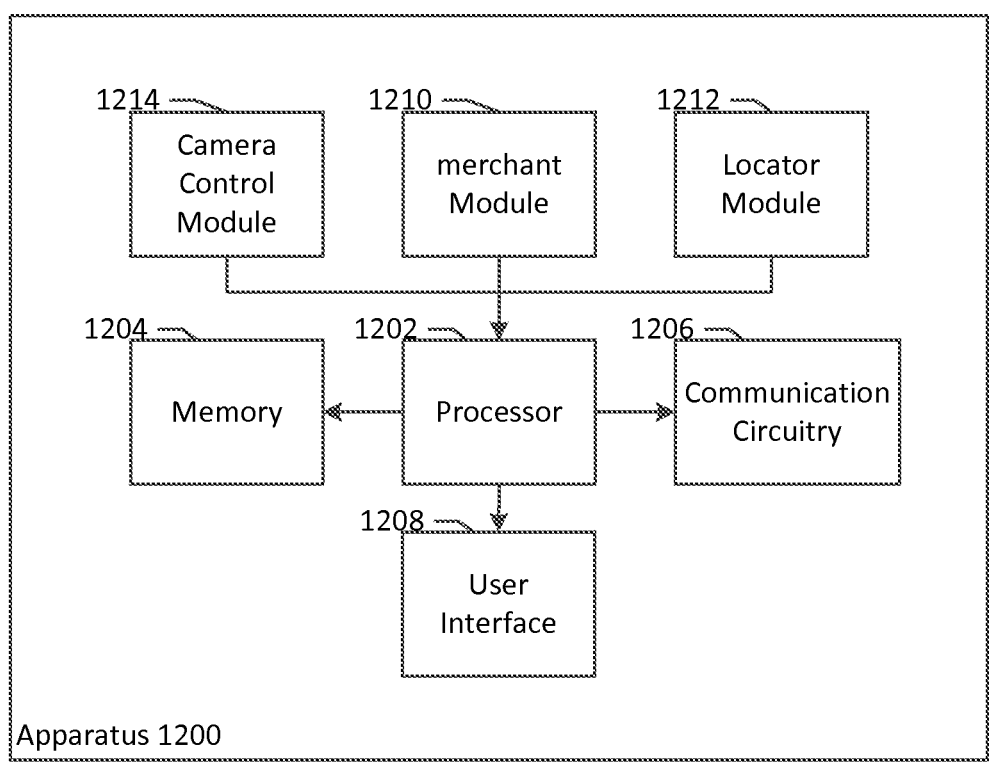
FIG. 12 shows a block diagram of components that may be included in an apparatus in accordance with some embodiments of the present invention.

FIG. 12 shows a block diagram of components that may be included in an apparatus, such as the receiver hub 108, receiver processing and distribution system 110, or the application device 510. Apparatus 1200 may comprise one or more processors, such as processor 1202, one or more memories, such as memory 1204, communication circuitry 1206, user interface 1208, merchant module 1210, locator module, 1212, and camera control module 1214. Processor 1202 can be, for example, a microprocessor that is configured to execute software instructions and/or other types of code portions for carrying out defined steps, some of which are discussed herein. Processor 1202 may communicate internally using data bus, for example, which may be used to convey data, including program instructions, between processor 1202 and memory 1204.

Memory 1204 may include one or more non-transitory storage media such as, for example, volatile and/or non-volatile memory that may be either fixed or removable. Memory 1204 may be configured to store information, data, applications, instructions or the like for enabling apparatus 1200 to carry out various functions in accordance with example embodiments of the present invention. For example, the memory could be configured to buffer input data for processing by processor 1202. Additionally or alternatively, the memory could be configured to store instructions for execution by processor 1202. Memory 1204 can be considered primary memory and be included in, for example, RAM or other forms of volatile storage which retain its contents only during operation, and/or memory 1204 may be included in non-volatile storage, such as ROM, EPROM, EEPROM, FLASH, or other types of storage that retain the memory contents independent of the power state of the apparatus 1200. Memory 1204 could also be included in a secondary storage device, such as external disk storage, that stores large amounts of data. In some embodiments, the disk storage may communicate with processor 1202 using an input/output component via a data bus or other routing component. The secondary memory may include a hard disk, compact disk, DVD, memory card, or any other type of mass storage type known to those skilled in the art.

In some embodiments, processor 1202 may be configured to communicate with external communication networks and devices using communications circuitry 1206, and may use a variety of interfaces such as data communication oriented protocols, including X.25, ISDN, DSL, among others. Communications circuitry 1206 may also incorporate a modem for interfacing and communicating with a standard telephone line, an Ethernet interface, cable system, and/or any other type of communications system. Additionally, processor 1202 may communicate via a wireless interface that is operatively connected to communications circuitry 1206 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1×EV-DO, GPRS, W-CDMA, LTE, and/or any other protocol.

The apparatus 1200 may include a user interface 1208 that may, in turn, be in communication with the processor 1202 to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 1204, and/or the like).

The apparatus 1200 may include a merchant module 1210 that may in turn, be in communication with the processor 1202 and configured to receive merchant information, and display merchant information. In an example embodiment, the merchant module 1210 may be further configured to cause the processor 1202 associate a tag UID to the application device, generate a tag-application device correlator, and transmit the tag application device correlator. In an example embodiment, the merchant module 1210 may be further configured to cause the processor 1202 to receive a selected merchant information indication, and transmit the sleeted merchant information indication. In an example embodiment, the merchant module 1210 may be further configured to cause the processor 1202 to receive merchant availability data, receive a selected merchant availability data, and transmit the selected merchant availability data. In an example embodiment, the merchant module 1210 may be further configured to cause the processor 1202 to receive transaction description data, transmit payment authorization data, and/or receive transaction confirmation data.

In an example embodiment, the merchant module 1210 may be configured to cause the processor 1202 to receive tag blink data, calculate tag location data, correlate tag location data to a merchant location, and transmit the merchant location data. In an example embodiment, the merchant module 1210 may be further configured to cause the processor 1202 to receive a tag-application device correlator. In an example embodiment the merchant module 1210 may be further configured to receive blink data from a mobile merchant tag, and calculate merchant tag location data. In an example embodiment, the merchant module 1210 may be configured to cause the processor 1202 to receive a selected merchant information indication, generate merchant availability data, and transmit the merchant availability data. In an example embodiment, the merchant module 1210 may be further configured to cause the processor 1202 to receive a selected merchant availability data indication, generate a service request, and transmit the service request. In an example embodiment, the merchant module 1210 may be further configured to cause the processor 1202 to receive payment authorization data, generate a transaction confirmation data, and/or transmit the transaction confirmation data. In an example embodiment, the merchant module 1210 may be further configured to cause the processor 1202 to cause the transaction confirmation data to be stored in a memory 1204. In an example embodiment, the merchant module 1210 may be further configured to cause the processor 1202 to receive sensor position data and determine a position calculation data.

In an example embodiment, the apparatus 1200 may include a location module 1212, which may be, in turn, in communication with a processor 1202. The location module 1212 may be configured to cause the processor 1202 to receive tag blink data, calculate a tag location data, receive a location request, associate the tag location data to the location request, and transmit the tag location data associated with the location request. In an example embodiment, the location module 1212 may be further configured to cause the processor 1202 to transmit available location data and receive an indication of a selected location data indication.

In an example embodiment, the location module 1212 may be configured to cause the processor 1202 to receive and location request indication, transmit the location request indication, receive a location data associated with the location request, and cause the location data to be displayed on a user interface 1208. In an example embodiment, the location module 1212 may be further configured to cause the processor 1202 to receive a selected location data indication. In an example embodiment, the location module 1212 may be configured to cause the processor 1202 to receive available location data based on the location request and transmit a selected location data indication.

In an example embodiment, the location module 1212 may be configured to cause the processor 1202 to receive sensor data, associate the sensor data with a location tag, receive blink data from the tag, calculate tag location data, and determine a tag route data. In an example embodiment, the location module 1212 may be further configured to cause the processor 1202 to transmit a tag activation signal, select the tag for location monitoring, cause the tag route data to be displayed on a user interface 1208, and/or cause the tag route data to be stored in a memory 1204. In an example embodiment, the location module 1212 may be further configured to cause the processor 1202 to determine an experience enhancement data and transmit the experience enhancement data. In an example embodiment, the location module 1212 may be further configured to cause the processor 1202 to receive historical route data, receive historical transaction confirmation data, and/or receive transaction disruption data.

In an example embodiment, the location module 1212 may be configured to cause the processor to associate a tag UID with an application device, receive experience enhancement data. In an example embodiment, the location module 1212 is further configured to cause the processor to transmit a tag-application device correlator, In an example embodiment the apparatus 1200 may include a camera control module 1214 which may, in turn, be in communication with a processor 1202. The camera control module 1214 may be configured to cause the processor 1202 to transmit an application device correlator and receive camera data. In an example embodiment, the camera control module 1214 may be further configured to cause the processor 1202 to associate the tag-application device correlator with an application device, and transmit the tag-application device correlator. In an example embodiment, the camera control module 1214 may be further configured to cause the processor 1202 to receive an indication of an event occurrence and transmit the event occurrence data. In an example embodiment, the camera control module 1214 may be further configured to cause the processor 1202 to transmit the camera data, cause the camera data to be stored in a memory 1204, or cause the camera data to be displayed on an user interface 1208.

In an example embodiment, the camera control module 1214 may be configured to cause the processor 1202 to receive an application device identifier, receive blink data, calculate a location data, receive an event occurrence indication, determine a camera control data, and transmit the camera control data. In an example embodiment, the camera control module 1214 may be further configured to cause the processor 1202 to receive camera data, transmit camera data, cause the camera data to be displayed on a user interface 1208, and/or cause the camera data to be stored in a memory 1204. In an example embodiment, the camera control module 1214 may be further configured to cause the processor 1202 to receive a tag-application device correlator.

In an example embodiment, the camera control module 1214 may be configured to cause the processor 1202 to transmit an application device identifier for association with a tag, receive camera data, receive a camera data request, and transmit the camera data. In an example embodiment, the camera control module 1214 may be further configured to cause the processor 1202 to associate a tag UID with an application device, and transmit a tag-application device correlator.

In an example embodiment the camera control module 1214 may be configured to cause the processor 1202 to receive an application device identifier, associate an application device with a location tag, receive blink data from the location tag, calculate a location data, receive an event occurrence indication, generate a camera data request, transmit the camera data request, and receive camera data. In an example embodiment, the camera control module 1214 may be further configured to cause the processor 1202 to receive a tag-application device correlator. In an example embodiment, the camera control module 1214 may be further configured to cause the processor 1202 to cause the camera data to be stored in a memory 1204, cause the camera data to be displayed on a user interface 1208, and/or transmit the camera data.

FIGS. 13-22 illustrate example flowcharts of the operations performed by an apparatus, such as apparatus 1200 of FIG. 12, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 1204 of a processing module employing an embodiment of the present invention and executed by a processor 1202 in the processing module. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s).

As such, the operations of FIGS. 13-22 when executed, convert a computer or processing circuitry into a particular machine configured to perform an example embodiment of the present invention. Accordingly, the operations of FIGS. 13-22 define an algorithm for configuring a computer or processor, to perform an example embodiment. In some cases, a general purpose computer may be provided with an instance of the processor which performs the algorithm of FIGS. 13-22 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIGS. 13-22). It should be appreciated that each of the modifications, optional additions or amplifications described herein may be included with the operations herein either alone or in combination with any others among the features described herein.

Figure 13:
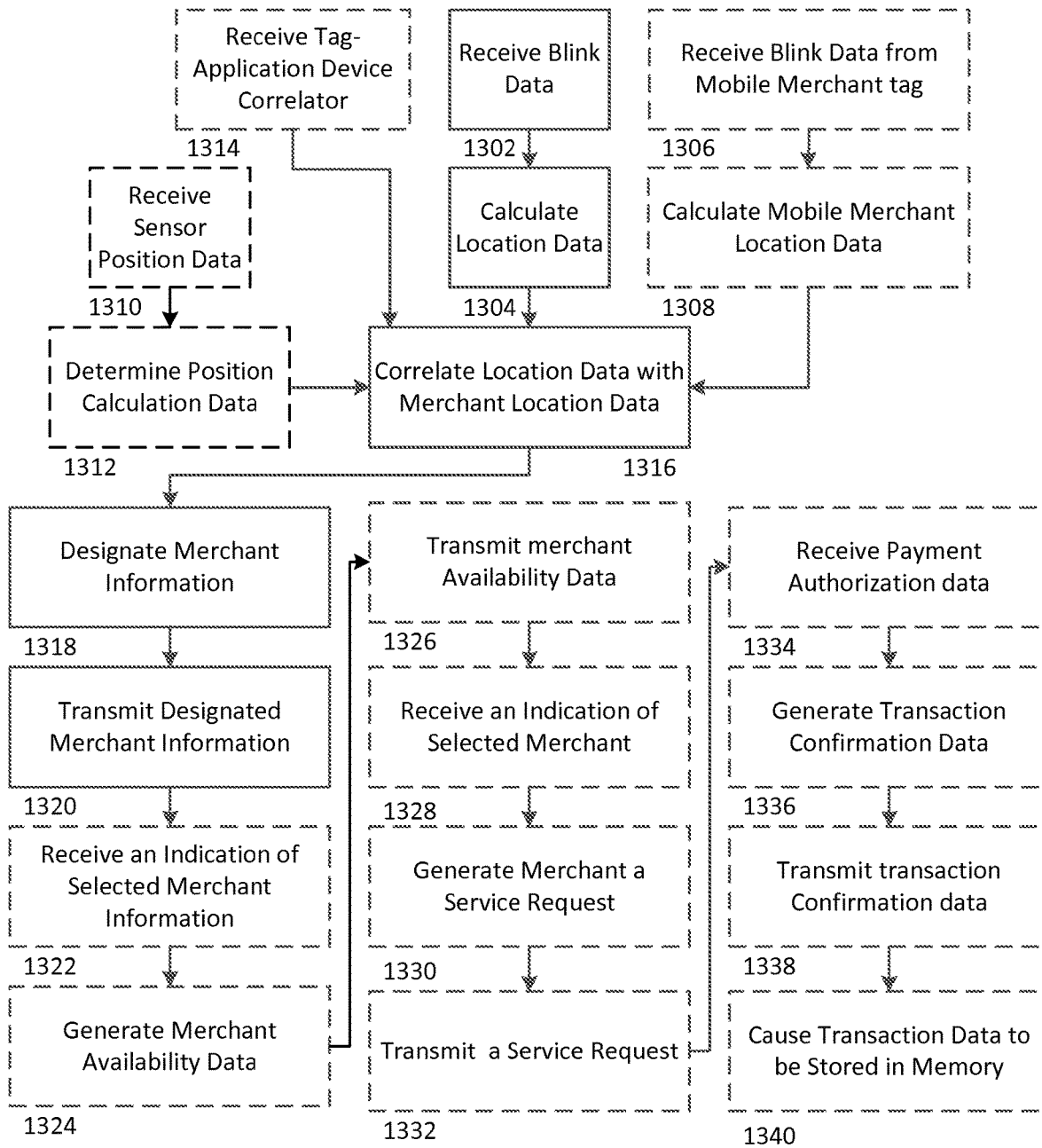
FIG. 13 illustrates an exemplary process from generating merchant information and merchant availability data in accordance with some embodiments of the present invention.

Exemplary Process for Generating Merchant Information and Merchant Availability Data FIG. 13 illustrates an exemplary process from generating merchant information and merchant availability data. At 1302, an apparatus, such as apparatus 1200 of FIG. 12 may include a merchant module 1210 configured to cause a processor 1202 to receive blink data from the communication circuitry 1206. The communication circuitry 1206 may receive the blink data from receivers 106, which, in turn, receive the blink data from tags 102.

At 1304, the merchant module 1210 may be configured to cause the processor 1202 to calculate location data based on the blink data. The calculation of location data is described above in FIG. 1.

At 1306, the merchant module 1210 may be configured to cause the processor 1202 to receive mobile merchant blink data from the communication circuitry 1206. The communication circuitry may receive the mobile merchant blink data from receivers 106, which, in turn, may receive the mobile merchant blink data from tags 102 associated with a mobile merchant.

At 1308, the merchant module 1210 may be configured to cause the processor 1202 to calculate mobile merchant location data based on the mobile merchant blink data. The calculation of location data is described above in FIG. 1.

At 1310. The merchant module 1210 may be configured to cause the processor 1202 to receive sensor position data from the communication circuitry 1206. The communication circuitry 1206 may receive the sensor position data from the sensor receivers 166, or through wired or wireless communication. The sensor position data may be triangulation positioning data such as GPS in an application device 510. Additionally or alternatively, the sensor position data based on reading a barcode, QR code, RFID chip, or the like with a sensor included in or in communication with an application device 510. The barcode, QR code, RFID chip, or the like may be associated with a venue position such as a ticket or a seat at an event.

At 1312, the merchant module 1210 may be configured to cause the processor 1202 to determine a position calculation data. The determination of a position calculation data is described in FIG. 3. The position calculation data may be used in the absence of tag location data at 1316 or to verify tag location data.

At 1314, the merchant module 1210 may be configured to cause the processor 1202 to receive a tag-application device correlator. The tag-application device correlator may be retrieved from a memory 1204, based on the received blink data tag identifier, such as tag UID, in an instance in which the tag-application device correlator was entered into the memory at registration of the tag and or application device 510.

In an example embodiment, the tag-application device correlator may be received by the communication circuitry 1206 from an application device 510. The tag-application device correlator may include a tag identifier, such as a tag UID and an application device identifier, such as an UID, a phone number, an IP address, or the like. The processor 1202 may use the tag-application device correlator to direct transmissions and receipts of the data described below.

At 1316, the merchant module 1210 may be configured to cause the processor 1202 to correlate the location data with a merchant location data. The processor may correlate the location data calculated at 1304 with merchant location data. Merchant location data may be fixed locations such as concession stands, security offices, emergency service offices, information desks, or the like. In an instance in which the merchant location data is a fixed location, the location may be determined by association of a tag 102 and calculation of location data associated with the merchant. Additionally, or alternatively the merchant location data may be entered into a location database.

In an instance in which the merchant location is associated with a mobile merchant, the merchant location data may be calculated as discussed at 1308. Mobile merchants may include security guards, EMTs, roving vendors, cart vendors, or the like. In an example embodiment, the processor 1202 may additionally or alternatively correlate position calculation data with merchant location data. The processor 1202 may correlate the location data with the merchant location data based on the entire venue or a portion of the venue, such as a side, section, quadrant, proximity radii, or the like.

At 1318, the merchant module 1210 may be configured to cause the processor to designate merchant information based on the correlation of location data and merchant location data. The merchant information may include merchandise available for purchase, such as food, memorabilia, tickets to other events, or the like. Merchant information may also include services such as security, information, emergency services, or the like. For example the merchant information may include food, such as hotdogs, beer, cheeseburger and soda combo, and pretzels. In another example the merchant information may include merchandise such as jerseys, mini helmets, towels, pictures, or the like. In another example, the merchant information may include security services, medical services, information desks, or the like.

At 1320, the merchant module 1210 may be configured to cause the processor 1202 to cause the communication circuitry 1206 to transmit the merchant information to the application device 510. The processor 1206 may address the transmission of the merchant information based on the tag-application device correlator. The communication circuitry 1206 may transmit the merchant information using, Wi-Fi, cellular signals, or the like.

At 1322, the merchant module 1210 may be configured to cause the processor 1202 to receive a selected merchant information indication from the communication circuitry 1206. The communication circuitry 1206 may receive the selected merchant information from the application device 510. The selected merchant information indication may include the services and/or merchandise desired and selected on the application device 510. For example, the selected merchant indication may include 4 hotdogs, 2 beers, and a cheeseburger and soda combo; a jersey and a mini helmet, security request; or the like.

At 1324, the merchant module 1210 may be configured to cause the processor 1202 to generate merchant availability data. The provide availability data may include merchants and the services or merchandise they may provide from the selected merchant information. For example, in an instance in which the selected merchant information is 2 beers, 4 hotdogs, and a cheeseburger and soda combo, the merchant availability may include one merchant which may offer 2 beers, a second merchant that may provide 2 beers, 4 hotdogs, and the cheeseburger and soda combo, and a third merchant that may provide 4 hotdogs. The merchant availability data may further include location data for each merchant.

At 1326, the merchant module 1210 may be configured to cause the processor 1202 to cause the communication circuitry 1206 transmit the merchant availability data to the application device 510. The processor 1202 may address the transmission of the merchant availability data using the tag-application device correlator. The communication circuitry 1206 may transmit the merchant availability data using Wi-Fi, cellular signals, or the like.

At 1328, the merchant module 1210 may be configured to cause the processor 1202 to receive a selected merchant availability data indication from the communication circuitry 1206. The communication circuitry 1206 may receive the selected merchant availability data indication from the application device 510. The selected merchant availability may include a merchant and associated services and/or merchandise selected from the merchant availability data. The selected merchant availability data may include a single merchant that may provide all of the services or merchandise designated in the selected merchant information indication, or one or more merchants that may provide all or a portion of the selected services or merchandise. For example, a single merchant providing the 2 beers, 4 hotdogs, and the cheeseburger and soda, such as a concession stand, or one or more of the merchants associated with the 4 hotdogs and/or 2 beers, such as a roving hotdog vender and a beer cart. In other examples the selected merchant availability data may be the closest security guard, or EMT, or the souvenir shop for the jersey and mini helmet, or a roving merchandise vender for the jersey only.

At 1330, the merchant module may be configured to cause the processor 1202 to generate a service request. A service request may include a transaction description data based on the selected merchant availability data, and the merchant location data, such as a pick up station 504, mobile merchant 506, or a patron location data. Transaction description data may include selected service or merchandise, the selected merchant, the price associated with the transaction, patron identifier, or the like. For example, merchant #279, 4 hotdogs, 2 beers, and a cheeseburger and soda combo; $27.00; the merchant location data for the concession stand pickup station: and Jon Caston or seat #175.

At 1332, the merchant module 1210 may be configured to cause the processor 1202 to cause the communication circuitry 1206 to transmit the service request. The communication circuitry may transmit the service request to a merchant computing device or application device 510 through wired or wireless communication. The processor 1202 may address the transmission of the service request using the tag-application device correlator. The communication circuitry 1206 may transmit the service request to the application device 510 using Wi-Fi, cellular signals, or the like.

At 1334, the merchant module 1210 may be configured to cause the processor 1202 to receive payment authorization data from the communication circuitry 1206. The communication circuitry 1206 may receive the payment authorization data from the merchant computing device or the application device 510. The payment authorization data may include account data, personal data, or the like for identification of the proper person and funds or account to take payment. In an example embodiment, the merchant may enter a payment authorization data for the receipt of cash into the merchant computing device or application device 510.

At 1336, the merchant module 1210 may be configured to cause the processor 1202 to generate transaction confirmation data. Transaction confirmation data may be generated in response to receiving a payment authorization data. Transaction confirmation data may include merchant information, services or merchandise purchased or received, payment authorization data, or the like.

At 1338, the merchant module 1210 may be configured to cause the processor 1202 to cause the communication circuitry 1206 to transmit the transaction confirmation data. The processor 1202 may address the transmission of the transaction confirmation data using the tag-application device correlator. The communication circuitry 1206 may transmit the transaction confirmation data to the application device 510 through Wi-Fi, cellular signals, or the like. Additionally, or alternatively, the communication circuitry 1206 may transmit the transaction confirmation data to various account services, such as credit card services, reward card services, bank services, or the like through wired or wireless communication.

At 1340, the merchant module 1210 may be configured to cause the processor 1202 to cause the transaction data in a memory 1204. The transaction confirmation data may be stored to memory 1204 for local or redundant record keeping and/or transaction analysis as historical transaction data.

Figure 14:
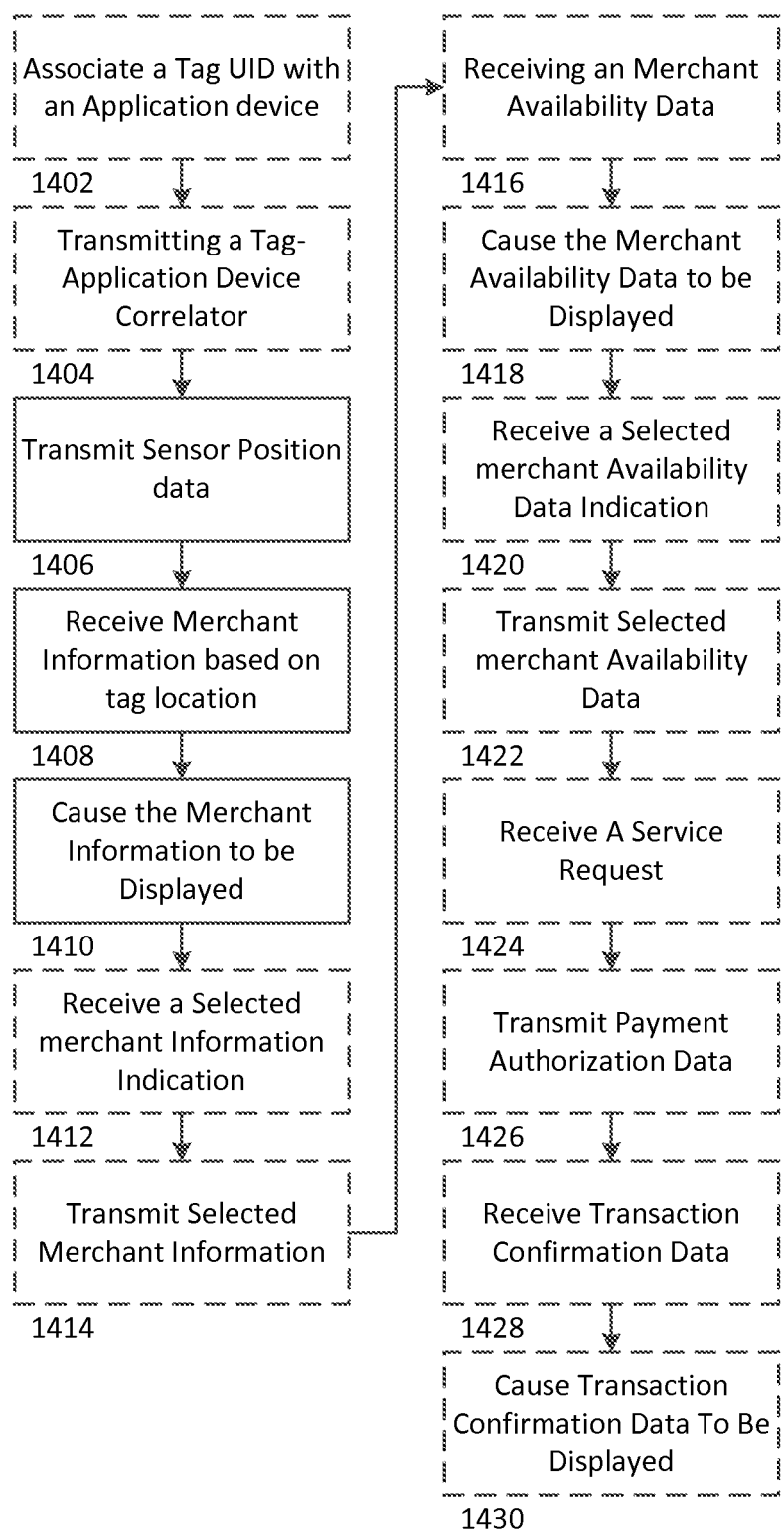
FIG. 14 illustrates an exemplary process for generating merchant information and merchant availability data selection in accordance with some embodiments of the present invention.

Exemplary Process for Merchant Information and Merchant Availability Data Selection FIG. 14 illustrates an exemplary process for merchant information and merchant availability data selection. At 1402, the apparatus 1200 may include a merchant module 1210 configured to cause the processor 1202 to associate a tag UID with an application device 510. The processor 1202 may generate a tag-application device correlator. The tag-application device correlator may include a tag identifier, such as a tag UID and an application device identifier, such as an UID, a phone number, an IP address, or the like. The tag-application device correlator may be used to address transmissions and receipts of data from an application device 510 as described below.

At 1404, the merchant module 1210 may be configured to cause the processor 1202 to cause the communication circuitry 1206 to transmit the tag-application device correlator to the receiver hub 108 or receiver processing and distribution system 110. The communications circuitry 1206 may transmit the tag-application device correlator using Wi-Fi, cellular signals, or the like.

At 1406, the merchant module 1210 may be configured to cause the processor 1202 to cause the communication device to transmit sensor position data. The communications circuitry 1206 may be in communication with a sensor, such as the sensors 203 discussed in FIG. 3. The sensor may include a barcode reader, QR code reader, a RFID reader, or a triangulation positioner, such as GPS. The sensor position data generated may be associated with a venue position, such as a ticket or a seat at an event derived from a barcode or QR code on a ticket or seat, or an RFID chip embedded in a seat. The processor 1202 may cause the communication circuitry 1206 to transmit the sensor position data to the receiver hub 108 or receiver processing and distribution system 110 using Wi-Fi, cellular signals, or the like.

At 1408, the merchant module 1210 may be configured to cause the processor 1202 to receive merchant information from the communication circuitry 1206. The communication circuitry 1206 may receive the merchant information from the receiver hub 108 or receiver processing and distribution system 110. The merchant information may include merchandise available for purchase, such as food, memorabilia, tickets to other events, or the like. Merchant information may also include services such as security, information, emergency services, or the like. For example the merchant information may include food, such as hotdogs, beer, cheeseburger and soda combo, and pretzels. In another example, the merchant information may include merchandise such as jerseys, mini helmets, towels, pictures, or the like. In another example, the merchant information may include security services, medical services, information desks, or the like.

At 1410, the merchant module 1210 may be configured to cause the processor 1202 to display the merchant information on a user interface 1208. For example, the merchant information displayed on the user interface 1208 may include hotdogs, cheeseburger and soda combo, and beer as shown and described in FIG. 6*a*.

At 1412, the merchant module may be configured to revive a selected merchant information indication from the user interface 1208. The selected merchant information indication may include the services and/or merchandise selected on the using the user interface 1208. For example, the selected merchant indication may include 4 hotdogs, 2 beers, and a cheeseburger and soda combo; a jersey and a mini helmet, security request; or the like.

At 1414, the merchant module 1210 may be configured to cause the processor 1202 to cause the communication circuitry 1206 to transmit the selected merchant information. The transmission circuitry 1208 may transmit the selected merchant information to the receiver hub 108 or receiver processing and distribution system 110 using Wi-Fi, cellular signals, or the like.

At 1416, the merchant module 1210 may be configured to cause the processor 1202 to receive merchant availability data from the communication circuitry 1206. The communication circuitry 1206 may receive the merchant availability data from the receiver hub 108 or receiver processing and distribution system 110. The merchant availability data may include merchants and the services or merchandise they may provide from the selected merchant information. For example, in an instance in which the selected merchant information is 2 beers, 4 hotdogs, and a cheeseburger and soda combo, the merchant availability may include one merchant which may offer 2 beers, a second merchant that may provide 2 beers, 4 hotdogs, and the cheeseburger and soda combo, and a third merchant that may provide 4 hotdogs. The merchant availability data may further include location data for each merchant.

At 1418, the merchant module 1210 may be configured to cause the processor 1202 to display the merchant availability data on a user interface 1208. For example in an instance in which the selected merchant information is 2 beers, 4 hotdogs, and a cheeseburger and soda combo, the merchant availability displayed on the user interface 1208 may include one merchant which may offer 2 beers, a second merchant that may provide 2 beers, 4 hotdogs, and the cheeseburger and soda combo, and a third merchant that may provide 4 hotdogs, as shown in Figure and described in 6*b*. Additionally, the location data associated with each available merchant may be displayed on the available merchant location rendering (e.g. map).

At 1420, the merchant module 1210 may be configured to cause the processor 1202 to receive a selected merchant availability data indication from the user interface 1208. The selected merchant availability may include a merchant and associated services and merchandise selected from the merchant availability data. The selected merchant availability data may include a single merchant that may provide all of the services or merchandise designated in the selected merchant information, or one or more merchants that may provide all or a portion of the selected services or merchandise. For example, a single merchant providing the 2 beers, 4 hotdogs, and the cheeseburger and soda, such as a concession stand, or one or more of the merchants associated with the 4 hotdogs and/or 2 beers, such as a roving hotdog vender and a beer cart. In other examples the selected merchant availability data may be the closest security guard, or EMT, or the souvenir shop for the jersey and mini helmet, or a roving merchandise vender for the jersey only.

At 1422, the merchant module 1210 may be configured to cause the processor 1202 to cause the communication circuitry 1206 to transmit the selected merchant availability data. The communication circuitry 1206 may transmit the selected merchant availability data to the receiver hub 108 or receiver processing and distribution system 110 using Wi-Fi, cellular signals or the like.

At 1424, the merchant module 1210 may be configured to cause the processor 1202 to receive a service request from the communication circuitry 1206. The communication circuitry may receive the service request from the receiver hub 108 or receiver processing and distribution system 110. A service request may include a transaction description data based on the selected merchant availability data, and the merchant location data, such as a pick up station 504, mobile merchant 506, or a patron location data. Transaction description data may include selected service or merchandise, the selected merchant, the price associated with the transaction, patron identifier, or the like. For example, merchant #279, 4 hotdogs, 2 beers, and a cheeseburger and soda combo; $27.00; the merchant location data for the concession stand pickup station: and Jon Caston or seat #157.

At 1426, the merchant module 1210 may be configured to cause the processor 1202 to transmit a payment authorization data. The payment authorization data may include account data, personal data, or the like for identification of the proper person and funds to take payment. The payment authorization data may be entered on a user interface 1208, such as credit card information, or reward account information. The payment data may be retrieved from a memory 1204, in an instance in which the payment authorization data was stored for later use. In an example embodiment the processor 1202 may be in communication with a sensor, such as the sensors 203 discussed in FIG. 3. The sensor may be a magnetic strip reader, RFID reader, Barcode reader, QR code reader, or the like. The sensor may generate payment authorization data based on the sensor 203 reading the magnetic strip, such as on a credit card or reward card, reading a barcode or QR code, such as associated with a ticket, or an RFID chip, such as associated with a season pass card. The communication circuitry 1206 may transmit the payment authorization data using Wi-Fi, cellular signals, or the like to the receiver hub 108 or receiver processing and distribution system 110.

At 1428, the merchant module 1210 may be configured to cause the processor 1202 to receive transaction confirmation data from the communication circuitry 1206. The transaction confirmation data may include merchant information, services or merchandise purchased, payment authorization data, or the like.

At 1430, the merchant module 1210 may be configured to cause the processor to cause the display of the transaction confirmation data on a user interface 1208. The transaction confirmation data may be displayed on the user interface 1208 for confirmation of purchase, proof of purchase, and/or use of the merchant location data.

Exemplary Process for Transmitting a Location Data Based on a Location Request

Figure 15:
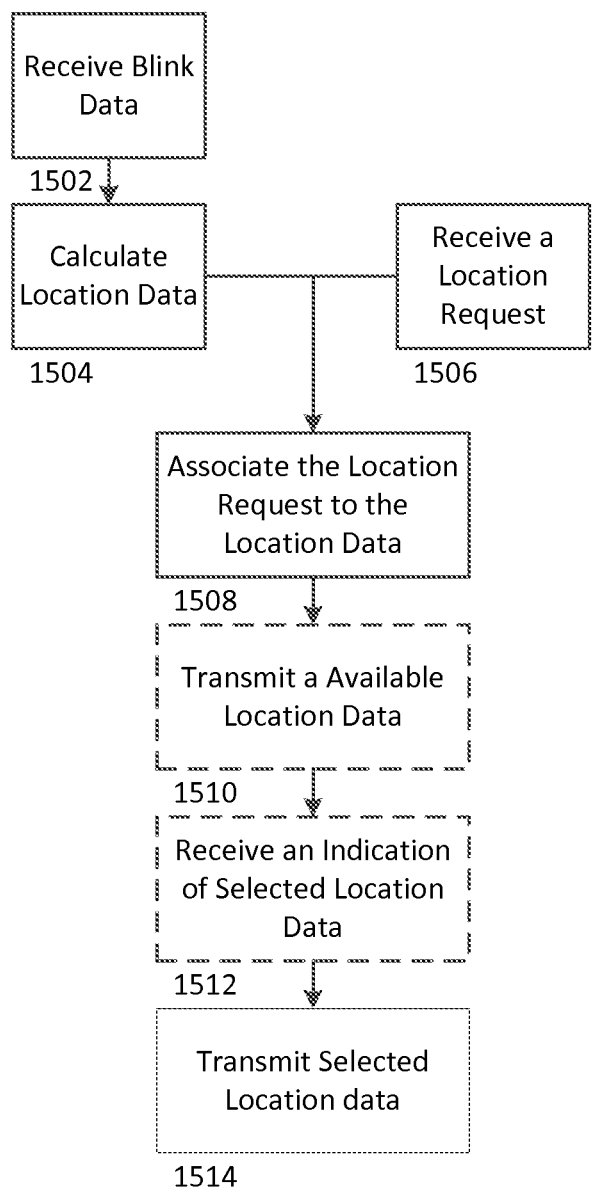
FIG. 15 illustrates an exemplary process for transmitting a location data based on a location request in accordance with some embodiments of the present invention.

FIG. 15 illustrates an exemplary process for transmitting a location data based on a location request. At 1502, the apparatus, such as apparatus 1200, may include a location module 1212, which may be configured to cause the processor 1202 to receive blink data from the communication circuitry 1206. The communication circuitry 1206 may receive the blink data from receivers 106, which, in turn may receive the blink data from a tag 102.

At 1504, the location module may be configured to cause the processor 1202 to calculate location data based on the blink data. The calculation of blink data is discussed above in FIG. 1.

In an example embodiment, the location data of fixed locations or facilities such as restrooms, information desks, meeting points, security offices, emergency services office, or the like may be stored in a memory 1504. The location data associated with fixed locations may be accessed by the processor 1202 and use in an instance in which no tag is associated with the fixed position.

At 1506, the location module 1212 may be configured to cause the processor 1212 to receive a location request from the communication circuitry 1206. The communication circuitry 1206 may receive the location request from an application device 510. The location request may include the tag UID, person, personality, or group identifier, such as a name, or other information for determine the requested parties and associated location data. The location request may also include identifiers for fixed locations or facilities, such as restrooms, information desks, meeting points, security offices, emergency services office, or the like.

At 1508, the location module 1212 may be configured to cause the processor 1202 to associate the location data to the location request. The processor 1202 may use the identifying information from the location request such as tag UID or name to determine the location data associated. For example the location data associated with a specific patron with a tag, a specific gate, the mascot, a VIP, or the like.

In an example embodiment, in which there are multiple location data available or the location request contains identifiers for multiple parities, the processor 1202 may generate available location data. For example, a group of patrons associated with tags, restrooms, merchants of services or merchandise, meeting points, or the like. The available location data may contain a list including identifiers, distance, or the like for each location data associated with the location request. For example, if only 3 of the 4 persons of the location request have associated location data the processor 1202 may generate available location data including identifiers, such as names for the 3 persons with location data. In another example, the location request may be for restrooms; the processor 1202 may associate the location request with the location data for all restrooms, or restrooms in the same section, quadrant, proximity radii, or the like and generate available location data based on the associated location data.

At 1510, the location module 1212 may be configured to cause the processor 1202 to transmit the available location data to the application device using the communication circuitry 1206. The processor 1202 may address the transmission of the available location data using the tag-application device correlator. The communication circuitry may transmit the available location data using Wi-Fi, cellular signals, or the like.

At 1512, the location module 1212 may be configured to cause the processor 1202 to receive a selected available location data indication from the communication circuitry 1206. The communication circuitry 1206 may receive the selected available location indication from the application device 510. The selected available location data may include the identifier of one or more locations data identifiers from the available location data.

At 1514, the location module 1212 may be configured to cause the processor 1202 to transmit location data using the communication circuitry 1206. The processor may transmit the location data for the one or more selected available location data. In an instance in which the location request rendered a single location data, the processor 1202 may cause the transmission of the location data. The processor 1202 may address the transmission of the location data using the tag-application device correlator. The communication circuitry 1206 may transmit the location data to the application device 510 using Wi-Fi, cellular signals, or the like.

Exemplary Process for an Application Device Location Request

Figure 16:
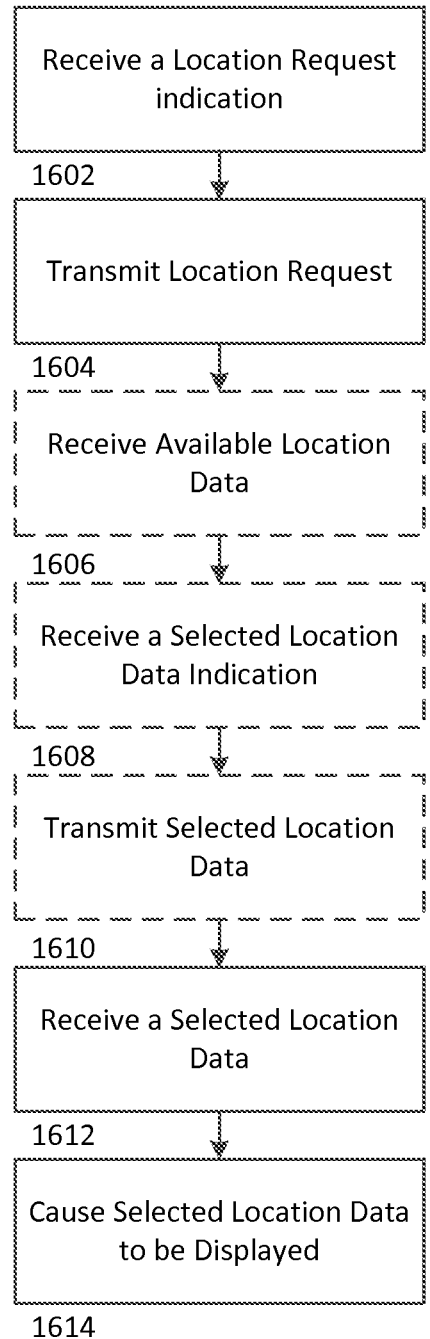
FIG. 16 illustrates an exemplary process for an application device location request in accordance with some embodiments of the present invention.

FIG. 16 illustrates an exemplary process for an application device location request. At 1602, the apparatus 1200 may include a location module 1212 configured to cause the processor 1202 to receive a location request indication from the user interface 1208. The user interface 1208 may be used to select identifiers for personnel or facilities. The processor 1202 may generate a location request based on the location request indication. The location request may include the tag UID, person, personality, or group identifier, such as a name, or other information for determination of the requested parties or mobile merchants and associated location data. The location request may also include identifiers for fixed locations or facilities, such as restrooms, information desks, meeting points, security offices, emergency services office, or the like.

At 1604, the location module 1212 may be configured to cause the processor 1202 to transmit the location request using the communication circuitry 1206. The communication circuitry 1206 may transmit the location request to the receiver hub 108 or receiver processing and distribution system 110 using Wi-Fi, cellular signals, or the like.

At 1606, the location module 1212 may be configured to cause the processor 1202 to receive an available location data from the communication circuitry 1206. The communication circuitry 1206 may receive the available location data from the receiver hub 108 or receiver processing and distribution system 110. The available location data may include a list including identifiers, distance, or the like for each location data associated with the location request. For example, if only 3 of the 4 persons of the location request have associated location data the available location data may include identifiers, such as names for the 3 persons with location data. In another example, the location request may be for restrooms, the available location data associated with the location request may be identifiers, distance or the like for all restrooms, or restrooms in the same section, quadrant, or the like. The processor 1202 may cause the availability data to be displayed on the user interface 1208.

At 1608, the location module may be configured to receive a selected availability data indication from the user interface 1208. The selected available location data may include the identifier of one or more locations data identifiers from the available location data.

At 1610, the location module 1212 may be configured to cause the processor 1202 to transmit the selected availability data using the communication circuitry 1206. The communication circuitry 1206 may transmit the available location data to the receiver hub 106 or receiver processing and distribution system 110 using Wi-Fi, cellular signals, or the like.

At 1612, the location module 1212 may be configured to cause the processor 1202 to receive a selected location data from the communication circuitry 1206. The communication circuitry 1206 may receive the selected location data from the receiver hub 108 or receiver processing and distribution system 110. The selected location data may include the location data for one or more of the personnel or facilities selected from the available location data or location request. For example, the location data associate with one or more patrons associated with a tag 102, a restroom, the mascot, a VIP, the main gate, or the like At 1614, the location module 1212 may be configured to cause the processor 1202 to display the location data on the user interface 1208. The user interface may display the location data as a map, proximity ring, or other location rendering.

Exemplary Process for Determining a Tag Route

Figure 17:
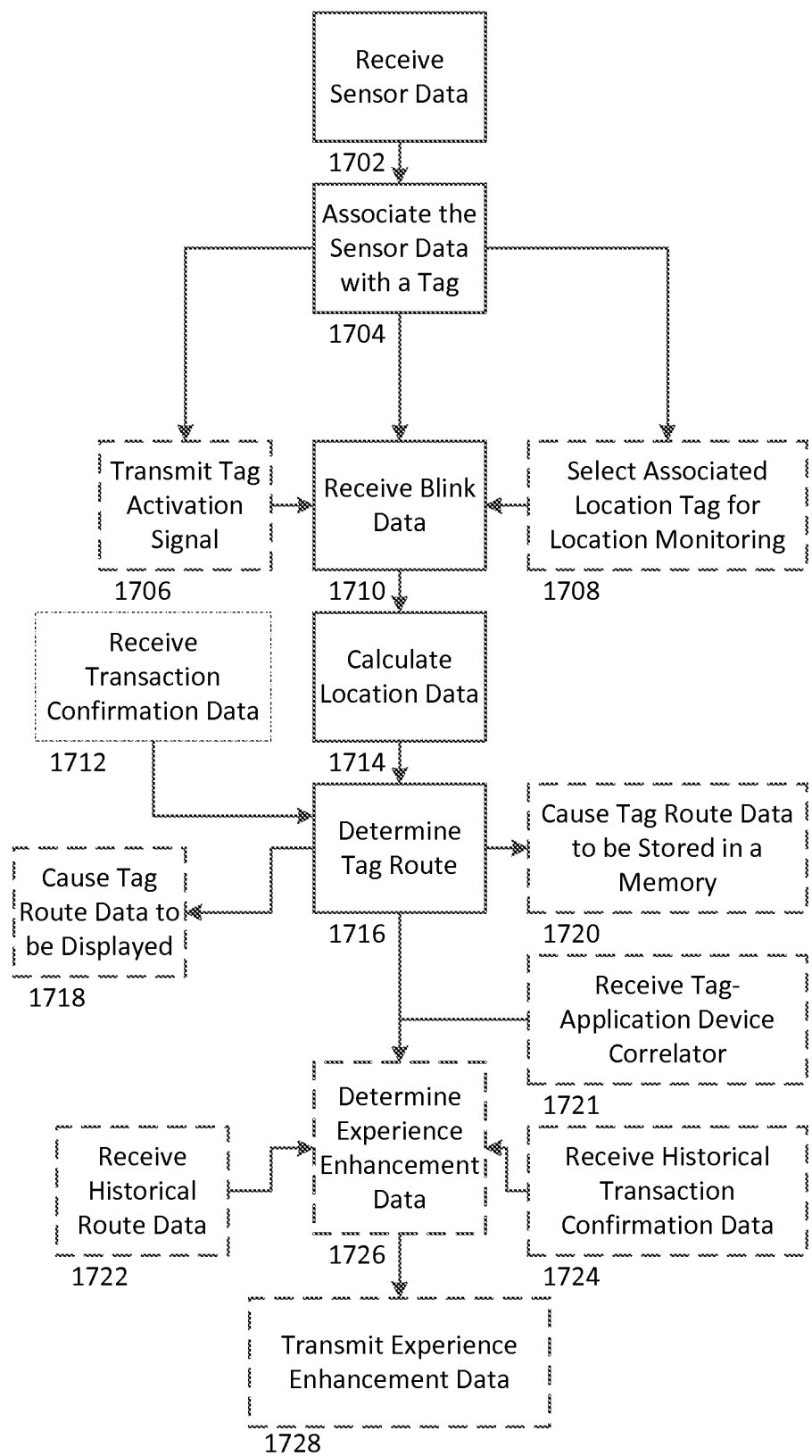
FIG. 17 illustrates an exemplary process for determining a tag route in accordance with some embodiments of the present invention.

FIG. 17 illustrates an exemplary process for determining a tag route. At 1702, the apparatus 1200 may include a location module 1212 which may be configured to cause the processor 1202 to receive sensor data from the communication circuitry 1206. The communication circuitry 1206 may be in communication with a sensor 203 similar to sensors 203 described in FIG. 3. The sensors may include a barcode reader, a QR code reader, and RFID reader, or the like. The sensor read an identifier such as a barcode, such as on a ticket, QR code, or RFID chip in an object or card may be associated with a tag 102. The sensor 203 may generate sensor data, such as a tag-sensor correlator, including the tag UID, sensor UID or other information associating the tag- with the sensor.

In an example embodiment, the sensor data may further include an application device identifier, such as an application device UID, phone number, IP address, or the like which may be associated with the tag 102 and/or the identifier read by the sensor.

At 1704, the location module 1212 may be configured to cause the processor 1202 to associate the tag 102 with the sensor data. The processor 1202 may associate the tag to the sensor data based on the tag-sensor correlator or retrieve the associated tag data based on a sensor identifier, such as a sensor UID stored in a memory 1204.

In an example embodiment, the processor may also associate an application device 510 with the tag, based on the received sensor data. The application device identifier may be a portion of the tag-sensor correlator, or retrieved from a memory 1204, which may have been entered at registration of the tag 102, identifier, or application device 510.

At 1706, the location module 1212 may be configured to cause the processor 1202 to cause the communication circuitry 1206 to transmit a tag activation signal. The communication circuitry 1206 may transmit a tag activation signal to exciters 114. The exciters 114 may transmit a short range low frequency signal to the associated tag 102 to commence blink data transmissions.

At 1708, the location module 1212 may be configure to cause the processor 1202 to select the tag 102 associated with the sensor data for location monitoring. The processor 1202 may identify the tag UID associated with the sensor data, which may include a tag-sensor correlator, and commence monitoring of the tag 102 blink data and calculating location data as discussed below.

At 1710, the location module 1212 may be configured to cause the processor 1202 to receive blink data from the communication circuitry 1206. The communication circuitry 1206 may receive the blink data from receivers 106 which, in turn, may receive the blink data from a tag 102.

At 1714, the location module 1212 may be configured to cause the processor 1202 to calculate location data based on the blink data received from the tag 102. The calculation of location data is discussed above in FIG. 1.

At 1716, the location module 1212 may be configured to receive transaction confirmation data. The processor may receive transaction data associated with the patron associated with the tag 102. The transaction confirmation data may include merchant information, services or merchandise purchased, payment authorization data, or the like associated with the patron and/or tag 102. The generation of transaction data is described above in FIGS. 5 and 13.

At 1718, the location module 1212 may be configured to cause the processor 1202 to determine route data. Route data may be based on the location data associated with the patron and secondary location data. Secondary location data may include the location data and/or proximity radii of other tags 102 or fixed location data, associated with other patrons, merchants, facilities, or the like as discussed above in FIGS. 5 and 13. The route may include the location data for the tag 102 as the tag travels throughout the venue, and secondary location data of patrons, merchants, facilities, or the like that the patron associated with the tag 102 may have interacted with. In an example embodiment, the route data may include the time of entry and exit of the venue based on an event or universal clock. In an example embodiment the route data may include other time based location data, such as stationary or slow travel indication a line for a service or facility that the tag 102 is near.

In an example embodiment, the processor 1202 may associate transaction confirmation data associated with the patron associated with the tag 102 with the route data. For example, the route data may include the purchases of services or merchandise items and the location data associated with the transaction confirmation data, providing an indication of what the patron has purchased, where it was purchased and time information based on the event and/or universal clock.

At 1718, the location module 1212 may be configured to cause the processor 1202 to cause the route data to be displayed on a user interface 1208. The route data displayed on the user interface 1208 may be used to determine merchant wait times, congestion areas of the venue, better deployment of merchants, deployment of advertising, or the like.

At 1720, the location module 1212 may be configured to cause the processor 1202 to store the route data in a memory 1204. The route data may be stored for later analysis of the venue flow and interactions, diagnostics of the location system, determination of experience enhancement data, or the like.

At 1721, the location module 1212 may be configured to cause the processor 1202 to receive a tag-application device correlator from communication circuitry 1206. The communication circuitry may receive the tag-application device correlator from the application device 510. The tag-application device correlator may be received in an instance in which the application device 510 had not been previously correlated with the tag at 1702 or 1704. The tag-application device correlator may include a tag identifier, such as a tag UID and an application device identifier, such as an UID, a phone number, an IP address, or the like. The processor 1202 may use the tag-application device correlator to direct transmissions of experience enhancement data described below.

At 1722, the location system 1212 may be configured to cause the processor 1202 to receive historical route data from a memory 1204. The processor 1202 may receive historical route data including route data associated with the tag 102 in previous events, or route data associated with tags 102 associated with other patrons at the current or previous events.

At 1724, the location module 1212 may be configured to cause the processor 1202 to receive historical transaction confirmation data from a memory 1204. The processor 1202 may receive historical transaction confirmation data associated with the tag 102 during previous events, or historical transaction confirmation associated with other patrons or merchants at the current or previous events.

At 1726, the location module 1212 may be configured to cause the processor 1202 to determine an experience enhancement data. The experience enhancement data may be based on the current route data, historical route data, historical or current transaction confirmation data, or the like. The experience enhancement data may include the locations of merchants, personnel, or facilities; time periods recommended for using merchants or facilities; and/or merchant information. For example, in an instance in which the tag location of the tag route is calculated proximate to a restroom, or in route to a restroom, the processor 1202 may determine that there is currently or historically been a long wait at that particular restroom. The processor 1202 may generate experience enhancement data including the location of an alternate restroom, the reason for the experience enhancement data (e.g. long wait at restroom #345, restroom #344 location), or the like.

In another example the processor 1202 may determine that the patron associated with the tag 102 uses the restroom between the 6$^{th}$ and 7$^{th}$ inning of a baseball game based on historical route data associated with the tag or patron. The processor 1202 may generate experience enhancement data based on the route data and historical route data including a time period or periods with shorter restroom wait times, such as between the top and bottom of the 6$^{th}$ inning.

In an example embodiment, the processor 1202 may generate experience enhancement data that is further based on transaction confirmation data, and or historical confirmation data. The processor may determine that the tag location of the tag route is proximate to a merchant (as depicted in FIG. 7), or may be in route to a merchant, such as a concession stand, or mobile merchant based on the route data, merchant location data, or the like. The processor 1202 may determine that there is or historically been a high volume of transactions at the merchant during this period. The generated experience enhancement data may include an alternate merchant that is or has in the past had lower transaction volume based on the transaction confirmation data. Additionally or alternatively, the experience enhancement data may include an alternative time or period to purchase the service or merchandise. In an example embodiment, the experience enhancement data may be the location of the proximate merchant and or the merchant information as discussed in FIGS. 7 and 13.

In another example, the experience enhancement data may be determined based on transaction data. For example, the patron may have purchased 4 beverages; the experience enhancement data may include the location of restrooms, approximate wait times, and recommended periods to use the facility with historically low wait times.

At 1728, the location module 1212 may be configured to cause the processor 1202 to cause the communication circuitry 1206 to transmit the experience enhancement data. The processor 1202 may address the transmission of the experience enhancement data using the tag-application device correlator. The communication circuitry 1206 may transmit the experience enhancement data to an application device 510 associated with the tag 102 using Wi-Fi, cellular signals, or the like.

Exemplary Process for Receiving Experience Enhancement Data

Figure 18:
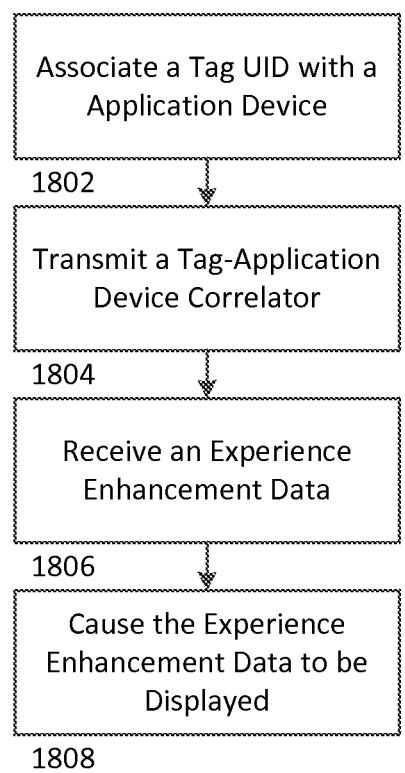
FIG. 18 illustrates an exemplary process for receiving experience enhancement data in accordance with some embodiments of the present invention.

FIG. 18 illustrates an exemplary process for receiving experience enhancement data. At 1802, the apparatus 1200 may include a location module 1212 configured to cause the processor 1202 to associate a tag UID with an application device 510. The processor 1202 may generate a tag-application device correlator. The tag-application device correlator may include a tag identifier, such as a tag UID and an application device identifier, such as an UID, a phone number, an IP address, or the like.

At 1804, the location module 1212 may be configured to cause the processor 1202 to cause the communication circuitry 1206 to transmit the tag-application device correlator to the receiver hub 108 or receiver processing and distribution system 110. The communications circuitry 1206 may transmit the tag-application device correlator using Wi-Fi, cellular signals, or the like.

At 1806, the location module 1212 may be configured to cause the processor 1202 to receive experience enhancement data from the communication circuitry 1206. The communication circuitry may receive the experience enhancement data from the receiver hub 108 or receiver processing and distribution system 110. The experience enhancement data may be based on route data associated with the tag UID, secondary location data associated with other tags 102, or fixed location merchants or facilities, historical route data for the associated tag or other tags, transaction confirmation data associated with the tag or patron and/or historical transaction confirmation data. The determination of experience enhancement data is discussed above in FIG. 17. The experience enhancement data may include the locations of merchants, personnel, or facilities; time periods recommended for using merchants or facilities; and/or merchant information.

For example, in an instance in which the associated tag location of the tag route is calculated proximate to a restroom, or in route to a restroom, the processor 1202 receive experience enhancement data including the location of an alternate restroom, the reason for the experience enhancement data (e.g. long wait at restroom #345, restroom #344 location), or the like.

In another example, in which the receiver hub 108 or receiver processing and distribution system has determined the patron associated with the tag 102 uses the restroom between the 6$^{th}$ and 7$^{th}$ inning of a baseball game based on historical route data associated with the tag or patron. The processor 1202 may receive experience enhancement data including a time period or periods with shorter restroom wait times, such as between the top and bottom of the 6$^{th}$ inning.

In an example embodiment, in which the receiver hub 108 or receiver processing and distribution system has determined that the tag location of the tag route is proximate to a merchant (as depicted in FIG. 7), or may be in route to a merchant, such as a concession stand, or mobile merchant based on the route data, merchant location data, or the like and that there is or historically been a high volume of transactions at the merchant during this period. The processor may receive experience enhancement data including an alternate merchant that is or has in the past had lower transaction volume. Additionally or alternatively, the experience enhancement data may include an alternative time or period to purchase the service or merchandise. In an example embodiment, the received experience enhancement data may be the location of the proximate merchant and or the merchant information as discussed in FIGS. 7 and 13.

In an example embodiment, the experience data may be based on transaction data associated with the patron. For example, in an instance in which the patron has purchased several beverages, the experience enhancement data may provide the location of restrooms, approximate wait times, and recommended periods to use the facility with historically low wait times.

At 1804, the location module may be configured to cause the processor 1202 to display the experience enhancement data on a user interface 1208. The displayed experience enhancement data may be a textual message describing the reason for the experience enhancement data, or describing the experience enhancement data, a map or other location data rendering to display alternate merchant or facility location data.

Exemplary Process for Receiving Camera Data Associated with a Tag Location Data

Figure 19:
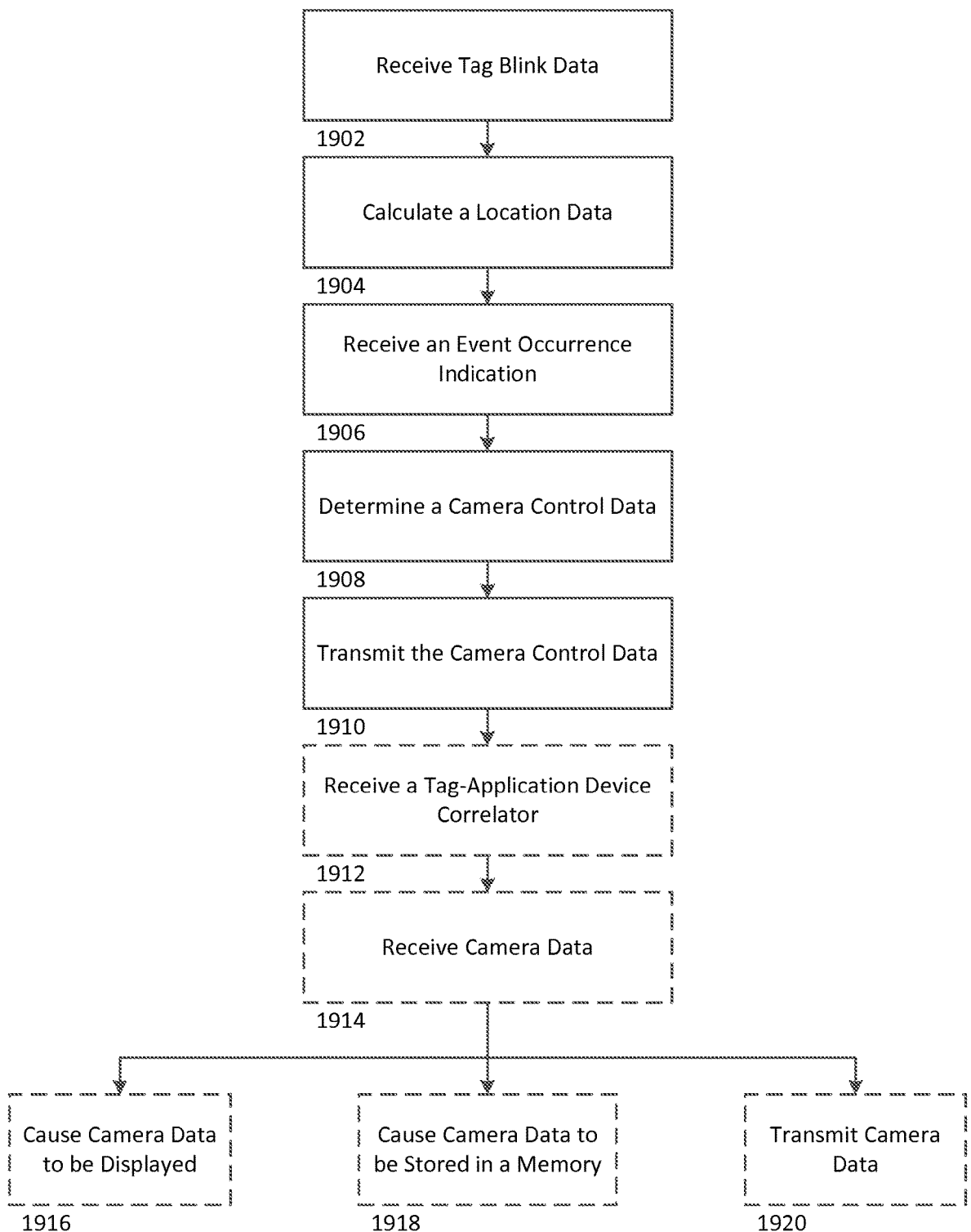
FIG. 19 illustrates an exemplary process for receiving camera data associated with a tag location data in accordance with some embodiments of the present invention.

FIG. 19 illustrates an exemplary process for receiving camera data associated with a tag location data. At 1902, the apparatus 1200 may include a camera control module 1214 which may be configured to cause the processor 1202 to receive blink data from the communication circuitry 1206. The communication circuitry 1206 may receive the blink data from receivers 106. The receivers 106 may receive blink data from a tag 102.

At 1904, the location module 1212 may be configured to cause the processor 1202 to calculate location data based on the blink data received from the tag 102. The calculation of location data is discussed above in FIG. 1.

At 1906, the camera control module 1214 may be configured to cause the processor 1202 to receive an event occurrence indication. In an example embodiment, the processor 1202 may receive an event occurrence indication by determining events such as a touch down, interception, tackle, home run, performer coming onto the stage, or the like based on location data of event participants. The determination of events occurrences based on event participant location data is discussed in FIG. 4. Additionally, the processor may determine an event occurrence based on the proximity of the tag location data and a second location data, such as a fixed location or a location data associated with other tags. For example, a fixed location may be the dugout, pitcher bullpen, main stage, or the like; other tags may be associated with the mascot, VIPs, participant players, or performance artists not on the event field or stage.

In an example embodiment, the processor 1202 may receive an indication of an event occurrence from the communication circuitry 1206. The communication circuitry 1206 may receive the event occurrence indication from the application device 510.

At 1908, the camera control module 1214 may be configured to cause the processor 1202 to determine a camera control data. Camera control data may be a camera identifier, angle, focus, or the like based on the tag location data and/or the event occurrence. The processor 1202 may determine a camera control data based on the location data alone. The Camera control data may be determined to capture images of the patrons associated with the tag as they travel throughout the venue.

In an example embodiment, the processor 1202 may determine camera control data based on the event occurrence and the location data. The processor 1202 may determine a camera control data that may capture camera data including the reaction of the patron to the event occurrence, and/or capture camera data including the event occurrence. For example, the camera control data may the an identifier, angle, and focus to capture camera data including the patron associated with the tag's reaction to a homerun, performance artist walking on stage, interception, tackle, or the like. In another example the camera control data may be determined to capture camera data including the patron associated with the tag and the event occurrence, such as standing next to the mascot, player, performance artist or VIP. In another example the camera control data may be determine the capture camera data of the patron associated with the tag and the event occurrence on the event field or stage, such as a touchdown, performance artist walking onto the stage, interception, tackle, or the like.

At 1910, the camera control module 1214 may be configured to cause the processor 1202 to cause the communication circuitry 1206 to transmit the camera control data. The communication circuitry 1206 may transmit the camera control data through wired or wireless communication to a camera 112. The camera 112 may execute the camera control data to capture camera data. Camera data may include image data, video data, or the like.

At 1912, the camera control module 1214 may be configured to cause the processor 1202 to receive a tag-application device correlator. The tag-application device correlator may be retrieved from a memory 1204, based on the received blink data tag identifier, such as tag UID, in an instance in which the tag-application device correlator was entered into the memory at registration of the tag and or application device. In an example embodiment, the tag-application device correlator may be received by the communication circuitry 1206 from an application device 510. The tag-application device correlator may include a tag identifier, such as a tag UID and an application device identifier, such as an UID, a phone number, an IP address, or the like. The processor 1202 may use the tag-application device correlator to direct transmissions and receipts of the data described below.

At 1914, the camera control module 1214 may be configured to cause the processor 1202 to receive camera data from the communication circuitry 1206. The communication circuitry may receive the camera data from cameras 112. The camera data may include video data, image data, or the like captured by the cameras 112 in responses to the camera control data.

At 1916, the camera control module 1214 may be configured to cause the processor 1202 to cause the display of the camera data. The processor 1202 may cause the camera data to be displayed on a user interface 1208. Such as a display in a photo sales or distribution booth, or a venue screen, such as a JunboTron.

At 1918, the camera control module 1214 may be configured to cause the processor 1202 to cause the camera data to be stored in a memory 1204. The camera data may be stored in the memory 1204 for later retrieval for display, sales, distribution, analysis, or the like.

At 1920, the camera control module 1214 may be configured to cause the processor 1202 to cause the communication module 1206 to transmit the camera data. The processor 1202 may address the transmission of the camera data using the tag-application device correlator. The communication module 1206 may transmit the camera data to the application device 510 using W-Fi, cellular signals, or the like. Additionally or alternatively, the communication circuitry 1206 may transmit the camera data to various media, such as an event web page, social media sites, email addresses, or the like using wired or wireless communication.

Exemplary Process for Receiving Event Camera Data at an Application Device

Figure 20:
FIG. 20 illustrates an exemplary process for receiving event camera data at an application device in accordance with some embodiments of the present invention.

FIG. 20 illustrates an exemplary process for receiving event camera data at an application device. At 2002, the apparatus 1200 may include a camera control module 1214 configured to cause the processor 1202 to associate a tag UID with an application device 510. The processor 1202 may generate a tag-application device correlator. The tag-application device correlator may include a tag identifier, such as a tag UID and an application device identifier, such as an UID, a phone number, an IP address, or the like.

At 2004, the camera control module 1214 may be configured to cause the processor 1202 to cause the communication circuitry 1206 to transmit the tag-application device correlator to the receiver hub 108 or receiver processing and distribution system 110. The communications circuitry 1206 may transmit the tag-application device correlator using Wi-Fi, cellular signals, or the like.

At 2006, the camera control module 1214 may be configured to cause the processor 1202 to receive an event occurrence indication from the user interface 1208. The user interface 1208 may be used to select a request to capture camera data based on the tag location. The processor 1202 generates the request to capture camera data as an event occurrence. For example, the patron associated with the tag 1202 may be enjoying the event alone or with fellow patrons and desire a camera data to be captured to memorialize the moment. In another example, the patron associated with the tag 102 may be near a mascot, VIP, player, performance artist, or the like which is not associated with a tag, or other event occurrence generating data and desire a camera data to be captured.

At 2008, the camera control module 1214 may be configured to cause the processor 1202 to cause the communication circuitry 1206 to transmit the event occurrence indication. The communication circuitry may transmit the event occurrence indication to the receiver hub 108 or receiver processing and distribution system using Wi-Fi, cellular signals, or the like.

At 2010, the camera control module may be configured to cause the processor 1202 to receive camera data from the communication circuitry 1206. The communication circuitry 1206 may receive the camera data from the receive hub 108 or receiver processing and distribution system 110. The receiver hub 108 or receiver processing and distribution system may receive the camera data from cameras 112 in response to a camera control signal based on the location data and/or event occurrence indication as discussed above in FIG. 19. The camera data may include video data, image data, or the like.

At 2012, the camera control module 1214 may be configured to cause the processor 1202 to cause the camera data to be displayed on a user interface 1208. The user interface may display the camera data as one or more images or videos.

At 2014, the camera control module 1214 may be configured to cause the processor 1202 to cause the processor to store the camera data in a memory 1204. The processor may store the camera data in a memory 1204 for later display or transmission.

At 2016, the camera control module 1214 may be configured to cause the processor 1202 to cause the communications circuitry 1206 to transmit the camera data. The communication circuitry 1206 may transmit the camera data to various media, such as personal websites, event websites, email addresses, social media sites, or the like using wired or wireless communication.

Exemplary Process for Receiving Camera Data from an Application Device

Figure 21:
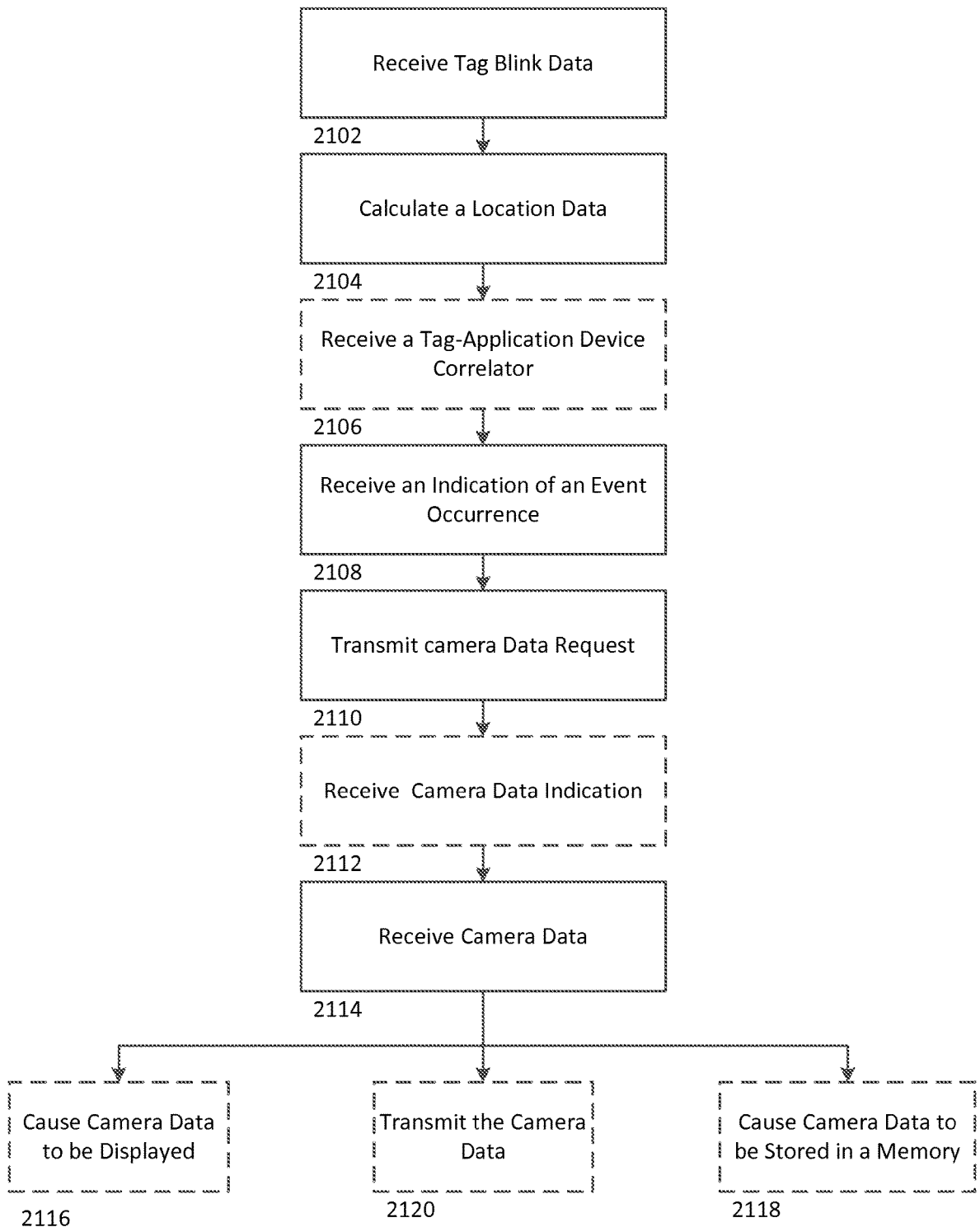
FIG. 21 illustrates an exemplary process for receiving camera data from an application device in accordance with some embodiments of the present invention.

FIG. 21 illustrates an exemplary process for receiving camera data from an application device. At 2102, the apparatus 1200 may include a camera control module 1214 which may be configured to cause the processor 1202 to receive blink data from the communication circuitry 1206. The communication circuitry 1206 may receive the blink data from receivers 106. The receivers 106 may receive blink data from a tag 102.

At 2104, the location module 1212 may be configured to cause the processor 1202 to calculate location data based on the blink data received from the tag 102. The calculation of location data is discussed above in FIG. 1.

At 2106, the camera control module 1214 may be configured to cause the processor 1202 to receive a tag-application device correlator. The tag-application device correlator may be retrieved from a memory 1204, based on the received blink data tag identifier, such as tag UID, in an instance in which the tag-application device correlator was entered into the memory at registration of the tag and or application device. In an example embodiment, the tag-application device correlator may be received by the communication circuitry 1206 from an application device 510. The tag-application device correlator may include a tag identifier, such as a tag UID and an application device identifier, such as an UID, a phone number, an IP address, or the like. The processor 1202 may use the tag-application device correlator to direct transmissions and receipts of the data described below.

At 2108, the camera control module 1214 may be configured to cause the processor 1202 to receive an event occurrence indication. In an example embodiment the processor 1202 may receive an event occurrence indication by determining events such as a touch down, interception, tackle, home run, performer coming onto the stage, or the like based on location data of event participants. The determination of events occurrences based on event participant location data is discussed in FIG. 4. Additionally, the processor may determine an event occurrence based on the proximity of the tag location data and a second location data, such as a fixed location or a location data associated with other tags. For example, a fixed location may be the dugout, pitcher bullpen, main stage, or the like; other tags may be associated with the mascot, VIPs, participant players, or performance artists not on the event field or stage.

In an example embodiment, the processor 1202 may receive an indication of an event occurrence from a user interface 1208. The user interface 1208 may be used to input event occurrence indication. For example, a security issue, such as a fight or medical issue such as an injury.

The event occurrence may additionally identify an area of interest, and location data associated with application devices 510 within the area of interest. The area of interest may be a portion of the venue that is proximate to where an event occurrence was determined to have occurred. For example, the seats near the field for a touchdown, interception, homerun hit; performance stage for a performance artist solo, walking on the stage; fight; injury; or the like.

At 2110, the camera control module 1214 may be configured to cause the processor 1202 to cause the communication circuitry to transmit a camera data request. The communication circuitry 1206 may transmit the camera data request to one or more application devices 510. The camera data request may include the application device 510 identifiers, a period of time for the request, or the like. For example application device identifiers within the area of interest and an event occurrence start and stop time. The processor 1202 may address the transmission of the camera data request using the tag-application device correlator. The communication circuitry 1206 may transmit the camera data request to the application device 510 using Wi-Fi, cellular signals, or the like.

At 2112, the camera control module 1214 may be configured to cause the processor 1202 to receive a camera data indication from the communication circuitry 1206. The communication circuitry 1206 may receive the camera data indication from the application device 510. The camera data indication may be a list of the camera data captured, an application device identifier or the like. The camera data indication may be sent in an instance in which the application device fails to send the camera data, or as an identifier of the camera data transmitted as discussed below.

At 2114, the camera control module 1214 may be configured to cause the processor 1202 to receive camera data from the communication circuitry 1206. The communication circuitry 1206 may receive the camera data from the application devices 510. The camera data may include image data, video data, or the like captured by the application device 510 or associated camera.

At 2116, the camera control module 1214 may be configured to cause the processor 2116 to display the camera data on a user interface. The camera data may be displayed on a user interface 1208 such as a service merchant monitor in a security office or medical office. In an example embodiment, the camera data may be displayed on a user interface 1208, such as, a broadcaster display. In an example embodiment, the camera data may be displayed on a user interface 1208, such as a venue screen (e.g. JumboTron, closed circuit television, or the like.)

At 2118, the camera control module 1214 may be configured to cause the processor 1202 to cause the camera data to be stored in a memory 1204. The processor 1202 may cause the camera data to be stored in a memory 1204 for later display, analysis, or the like.

At 2120, the camera control module 1214 may be configured to cause the processor 1202 to cause the communication circuitry 1206 to transmit the camera data. The communication circuitry 1206 may transmit the camera data to various media, such as personal websites, event websites, email addresses, social media sites, or the like using wired or wireless communication.

In an example embodiment, the processor 1202 may be configured to transmit the camera data to other application devices within the area of interest. The processor may address the transmission of the camera data to the application devices using the respective tag-application device correlator. The communication circuitry 1206 may transmit the camera data to the respective application devices 510 using Wi-Fi, cellular signals, or the like.

Figure 22:
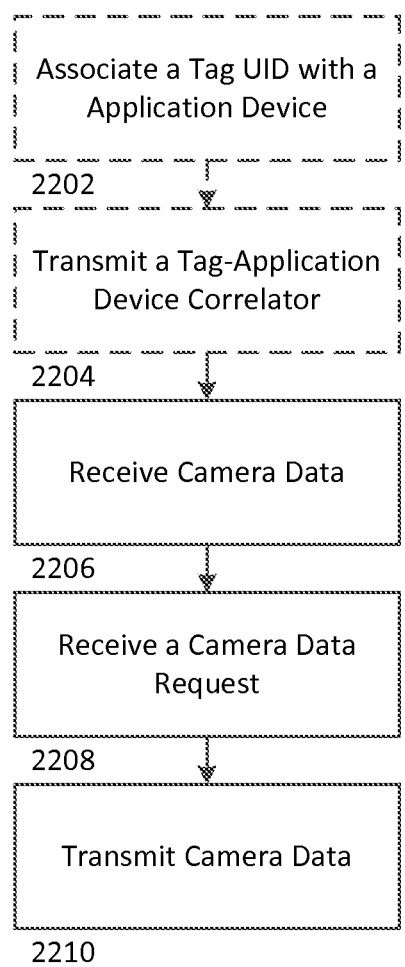
FIG. 22 illustrates an exemplary process for transmitting camera data from an application device based on a camera data request in accordance with some embodiments of the present invention.

Exemplary Process for Transmitting Camera Data from an Application Device Based On a Camera Data Request FIG. 22 illustrates an exemplary process for transmitting camera data from an application device based on a camera data request. At 2202, the apparatus 1200 may include a camera control module 1214 configured to cause the processor 1202 to associate a tag UID with an application device 510. The processor 1202 may generate a tag-application device correlator. The tag-application device correlator may include a tag identifier, such as a tag UID and an application device identifier, such as an UID, a phone number, an IP address, or the like.

At 2204, the camera control module 1214 may be configured to cause the processor 1202 to cause the communication circuitry 1206 to transmit the tag-application device correlator to the receiver hub 108 or receiver processing and distribution system 110. The communications circuitry 1206 may transmit the tag-application device correlator using Wi-Fi, cellular signals, or the like.

At 2206, the camera control module 1214 may be configured to cause the processor 1202 to receive camera data from the communication circuitry 1206. The communication circuitry 1206 may be in communication with a camera. The camera may be integrated into the apparatus or a separate unit. The camera may capture camera data and transmit the camera data to the communication interface 1206. Camera data may include image or video data. The camera data may also be associated with the time of capture based on an event clock and/or a universal clock.

At 2208, the camera control module 1214 may be configured to cause the processor 1202 to receive a camera data request from the communication circuitry 1206. The communication circuitry 1206 may receive the camera data request from the receiver hub 108 or receiver processing and distribution system 110. The camera data request may include the application device 510 identifiers, a period of time for the request, or the like. For example application device identifiers, such as application device UID, phone number, or IP address within an area of interest and an event occurrence start and stop time. The area of interest and event occurrence determination are described above in FIG. 21.

At 2210, the camera control module 1214 may be configured to cause the processor 1202 to cause the communication circuitry 1206 to transmit camera data. The processor may identify the camera data associated with the request based on the application device identifier and the time period. The processor 1202 may additionally generate a camera data indication. The camera data indication may be a list of the camera data captured during the requested period, an application device identifier, or the like. The camera data indication may be sent in an instance in which the application device fails to send the camera data, or as an identifier of the camera data transmitted. The communication circuitry 1206 may transmit the camera data associated with the camera data request and/or the camera data indication to the receiver hub 108 or receiver processing and distribution system 110 using Wi-Fi, cellular signals, or the like.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving first blink data at time intervals from a first location tag associated with an application device, wherein the application device is mobile and includes a camera;
   measuring, using a processor, times of arrival (TOA) of the received first blink data;
   calculating, using the processor, a first location within a venue for the application device at a first time based on the TOA measurements of the first blink data;
   detecting, using the processor, an event occurrence associated with participant activity external to the application device in the venue at the first time based on second blink data received at time intervals from a second location tag;
   measuring, using the processor, TOA of the received second blink data;
   determining, using the processor and based on the TOA measurements of the second blink data, a second location within the venue corresponding to the event occurrence;
   comparing, using the processor, the first location to the second location;
   in response to the first location being proximate to the second location, generating, using the processor, a camera data request and transmitting the camera data request to the application device;
   receiving camera data captured by the camera from the application device in response to the camera data request; and
   causing the camera data to be displayed on a display.

2. The method of claim 1, wherein the camera data is image data.

3. The method of claim 1, wherein the display is a venue screen.

4. The method of claim 1, wherein the camera data request includes a period of time including the first time.

5. The method of claim 1, wherein the application device is a first application device, and further comprising transmitting the camera data to a second application device determined to proximate the first application device based third blink data from a third location tag.

6. The method of claim 1, further comprising transmitting the camera data to a social media site.

7. The method of claim 1, wherein the event occurrence is indicative of at least one of an injury or a security event.

8. An apparatus comprising:
   at least one processor, and at least one memory including computer program code, wherein the at least one memory and computer program code are configured to, with the processor, cause the apparatus to at least:
   receive first blink data at time intervals from a first location tag associated with an application device, wherein the application device is mobile and includes a camera;
   measure times of arrival (TOA) of the received first blink data;
   calculate a first location within a venue for the application device at a first time based on the TOA measurements of the first blink data;
   detect an event occurrence associated with participant activity external to the application device in the venue at the first time based on second blink data received at time intervals from a second location tag;
   measure TOA of the received second blink data;
   determine, based on the TOA measurements of the second blink data, a second location within the venue corresponding to the event occurrence;
   compare the first location to the second location;
   in response to the first location being proximate to the second location, generate a camera data request and transmit the camera data request to the application device;
   receive camera data from the application device in response to the camera data request; and
   cause the camera data to be displayed on a display.

9. The apparatus of claim 8, wherein the camera data is image data.

10. The apparatus of claim 8, wherein the display is venue screen.

11. The apparatus of claim 8, wherein the camera data request includes a period of time including the first time.

12. The apparatus of claim 8, wherein the application device is a first application device, and the at least one memory and the computer program code are configured to, with the processor, cause the apparatus to transmit the camera data to a second application device determined to be proximate the first application device based on third blink data from a third location tag.

13. The apparatus of claim 8, wherein the at least one memory and the computer program code are configured to, with the processor, cause the apparatus to transmit the camera data to a social media site.

14. The apparatus of claim 8, wherein the event occurrence is indicative of at least one of an injury or a security event.

15. A system comprising:
- an application device, wherein the application device is mobile and includes a data capture device;
- a first location tag associated with the application device, the first location tag to generate first blink data at time intervals;
- a hub including a processor, the hub configured to:
  - measure times of arrival (TOA) of the first blink data;
  - calculate a first location within a venue for the application device at a first time based on the TOA measurements of the first blink data;
  - detect an event occurrence associated with participant activity external to the application device in the venue at the first time based second blink data received at time intervals from a second location tag;
  - measure TOA of the received second blink data;
  - determine, based on the TOA measurements of the second blink data, a second location within the venue corresponding to the participant activity;
  - compare the first location to the second location; and
  - when the comparison indicates that the first location tag is proximate the event occurrence, generate and transmit a data request to the application device, wherein the application device is to transmit camera data captured by the data capture device of the application device to the hub in response to the data request; and
- a display to display the camera data.

16. The system of claim 15, wherein the display is a venue screen.

17. The system of claim 15, wherein the hub is to transmit the captured data to a social media site associated with the application device.

18. The system of claim 15, wherein the data request includes a period of time including the first time of the event occurrence.

19. The system of claim 15, wherein the event occurrence is indicative of at least one of an injury or a security event.

20. The system of claim 15, wherein the application device is a first application device, and the hub is to transmit the captured data to a second application device determined to be proximate the first application device based on third blink data from a third location tag.

* * * * *